(12) United States Patent
Shen et al.

(10) Patent No.: US 12,497,608 B2
(45) Date of Patent: Dec. 16, 2025

(54) GENE THERAPY FOR ALZHEIMER'S DISEASE

(71) Applicants: The Brigham and Women's Hospital, Inc., Boston, MA (US); The General Hospital Corporation, Boston, MA (US)

(72) Inventors: Jie Shen, Brookline, MA (US); Raymond J. Kelleher, III, Brookline, MA (US)

(73) Assignees: The Brigham and Women's Hospital, Inc., Boston, MA (US); The General Hospital Corporation, Boston, MA (US)

(*) Notice: Subject to any disclaimer, the term of this patent is extended or adjusted under 35 U.S.C. 154(b) by 658 days.

(21) Appl. No.: 17/057,001

(22) PCT Filed: May 22, 2019

(86) PCT No.: PCT/US2019/033616
§ 371 (c)(1),
(2) Date: Nov. 19, 2020

(87) PCT Pub. No.: WO2019/226832
PCT Pub. Date: Nov. 28, 2019

(65) Prior Publication Data
US 2021/0108186 A1    Apr. 15, 2021

Related U.S. Application Data

(60) Provisional application No. 62/675,003, filed on May 22, 2018.

(51) Int. Cl.
| | | |
|---|---|---|
| C12N 15/86 | (2006.01) | |
| A61K 9/00 | (2006.01) | |
| A61K 9/51 | (2006.01) | |
| A61P 25/28 | (2006.01) | |
| C12N 7/00 | (2006.01) | |
| C12N 9/64 | (2006.01) | |
| A61K 38/00 | (2006.01) | |
| A61K 48/00 | (2006.01) | |

(52) U.S. Cl.
CPC .......... *C12N 9/6478* (2013.01); *A61K 9/0019* (2013.01); *A61K 9/0085* (2013.01); *A61K 9/5123* (2013.01); *A61P 25/28* (2018.01); *C12N 7/00* (2013.01); *C12N 15/86* (2013.01); *C12Y 304/23045* (2013.01); *C12Y 304/23046* (2013.01); *A61K 38/00* (2013.01); *A61K 48/00* (2013.01); *C12N 2710/16132* (2013.01); *C12N 2710/16143* (2013.01)

(58) Field of Classification Search
CPC ........ C12N 9/6478; C12N 7/00; C12N 15/86; C12N 2710/16132; C12N 2710/16143; A61K 9/0019; A61K 9/0085; A61K 9/5123; A61K 38/00; A61K 48/00; A61K 9/5184; A61P 25/28; C12Y 304/23045; C12Y 304/23046; C07K 14/4711

See application file for complete search history.

(56) References Cited

U.S. PATENT DOCUMENTS

| | | |
|---|---|---|
| 5,328,470 A | 7/1994 | Nabel et al. |
| 5,658,776 A | 8/1997 | Flotte et al. |
| 6,020,143 A | 2/2000 | St. George-Hyslop |
| 6,180,613 B1 | 1/2001 | Kaplitt et al. |
| 6,395,960 B1 | 5/2002 | St. George-Hyslop |
| 6,503,888 B1 | 1/2003 | Kaplitt et al. |
| 6,686,449 B2 | 2/2004 | Carter et al. |
| 6,783,955 B2 | 8/2004 | Arvizu |
| 6,979,537 B2 | 12/2005 | McCarthy et al. |
| 7,271,313 B2 | 9/2007 | Shen |
| 7,498,316 B2 | 3/2009 | Xu et al. |
| 7,709,616 B2 | 5/2010 | Bentwich et al. |
| 8,129,334 B2 | 3/2012 | Dewji et al. |
| 9,512,191 B2 | 12/2016 | Dewji et al. |
| 9,956,271 B2 | 5/2018 | Guild et al. |
| 10,221,223 B2 | 3/2019 | Dewji et al. |
| 2002/0015939 A1 | 2/2002 | McCarthy et al. |
| 2002/0082211 A1* | 6/2002 | Arvizu ................. A61P 25/28 514/19.3 |
| 2003/0065141 A1 | 4/2003 | Carter et al. |
| 2005/0288243 A1 | 12/2005 | Xu et al. |

(Continued)

FOREIGN PATENT DOCUMENTS

| | | |
|---|---|---|
| CN | 103282374 A | 9/2013 |
| CN | 103816540 A | 5/2014 |

(Continued)

OTHER PUBLICATIONS

Hur et al., 2022 (Experimental & Molecular Medicine (2022) 54:433-446; https://doi.org/10.1038/s12276-022-00754-8)(Year: 2022).*

(Continued)

*Primary Examiner* — Peter Paras, Jr.
*Assistant Examiner* — Khoa Nhat Tran
(74) *Attorney, Agent, or Firm* — Fish & Richardson P.C.

(57) ABSTRACT

The present disclosure provides, among other things, methods for using presenilin based gene therapy to treat neurodegenerative dementia including, but not limited to Alzheimers disease, frontotemporal dementia, frontotemporal lobar degeneration, Picks disease, Lewy body dementia, memory loss, and cognitive impairment including mild cognitive impairment (MCI).

3 Claims, 3 Drawing Sheets
Specification includes a Sequence Listing.

(56) References Cited

U.S. PATENT DOCUMENTS

| | | |
|---|---|---|
| 2007/0134761 A1 | 6/2007 | Charellard |
| 2009/0305946 A1 | 12/2009 | Dewji et al. |
| 2011/0201052 A1 | 8/2011 | Raitano et al. |
| 2017/0073384 A1 | 3/2017 | Dewji et al. |
| 2018/0094280 A1 | 4/2018 | Kutner et al. |
| 2018/0169148 A1 | 6/2018 | Adair et al. |
| 2019/0134155 A1 | 5/2019 | Kaetzel et al. |
| 2022/0235374 A1 | 7/2022 | Shen et al. |
| 2023/0068087 A1 | 3/2023 | Gannon et al. |
| 2023/0136245 A1 | 5/2023 | Gannon et al. |

FOREIGN PATENT DOCUMENTS

| | | | |
|---|---|---|---|
| CN | 106604988 A | 4/2017 | |
| CN | 107614008 A | 1/2018 | |
| EP | 0826042 B1 * | 8/2008 | |
| EP | 2010663 | 1/2009 | |
| JP | H11504214 A | 4/1999 | |
| JP | 2013509890 | 3/2013 | |
| JP | 2013107890 | 6/2013 | |
| JP | 2016523835 | 8/2016 | |
| JP | 2018510615 A | 4/2018 | |
| JP | 2021525245 A | 9/2021 | |
| WO | WO 95/00655 | 1/1995 | |
| WO | WO 95/11984 | 5/1995 | |
| WO | WO 95/27071 | 10/1995 | |
| WO | WO-2000003248 A1 * | 1/2000 | |
| WO | WO 2001/051671 | 7/2001 | |
| WO | WO 2005/003350 A2 | 1/2005 | |
| WO | WO 2005/037226 A2 | 4/2005 | |
| WO | WO 2005/116250 A2 | 12/2005 | |
| WO | WO 2009/042727 | 4/2009 | |
| WO | WO-2015006743 A1 * | 1/2015 | ............ C12N 15/86 |
| WO | WO-2016209654 A1 * | 12/2016 | ........... A61B 5/0048 |
| WO | WO 2017/191274 | 11/2017 | |
| WO | WO 2017/205767 A1 | 11/2017 | |
| WO | WO 2018/045022 A1 | 3/2018 | |
| WO | WO 2018/140532 | 8/2018 | |
| WO | WO 2018/175443 A1 | 9/2018 | |
| WO | WO 2018/222890 | 12/2018 | |
| WO | WO 2019/028306 | 2/2019 | |
| WO | WO 2019/226832 | 11/2019 | |
| WO | WO 2021/155296 | 8/2021 | |

OTHER PUBLICATIONS

Stepanichev, 2020 (Frontiers in Genome Editing, Jun. 2020, vol. 2, Article 4, doi: 10.3389/fgeed.2020.00004) (Year: 2020).*

Kabir et al., 2020 (Neurotoxicity Research (2020) 38:833-849, https://doi.org/10.1007/s12640-020-00232-x) (Year: 2020).*

Chávez-Gutiérrez et al., 2020 (Seminars in Cell and Developmental Biology 105 (2020) 75-85, https://doi.org/10.1016/j.semcdb.2020.03.005) (Year: 2020).*

Ingusci et al., 2019 (Front. Pharmacol. 10:724., doi: 10.3389/fphar.2019.00724) (Year: 2019).*

Sudhakar et al., 2018 (Neurotherapeutics (2019) 16:166-175, https://doi.org/10.1007/s13311-018-00694-0) (Year: 2018).*

Bryan et al., 2013 (Current Opinion in Structural Biology 2013, 23:314-316, https://doi.org/10.1016/j.sbi.2013.03.001) (Year: 2013).*

Maqbool et al., 2015 (Biochem. Soc. Trans. (2015) 43, 1011-1017; doi:10.1042/BST20150135) (Year: 2015).*

Cruz et al., 2017 (Methods in Molecular Biology, vol. 1654, Chapter 5, pp. 55-75, https://doi.org/10.1007/978-1-4939-7231-9_5) (Year: 2017).*

Argenio et al (J. Pers. Med. 2020, 10, 26; doi:10.3390/jpm10020026) (Year: 2020).*

Kabir et al (Neurotoxicity Research (2020) 38:833-849, https://doi.org/10.1007/s12640-020-00232-x) (Year: 2020).*

Yang et al (Int. J. Mol. Sci. 2023, 24, 8417. https://doi.org/10.3390/ijms24098417) (Year: 2023).*

Deaton et al (Journal of Alzheimer's Disease 77 (2020) 961-977, Doi 10.3233/JAD-200598) (Year: 2020).*

Stepanichev (Frontiers in Genome Editing, Jun. 2020, vol. 2, Article 4, doi: 10.3389/fgeed.2020.00004) (Year: 2020).*

John et al (Ageing Research Reviews 65 (2021) 101208, https://doi.org/ 10.1016/j.arr.2020.101208) (Year: 2021).*

Kotterman et al., 2014 (Nature Reviews, vol. 15, p. 445-451, doi: 10.1038/nrg3742) (Year: 2014).*

Shim et al., 2017 (Current Gene Therapy, vol. 17, No. 5, p. 1-18, DOI: 10.2174/1566523218666180119121949) (Year: 2017).*

Lenzi et al., 2014 (NCBI Bookshelf, A Service of the National Library of Medicine, National Institute of Health, Oversight and Review of Clinical Gene Transfer Protocols: Assessing the Role of the Recombinant DNA Advisory Committee. Washington (DC): National Academies Press (US), pp. 1-16) (Year: 2014).*

Bulcha et al., 2021 (Signal Transduction and Targeted Therapy, 6:53, p. 1-24, https://doi.org/10.1038/s41392-021-00487-6) (Year: 2021).*

Gotz et al (Nature Reviews Neuroscience vol. 19, pp. 583-598 (2018), https://doi.org/10.1038/ s41583-018-0054-8) (Year: 2018).*

Hudry et al (Neuron, vol. 101, Issue 5, Mar. 6, 2019, pp. 839-862, https://doi.org/10.1016/j.neuron.2019.02.017) (Year: 2019).*

Sun et al ( Proc Natl Acad Sci U S A Jan. 24, 2017;114(4):E476-E485. doi: 10.1073/pnas.1618657114. Epub Dec. 5, 2016.) (Year: 2017).*

Heilig et al(The Journal of Neuroscience, Jul. 10, 2013 • 33(28):11606-11617); (Year: 2013).*

Kou et al (Mol Neurobiol (2015) 51:43-56, DOI 10.1007/s12035-014-8691-z). (Year: 2015).*

Xia et al (Neuron 85, 967-981, Mar. 4, 2015, doi: 10.1016/j.neuron.2015.02.010) (Year: 2015).*

Felsenstein et al., "O1-11-03: Endogenous cholesterol metabolites as potential Alzheimer's therapeutics," Alzheimer's & Dementia, Jul. 2012, 8(4S Part 3):p. 104-105.

GenBank Accession No. NM 000021.3, "Homo sapiens presenilin 1 (PSEN1), transcript variant 1, mRNA," dated Aug. 7, 2008, 5 pages.

GenBank Accession No. NM 000447.2, "Homo sapiens presenilin 2 (Alzheimer disease 4) (PSEN2), transcript variant 1, mRNA," dated Aug. 17, 2007, 4 pages.

GenBank Accession No. NM_007318.2, "Homo sapiens presenilin 1 (PSEN1), transcript variant 2, mRNA," dated Aug. 7, 2008, 5 pages.

GenBank Accession No. NM_012486.2, "Homo sapiens presenilin 2 (PSEN2), transcript variant 2, mRNA," dated Aug. 17, 2007, 6 pages.

JP Japanese Office Action in Japanese Appln. No. 2020-565341, Apr. 4, 2023, 11 pages (with English translation).

Wang et al., "Wild-type presenilin 1 protects against Alzheimer disease mutation-induced amyloid pathology," Journal of Biological Chemistry, Jun. 2006, 281(22):15330-6.

De Strooper, "Loss-of-function presenilin mutations in Alzheimer disease: Talking Point on the role of presenilin mutations in Alzheimer disease," EMBO Reports, Feb. 2007, 8(2):141-6.

PCT International Preliminary Report on Patentability in International Appln. No. PCT/US2020/034040, dated Nov. 16, 2021, 7 pages.

EP Extended Search Report in European Appln. No. 19808081.4, dated Feb. 21, 2022, 7 pages.

EP Supplementary European Search Report in European Appln. No. 19808081.4, dated Mar. 11, 2022, 8 pages.

Kelleher et al., "Presenilin-1 mutations and Alzheimer's disease," Proceedings of the National Academy of Sciences, Jan. 24, 2017, 114(4):629-31.

EP Extended Search Report in European Appln. No. 20813435.3. dated Jun. 12, 2023, 6 pages.

GenBank Accession No. AAW01891, "Sequence 12 from patent U.S. Pat. No. 6,783,955," dated Dec. 14, 2004, 1 page.

GenBank Accession No. AFD46703, "Sequence 2 from patent U.S. Pat. No. 8,129,334," Mar. 14, 2012, 1 page.

Acosta-Baena et al., "Pre-dementia clinical stages in presenilin 1 E280A familial early-onset Alzheimer's disease: a retrospective cohort study," The Lancet Neurology, Mar. 1, 2011, 10(3):213-20.

(56) References Cited

OTHER PUBLICATIONS

Amtul et al., "A presenilin 1 mutation associated with familial frontotemporal dementia inhibits γ-secretase cleavage of APP and notch," Neurobiology of Disease, Mar. 1, 2002, 9(2):269-73.
Asokan et al., "The AAV vector toolkit: poised at the clinical crossroads," Molecular Therapy, Apr. 1, 2012, 20(4):699-708.
Ausubel et al., "Current Protocols in Molecular Biology, Sections 9.10-9.14," Greene Publishing Associates, 1989, 51 pages.
Beglopoulos et al., "Reduced β-amyloid production and increased inflammatory responses in presenilin conditional knock-out mice," Journal of Biological Chemistry, Nov. 5, 2004, 279(45):46907-14.
Bentahir et al., "Presenilin clinical mutations can affect γ-secretase activity by different mechanisms," Journal of Neurochemistry, Feb. 2006, 96(3):732-42.
Bessis et al., "Immune responses to gene therapy vectors: influence on vector function and effector mechanisms," Gene Therapy, Oct. 2004, 11(1):S10-7.
Bose et al., "Role of nucleolin in human parainfluenza virus type 3 infection of human lung epithelial cells," Journal of Virology, Aug. 1, 2004, 78(15):8146-58.
Brouwers et al., "Molecular genetics of Alzheimer's disease: an update," Annals of Medicine, Jan. 1, 2008, 40(8):562-83.
Brunkan et al., "Two domains within the first putative transmembrane domain of presenilin 1 differentially influence presenilinase and γ-secretase activity," Journal of Neurochemistry, Sep. 2005, 94(5):1315-28.
Chen et al., "Gene therapy for brain tumors: regression of experimental gliomas by adenovirus-mediated gene transfer in vivo," Proceedings of the National Academy of Sciences, Apr. 12, 1994, 91(8):3054-7.
Chen et al., "Presenilin 1 mutations activate γ42-secretase but reciprocally inhibit ε-secretase cleavage of amyloid precursor protein (APP) and S3-cleavage of notch," Journal of Biological Chemistry, Sep. 27, 2002, 277(39):36521-6.
Cressant et al., "Improved behavior and neuropathology in the mouse model of Sanfilippo type IIIB disease after adeno-associated virus-mediated gene transfer in the striatum," Journal of Neuroscience, Nov. 10, 2004, 24(45):10229-39.
Crook et al., "A variant of Alzheimer's disease with spastic paraparesis and unusual plaques due to deletion of exon 9 of presenilin 1," Nature Medicine, Apr. 1998, 4(4):452-5.
De Jonghe et al., "Aberrant splicing in the presenilin-1 intron 4 mutation causes presenile Alzheimer's disease by increased Aβ42 secretion," Human Molecular Genetics, Aug. 1, 1999, 8(8):1529-40.
Deyle et al., "Adeno-associated virus vector integration," Current Opinion in Molecular Therapeutics, Aug. 2009, 11(4):442, 11 pages.
Dittgen et al., "Lentivirus-based genetic manipulations of cortical neurons and their optical and electrophysiological monitoring in vivo," Proceedings of the National Academy of Sciences, Dec. 28, 2004, 101(52):18206-11.
Doll et al., "Comparison of promoter strengths on gene delivery into mammalian brain cells using AAV vectors." Gene Therapy, May 1, 1996, 3(5):437-47.
Dong et al., "Poly (d, 1-lactide-co-glycolide)/montmorillonite nanoparticles for oral delivery of anticancer drugs," Biomaterials, Oct. 1, 2005, 26(30):6068-76.
Duff et al., "Increased amyloid-β42 (43) in brains of mice expressing mutant presenilin 1," Nature, Oct. 1996, 383(6602):710-3.
Feng et al., "Forebrain degeneration and ventricle enlargement caused by double knockout of Alzheimer's presenilin-1 and presenilin-2," Proceedings of the National Academy of Sciences, May 25, 2004, 101(21):8162-7.
Flotte et al., "Gene expression from adeno-associated virus vectors in airway epithelial cells," Am J Respir Cell Mol Biol, Sep. 1, 1992, 7(3):349-56.
Foley et al., "Intra-arterial delivery of AAV vectors to the mouse brain after mannitol mediated blood brain barrier disruption," Journal of Controlled Release, Dec. 28, 2014, 196:71-8.
GenBank Accession No. NP 000438.2, "presenilin-2 isoform 1 [*Homo sapiens*]," May 14, 2018, 4 pages.

Gholizadeh et al., "Reduced phenotypic severity following adeno-associated virus-mediated Fmr1 gene delivery in fragile X mice," Neuropsychopharmacology, Dec. 2014, 39(13):3100-11.
Gonçalves et al., "Adeno-associated virus: from defective virus to effective vector," Virology Journal, Dec. 2005, 2(1):1-7.
Haberman et al., "Inducible long-term gene expression in brain with adeno-associated virus gene transfer," Gene Therapy, Dec. 1998, 5(12):1604-11.
Handler et al., "Presenilin-1 regulates neuronal differentiation during neurogenesis." Development, Jun. 15, 2000, 127(12):2593-606.
Heilig et al., "A presenilin-1 mutation identified in familial Alzheimer disease with cotton wool plaques causes a nearly complete loss of γ-secretase activity," Journal of Biological Chemistry, Jul. 16, 2010, 285(29):22350-9.
Heilig et al., "Trans-dominant negative effects of pathogenic PSEN1 mutations on γ-secretase activity and Aβ production," Journal of Neuroscience, Jul. 10, 2013, 33(28):11606-17.
Henikoff et al., "Amino acid substitution matrices from protein blocks," Proceedings of the National Academy of Sciences, Nov. 15, 1992, 89(22):10915-9.
Hermonat et al., "Use of adeno-associated virus as a mammalian DNA cloning vector: transduction of neomycin resistance into mammalian tissue culture cells," Proceedings of the National Academy of Sciences, Oct. 1, 1984, 81(20):6466-70.
Herreman et al., "γ-Secretase activity requires the presenilin-dependent trafficking of nicastrin through the Golgi apparatus but not its complex glycosylation," Journal of Cell Science, Mar. 15, 2003, 116(6):1127-36.
Herskowitz, "Functional inactivation of genes by dominant negative mutations," Nature, Sep. 1987, 329(6136):219-22.
Hester et al., "AAV as a gene transfer vector for the treatment of neurological disorders: novel treatment thoughts for ALS," Current Gene Therapy, Oct. 1, 2009, 9(5):428-33.
Hiltunen et al., "Identification of a novel 4.6-kb genomic deletion in presenilin-1 gene which results in exclusion of exon 9 in a Finnish early onset Alzheimer's disease family: an Alu core sequence-stimulated recombination?," European Journal of Human Genetics, Apr. 2000, 8(4):259-66.
Hitoshi Niwa et al., "Efficient selection for high-expression transfectants with a novel eukaryotic vector," Gene, Dec. 15, 1991, 108(2):193-9.
Hsu et al., "Discovery and validation of autosomal dominant Alzheimer's disease mutations," Alzheimer's Research & Therapy, Dec. 2018, 10(1):1-8.
Iwata et al., "Global brain delivery of neprilysin gene by intravascular administration of AAV vector in mice," Scientific Reports, Mar. 18, 2013, 3(1):1-8.
Jackson et al., "AAV9 supports wide-scale transduction of the CNS and TDP-43 disease modeling in adult rats," Molecular Therapy—Methods & Clinical Development, Jan. 1, 2015, 2:15036, 8 pages.
Kang et al., "An evolutionarily conserved role of presenilin in neuronal protection in the aging *Drosophila* brain," Genetics, Jul. 1, 2017, 206(3):1479-93.
Kim et al., "Presenilins are required for maintenance of neural stem cells in the developing brain," Molecular Neurodegeneration, Dec. 2008, 3(1):1-3.
Kim et al., "Viral transduction of the neonatal brain delivers controllable genetic mosaicism for visualising and manipulating neuronal circuits in vivo," European Journal of Neuroscience, Apr. 2013, 37(8):1203-20.
Klein et al., "Dose and promoter effects of adeno-associated viral vector for green fluorescent protein expression in the rat brain," Experimental Neurology, Jul. 1, 2002, 176(1):66-74.
Kosik et al., "Homozygosity of the autosomal dominant Alzheimer disease presenilin 1 E280A mutation," Neurology, Jan. 13, 2015, 84(2):206-8.
Kumar-Singh et al., "Mean age-of-onset of familial Alzheimer disease caused by presenilin mutations correlates with both increased Aβ42 and decreased Aβ40," Human Mutation, Jul. 2006, 27(7):686-95.
Lalli et al., "Origin of the PSEN1 E280A mutation causing early-onset Alzheimer's disease," Alzheimer's & Dementia, Oct. 2014, 10:S277-83.

(56) References Cited

OTHER PUBLICATIONS

Langer et al., "New methods of drug delivery," Science, Sep. 28, 1990, 249(4976):1527-33.
Lebkowski et al., "Adeno-associated virus: a vector system for efficient introduction and integration of DNA into a variety of mammalian cell types,". Molecular and Cellular Biology, Oct. 1, 1988, 8(10):3988-96.
Lee et al., "Presenilins regulate synaptic plasticity and mitochondrial calcium homeostasis in the hippocampal mossy fiber pathway," Molecular Neurodegeneration, Dec. 2017, 12(1):1-5.
Lee et al., "Synaptic function of nicastrin in hippocampal neurons," Proceedings of the National Academy of Sciences, Jun. 17, 2014, 111(24):8973-8.
Lei et al., "Structure-function analysis of human glucose-6-phosphatase, the enzyme deficient in glycogen storage disease type Ia," Journal of Biological Chemistry, May 19, 1995, 270(20):11882-6.
Lemere et al., "The E280A presenilin 1 Alzheimer mutation produces increased A$\beta$42 deposition and severe cerebellar pathology," Nature Medicine, Oct. 1996, 2(10):1146-50.
Levitan et al., "Assessment of normal and mutant human presenilin function in Caenorhabditis elegans," Proceedings of the National Academy of Sciences, Dec. 10, 1996, 93(25):14940-4.
Levy-Lahad et al., "Candidate gene for the chromosome 1 familial Alzheimer's disease locus," Science, Aug. 18, 1995, 269(5226):973-7.
Liu et al., "Systematic comparison of 2A peptides for cloning multi-genes in a polycistronic vector," Scientific Reports, May 19, 2017, 7(1):1-9.
Löbenberg et al., "Improved body distribution of 14C-labelled AZT bound to nanoparticles in rats determined by radioluminography," Journal of Drug Targeting, Jan. 1, 1998, 5(3):171-9.
Lopera et al., "Clinical features of early-onset Alzheimer disease in a large kindred with an E280A presenilin-1 mutation," Jama, Mar. 12, 1997, 277(10):793-9.
Marambaud et al., "A presenilin-1/$\gamma$-secretase cleavage releases the E-cadherin intracellular domain and regulates disassembly of adherens junctions," The EMBO Journal, Apr. 15, 2002, 21(8):1948-56.
Mauro et al., "A critical analysis of codon optimization in human therapeutics," Trends in Molecular Medicine, Nov. 1, 2014, 20(11):604-13.
Mayford et al., "Control of memory formation through regulated expression of a CaMKII transgene," Science, Dec. 6, 1996, 274(5293):1678-83.
McLaughlin et al., "Adeno-associated virus general transduction vectors: analysis of proviral structures," Journal of Virology, Jun. 1, 1988, 62(6):1963-73.
McLean et al., "Widespread neuron-specific transgene expression in brain and spinal cord following synapsin promoter-driven AAV9 neonatal intracerebroventricular injection," Neuroscience Letters, Jul. 25, 2014, 576:73-8.
Mingozzi et al., "Therapeutic in vivo gene transfer for genetic disease using AAV: progress and challenges," Nature Reviews Genetics, May 2011, 12(5):341-55.
Moehlmann et al., "Presenilin-1 mutations of leucine 166 equally affect the generation of the Notch and APP intracellular domains independent of their effect on A$\beta$42 production," Proceedings of the National Academy of Sciences, Jun. 11, 2002, 99(12):8025-30.
Mucke et al., "High-level neuronal expression of A$\beta$1-42 in wild-type human amyloid protein precursor transgenic mice: synaptotoxicity without plaque formation," Journal of Neuroscience, Jun. 1, 2000, 20(11):4050-8.
Muzyczka, "Use of adeno-associated virus as a general transduction vector for mammalian cells," Viral Expression Vectors, 1992, vol. 1992:97-129.
Palmisano et al., "Characterization of membrane-shed microvesicles from cytokine-stimulated $\beta$-cells using proteomics strategies," Molecular & Cellular Proteomics, Aug. 1, 2012, 11(8):230-43.
Parra et al., "Memory binding and white matter integrity in familial Alzheimer's disease," Brain, May 1, 2015, 138(5):1355-69.

PCT International Preliminary Report on Patentability in International Appln. No. PCT/US2019/033616, dated Nov. 24, 2020, 12 pages.
PCT International Search Report and Written Opinion in International Appln. No. PCT/US2019/033616, dated Oct. 28, 2019, 18 pages.
PCT International Search Report and Written Opinion in International Appln. No. PCT/US2020/034040, dated Sep. 17, 2020, 10 pages.
Podlisny et al., "Presenilin proteins undergo heterogeneous endoproteolysis between Thr291and Ala299and occur as stable N-and C-terminal fragments in normal and Alzheimer brain tissue," Neurobiology of Disease, Jan. 1, 1997, 3(4):325-37.
Qi et al., "Distinct mechanisms by mutant presenilin 1 and 2 leading to increased intracellular levels of amyloid $\beta$-protein 42 in Chinese hamster ovary cells," Biochemistry, Feb. 4, 2003, 42(4):1042-52.
Qian et al., "Mutant human presenilin 1 protects presenilin 1 null mouse against embryonic lethality and elevates A$\beta$1-42/43 expression," Neuron, Mar. 1, 1998, 20(3):611-7.
Reiman et al., "Brain imaging and fluid biomarker analysis in young adults at genetic risk for autosomal dominant Alzheimer's disease in the presenilin 1 E280A kindred: a case-control study," The Lancet Neurology, Dec. 1, 2012, 11(12):1048-56.
Rios-Romenets et al., "The value of pre-screening in the Alzheimer's Prevention Initiative (API) Autosomal Dominant Alzheimer's Disease trial," The Journal of Prevention of Alzheimer's Disease, Jan. 2018, 5(1):49-54.
Robinson et al., "Lipid nanoparticle-delivered chemically modified mRNA restores chloride secretion in cystic fibrosis," Molecular Therapy, Aug. 1, 2018, 26(8):2034-46.
Rogaev et al., "Familial Alzheimer's disease in kindreds with missense mutations in a gene on chromosome 1 related to the Alzheimer's disease type 3 gene," Nature, Aug. 1995, 376(6543):775-8.
Ryan et al., "Correlating familial Alzheimer's disease gene mutations with clinical phenotype," Biomarkers in Medicine, Feb. 2010, 4(1):99-112.
Ryman et al., "Symptom onset in autosomal dominant Alzheimer disease: a systematic review and meta-analysis," Neurology, Jul. 15, 2014, 83(3):253-60.
Saito et al., "Potent amyloidogenicity and pathogenicity of A$\beta$43," Nature Neuroscience, Aug. 2011, 14(8):1023-32.
Sakuma et al., "Mucoadhesion of polystyrene nanoparticles having surface hydrophilic polymeric chains in the gastrointestinal tract," International Journal of Pharmaceutics, Jan. 25, 1999, 177(2):161-72.
Samulski et al., "Helper-free stocks of recombinant adeno-associated viruses: normal integration does not require viral gene expression," Journal of Virology, Sep. 1, 1989, 63(9):3822-8.
Saura et al., "Conditional inactivation of presenilin 1 prevents amyloid accumulation and temporarily rescues contextual and spatial working memory impairments in amyloid precursor protein transgenic mice," Journal of Neuroscience, Jul. 20, 2005, 25(29):6755-64.
Saura et al., "Loss of presenilin function causes impairments of memory and synaptic plasticity followed by age-dependent neurodegeneration," Neuron, Apr. 8, 2004, 42(1):23-36.
Schroeter et al., "A presenilin dimer at the core of the $\gamma$-secretase enzyme: insights from parallel analysis of Notch 1 and APP proteolysis," Proceedings of the National Academy of Sciences, Oct. 28, 2003, 100(22):13075-80.
Sepulveda-Falla et al., "Deposition of hyperphosphorylated tau in cerebellum of PS1 E280A Alzheimer's disease," Brain Pathology, Jul. 2011, 21(4):452-63.
Sepulveda-Falla et al., "Familial Alzheimer's disease-associated presenilin-1 alters cerebellar activity and calcium homeostasis," The Journal of Clinical Investigation, Apr. 1, 2014, 124(4):1552-67.
Shen et al., "Skeletal and CNS defects in Presenilin-I-deficient mice," Cell, May 16, 1997, 89(4):629-39.
Shen et al., "The presenilin hypothesis of Alzheimer's disease: evidence for a loss-of-function pathogenic mechanism," Proceedings of the National Academy of Sciences, Jan. 9, 2007, 104(2):403-9.

(56) References Cited

OTHER PUBLICATIONS

Sherrington et al., "Cloning of a gene bearing missense mutations in early-onset familial Alzheimer's disease," Nature, Jun. 1995, 375(6534):754-60.
Siman et al., "Presenilin-1 P264L knock-in mutation: differential effects on Aβ production, amyloid deposition, and neuronal vulnerability," Journal of Neuroscience, Dec. 1, 2000, 20(23):8717-26.
Song et al., "Proteolytic release and nuclear translocation of Notch-1 are induced by presenilin-1 and impaired by pathogenic presenilin-1 mutations," Proceedings of the National Academy of Sciences, Jun. 8, 1999, 96(12):6959-63.
Steiner et al., "A pathogenic presenilin-1 deletion causes abberrant Aβ42 production in the absence of congophilic amyloid plaques," Journal of Biological Chemistry, Mar. 9, 2001, 276(10):7233-9.
Sun et al., "Analysis of 138 pathogenic mutations in presenilin-1 on the in vitro production of Aβ42 and Aβ40 peptides by γ- secretase," Proceedings of the National Academy of Sciences, Jan. 24, 2017, 114(4):E476-85.
Sun et al., "Hippocampal spatial memory impairments caused by the familial Alzheimer's disease-linked presenilin 1 M146V mutation," Neurodegenerative Diseases, Aug. 2005, 2(1):6-15.
Szymczak et al., "Correction of multi-gene deficiency in vivo using a single 'self-cleaving' 2A peptide-based retroviral vector," Nature Biotechnology, May 2004, 22(5):589-94.
Tabuchi et al., "Conditional forebrain inactivation of nicastrin causes progressive memory impairment and age-related neurodegeneration," Journal of Neuroscience, Jun. 3, 2009, 29(22):7290-301.
Théry et al., "Isolation and characterization of exosomes from cell culture supernatants and biological fluids," Current Protocols in Cell Biology, Mar. 2006, 30(1):3-22.
Trichas et al., "Use of the viral 2A peptide for bicistronic expression in transgenic mice," BMC Biology, Dec. 2008, 6(1):1-3.
Tysoe et al., "A presenilin-1 truncating mutation is present in two cases with autopsy-confirmed early-onset Alzheimer disease," The American Journal of Human Genetics, Jan. 1, 1998, 62(1):70-6.
Virovic et al., "Novel delivery methods for treatment of viral hepatitis: an update," Expert Opinion on Drug Delivery, Jul. 1, 2005, 2(4):707-17.
Waldenström et al., "Cardiomyocyte microvesicles contain DNA/RNA and convey biological messages to target cells. PloS one," Apr. 10, 2012, 7(4):e34653, 7 pages.
Walker et al., "Presenilin 2 familial Alzheimer's disease mutations result in partial loss of function and dramatic changes in Aβ 42/40 ratios," Journal of Neurochemistry, Jan. 2005, 92(2):294-301.
Watanabe et al., "Dominant negative mechanism of Presenilin-1 mutations in FAD," Proceedings of the National Academy of Sciences, Nov. 28, 2017, 114(48):12635-7.
Watanabe et al., "Familial frontotemporal dementia-associated presenilin-1 c. 548G> T mutation causes decreased mRNA expression and reduced presenilin function in knock-in mice," Journal of Neuroscience, Apr. 11, 2012, 32(15):5085-96.
Watanabe et al., "Indirect regulation of presenilins in CREB-mediated transcription," Journal of Biological Chemistry, May 15, 2009, 284(20):13705-13.
Watanabe et al., "Partial loss of presenilin impairs age-dependent neuronal survival in the cerebral cortex," Journal of Neuroscience, Nov. 26, 2014, 34(48):15912-22.
Wiley et al., "Familial Alzheimer's disease mutations inhibit γ-secretase-mediated liberation of β-amyloid precursor protein carboxy-terminal fragment," Journal of Neurochemistry, Sep. 2005, 94(5):1189-201.
Wines-Samuelson et al., "Characterization of age-dependent and progressive cortical neuronal degeneration in presenilin conditional mutant mice," PLoS One, Apr. 15, 2010, 5(4):e10195.
Wines-Samuelson et al., "Presenilins in the developing, adult, and aging cerebral cortex," The Neuroscientist, Oct. 2005, 11(5):441-51.
Wines-Samuelson et al., "Role of presenilin-1 in cortical lamination and survival of Cajal-Retzius neurons," Developmental Biology, Jan. 15, 2005, 277(2):332-46.
Wu et al., "Presenilins regulate calcium homeostasis and presynaptic function via ryanodine receptors in hippocampal neurons," Proceedings of the National Academy of Sciences, Sep. 10, 2013, 110(37):15091-6.
Xia et al., "Loss of Aβ43 production caused by presenilin-1 mutations in the knockin mouse brain," Neuron, Apr. 20, 2016, 90(2):417-22.
Xia et al., "Presenilin-1 knockin mice reveal loss-of-function mechanism for familial Alzheimer's disease," Neuron, Mar. 4, 2015, 85(5):967-81.
Xia, "Relationship between presenilinase and gamma-secretase," Drug News & Perspectives, Mar. 1, 2003, 16(2):69-74.
Yu et al., "APP processing and synaptic plasticity in presenilin-1 conditional knockout mice," Neuron, Sep. 13, 2001, 31(5):713-26.
Zhang et al., "Inactivation of presenilins causes pre-synaptic impairment prior to post-synaptic dysfunction," Journal of Neurochemistry, Dec. 2010, 115(5):1215-21.
Zhang et al., "Mutation of the conserved N-terminal cysteine (Cys92) of human presenilin 1 causes increased Aβ42 secretion in mammalian cells but impaired Notch/lin-I2 signalling in C. elegans," Neuroreport, Sep. 28, 2000, 11(14):3227-30.
Zhang et al., "Presenilins are essential for regulating neurotransmitter release," Nature, Jul. 2009, 460(7255):632-6.
Zhao et al., "Mechanisms of recognition of amyloid-β (Aβ) monomer, oligomer, and fibril by homologous antibodies," Journal of Biological Chemistry, Nov. 3, 2017. 292(44):18325-43.
Zhou et al., "Dominant negative effect of the loss-of-function γ-secretase mutants on the wild-type enzyme through heterooligomerization," Proceedings of the National Academy of Sciences, Nov. 28, 2017, 114(48):12731-6.
Zimmermann et al., "Electrolyte-and pH-stabilities of aqueous solid lipid nanoparticle (SLN™) dispersions in artificial gastrointestinal media," European Journal of Pharmaceutics and Biopharmaceutics, Sep. 1, 2001, 52(2):203-10.
Bird et al., "Wide range in age of onset for chromosome 1-related familial Alzheimer's disease," Annals of Neurology, Dec. 1996, 40(6):932-936.
Cai et al., "Mutations in presenilin 2 and its implications in Alzheimer's disease and other dementia-associated disorders," Clinical Interventions in Aging, Jul. 2015, 10:1163-1172.
Chen et al., "Enhancing the Utility of Adeno-Associated Virus Gene Transfer through Inducible Tissue-Specific Expression," Human Gene Therapy Methods, Aug. 2013, 24(4):270-278.
Colin et al., "Engineered lentiviral vector targeting astrocytes in vivo," Glia, Apr. 2009, 57(6):667-79.
Dana et al., "Molecular mechanisms and biological functions of siRNA," International Journal of Biomedical Science, Jun. 2017, 13(2):48-57.
Elbashir et al., "Duplexes of 21± nucleotide RNAs mediate RNA interference in cultured mammalian cells," Nature, May 2001, 411:494-498.
Gray et al., "Optimizing promoters for recombinant adeno-associated virus-mediated gene expression in the peripheral and central nervous system using self-complementary vectors," Human Gene Therapy, Sep. 2011, 22:1143-1153.
Karabinos et al., "Essential roles for four cytoplasmic intermediate filament proteins in Caenorhabditis elegans development," Proceedings of the National Academy of Sciences of the United States of America, Jul. 2001, 98(14):7863-7868.
Lanoiselée et al., "APP, PSEN1, and PSEN2 mutations in early onset Alzheimer disease: A genetic screening study of familial and sporadic cases," PLOS Medicine, Mar. 2017, 14(3):e102270, 16 pages.
Ling et al., "Enhanced transgene expression from recombinant single-stranded D-sequence-substituted adeno-associated virus vectors in human cell lines in vitro and in murine hepatocytes in vivo," Journal of Virology, Jan. 2015, 89(2):952-61.
Matsushita et al., "Adeno-associated virus vectors can be efficiently produced without helper virus," Gene Therapy, Jul. 1998, 5:938-945.
PCT International Preliminary Report on Patentability in International Appln. No. PCT/US2020/062394, mailed on May 17, 2022, 7 pages.

(56) References Cited

OTHER PUBLICATIONS

PCT International Preliminary Report on Patentability in International Appln. No. PCT/US2021/015911, mailed on Jul. 28, 2022, 9 pages.
PCT International Search Report and Written Opinion in International Appln. No. PCT/US2021/015911, mailed on Jun. 30, 2021, 14 pages.
PCT International Search Report and Written Opinion in International Appln. No. PCT/US2020/062394, mailed on Apr. 28, 2021, 15 pages.
Perez-Pinera et al., "RNA-guided gene activation by CRISPR-Cas9-based transcription factors," Oct. 2013, Nature Methods, 2013, 10(10):973-976. doi: 10.1038/nmeth.2600.
Sen et al., "Improved adeno-associated virus (AAV) serotype 1 and 5 vectors for gene therapy," Scientific Reports, May 2013, 3:1832, DOI:10.1038/srep01832, 1-6.
Sherrington et al., "Alzheimer's disease associated with mutations in presenilin 2 is rare and variably penetrant," Jul. 1996, 5(7):985-988.
Wang et al., "Rescue and replication of adeno-associated virus type 2 as well as vector DNA sequences from recombinant plasmids containing deletions in the viral inverted terminal repeats: Selective encapsidation of viral genomes in progeny virions," Journal of Virology, Mar. 1996, 70(3):1668-1677.
Wang et al., "Rescue and replication signals of the adeno-associated virus 2 genome," Journal of Molecular Biology, Jul. 1995, 250(5):573-580.
Xia et al., "Presenilin-1 knockin mice reveal loss-of-function mechanism for familial Alzheimer's disease," Neuron, Mar. 2015, 85(5):967-981.
Xiao et al., "Production of high-titer recombinant adeno-associated virus vectors in the absence of helper adenovirus," Journal of Virology, Mar. 1998, 72(3):2224-2232.
CN Office Action in Chinese Appln. No. 201980049127.3, mailed on Oct. 30, 2023, 26 pages (with English translation).
EP Partial European Search Report in European Appln. No. 20893982.7, mailed on Nov. 15, 2023, 14 pages.
NCBI sequence NM_000021.3, "*Homo sapiens* presenilin 1 (PSEN1), transcript variant 1, mRNA," dated Dec. 18, 2017, 7 pages.
NCBI reference sequence : NM_007318.2, "*Homo sapiens* presenilin 1 (PSEN1), transcript variant 2, mRNA," dated Jun. 18, 2017, 7 pages.
Wang et al., "Visualization of Alzheimer's disease related $\alpha$-/$\beta$-/$\gamma$-secretase ternary complex by bimolecular fluorescence complementation based fluorescence resonance energy transfer," Frontiers in Molecular Neuroscience, Nov. 2018, 11:431, 9 pages.
CN Office Action in Chinese Appln. No. 202080052274.9, mailed on Mar. 12, 2024, 9 pages (with English translation).
EP Extended European Search Report in European Appln. No. 21747911.2, mailed on Mar. 14, 2024, 11 pages.
Millington-Ward et al., "Suppression and replacement gene therapy for autosomal dominant disease in a murine model of dominant retinitis pigmentosa," Molecular Therapy, Apr. 2011, 19(4):642-9.
Pelletier et al., "RNA based gene therapy for dominantly inherited diseases," Current Gene Therapy, Feb. 2006, 6(1):131-46.
Pimenova et al., "Novel presenilin 1 and 2 double knock-out cell line for in vitro validation of PSEN1 and PSEN2 mutations," Neurobiology of Disease, Feb. 2020, 138, 24 pages.
Sierant et al., "Specific silencing of L392V PSEN1 mutant allele by RNA interference," International Journal of Alzheimer's Disease, Jan. 2011, vol. 2011, 14 pages.
Trochet et al., "Therapy for dominant inherited diseases by allele-specific RNA interference: successes and pitfalls," Current Gene Therapy, Oct. 2015, 15(5):503, 27 pages.
JP Office Action in Japanese Appln. No. 2020-565341, mailed on Jan. 9, 2024, 14 pages (with English translation).
Montenegro et al., "Human Presenilin-1 delivered by AAV9 rescues impaired $\gamma$-secretase activity, memory deficits, and neurodegeneration in Psen mutant mice," Proceedings of the National Academy of Sciences, Oct. 2023, 120(42):e2306714120, 8 pages.
CN Office Action in Chinese Appln. No. 201980049127.3, mailed on Jul. 16, 2024, 14 pages (with English translation).
Castle et al., "Controlling AAV tropism in the nervous system with natural and engineered capsids," Gene Therapy for Neurological Disorders: Methods and Protocols, Jan. 2016, 133-49.
CN Office Action in Chinese Appln. No. 201980049127.3, mailed on Apr. 25, 2024, 9 pages (with English translation).
EP Extended European Search Report in European Appln. No. 20893982.7, mailed on May 2, 2024, 14 pages.
Haery et al., Adeno-associated virus technologies and methods for targeted neuronal manipulation. Frontiers in Neuroanatomy, Nov. 2019, 13:493120, 16 pages.
IL Office Action in Israeli Appln. No. 278813, mailed on Jul. 21, 2024, 4 pages (English translation).
JP Office Action in Japanese Appln. No. 2021-569550, mailed on May 28, 2024, 8 pages (with English translation).
CN Office Action in Chinese Appln. No. 201980049127.3, mailed on Dec. 18, 2024, 16 pages (with English translation).
Wang et al., "An mRNA stability complex functions with poly (A)-binding protein to stabilize mRNA in vitro," Molecular and Cellular Biology, Jul. 1999, 19(7):4552-60.
AU Office Action in Australian Appln. No. 2019272848, mailed on Oct. 29, 2024, 5 pages.
CN Office Action in Chinese Appln. No. 202080052274.9, mailed on Sep. 26, 2024, 7 pages (with English translation).
Bäck et al., "Neuronal activation stimulates cytomegalovirus promoter-driven transgene expression," Molecular Therapy Methods & Clinical Development, Sep. 2019, 14:180, 13 pages.
CA Office Action in Canadian Appln. No. 3,100,946, mailed on Feb. 5, 2025, 5 pages.
Emery, "The use of chromatin insulators to improve the expression and safety of integrating gene transfer vectors," Human Gene Therapy, Jun. 2011, 22(6):761-74.
Honda et al., "The modeling of Alzheimer's disease by the overexpression of mutant Presenilin 1 in human embryonic stem cells," Biochemical and Biophysical Research Communications, Jan. 2016, 469(3):587-92.
JP Office Action in Japanese Appln. No. 2021-569550, mailed on Jan. 14, 2025, 3 pages (with English translation).
Kim et al., "Human β-Globin Second Intron Highly Enhances Expression of Foreign Genes from Murine Cytomegalovirus Immediate-Early Promoter," Journal of Microbiology and Biotechnology, Jan. 2005, 15(3):544-50.
Leppek et al., "Functional 5' UTR mRNA structures in eukaryotic translation regulation and how to find them," Nature Reviews Molecular Cell Biology, Mar. 2018, 19(3):158, 36 pages.
Naso et al., "Adeno-associated virus (AAV) as a vector for gene therapy," BioDrugs, Aug. 2017, 31(4):317-34.
Ólafsdóttir et al., "In vitro analysis of expression vectors for DNA vaccination of horses: the effect of a Kozak sequence," Acta Veterinaria Scandinavica, Dec. 2008, 50:1-7.
Pesole et al., "UTRdb and UTRsite: specialized databases of sequences and functional elements of 5' and 3' untranslated regions of eukaryotic mRNAs, Update 2002," Nucleic Acids Research, Jan. 2002, 30(1):335-40.
Sun et al., "Analysis of 138 pathogenic mutations in presenilin-1 on the in vitro production of Aβ42 and Aβ40 peptides by $\gamma$-secretase," Proceedings of the National Academy of Sciences, Jan. 2017, 114(4):E476-85.
Tenchov et al., "Lipid nanoparticles—from liposomes to mRNA vaccine delivery, a landscape of research diversity and advancement," ACS Nano, Jun. 2021, 15(11):16982-7015.
Yang et al., "Influence of solubilization and AD-mutations on stability and structure of human presenilins," Scientific Reports, Dec. 2017, 7(1): 17970, 12 pages.
AU Office Action in Australian Appln. No. 2020285638, mailed on May 1, 2025, 4 pages.
Diss et al., "The genetic landscape of a physical interaction," Elife, Apr. 2018, 7:e32472, 31 pages.
Dryja et al., "Mutations within the rhodopsin gene in patients with autosomal dominant retinitis pigmentosa," New England Journal of Medicine, Nov. 1990, 323(19):1302-7.

(56) References Cited

OTHER PUBLICATIONS

EP Office Action in European Appln. No. 19808081.4, mailed on Apr. 23, 2025, 6 pages.
Borel et al., "Recombinant AAV as a platform for translating the therapeutic potential of RNA interference," Molecular Therapy, Apr. 2014, 22(4):692-701.
Kilikevicius et al., "Reexamining assumptions about miRNA-guided gene silencing," Nucleic Acids Research, Jan. 2022, 50(2):617-34.
O'Reilly et al., "RNA interference-mediated suppression and replacement of human rhodopsin in vivo," The American Journal of Human Genetics, Jul. 2007, 81(1):127-35.
Riolo et al., "miRNA targets: from prediction tools to experimental validation," Methods and Protocols, Dec. 2020, 4(1):1, 20 pages.
Seok et al., "MicroRNA target recognition: insights from transcriptome-wide non-canonical interactions," Molecules and Cells, May 2016, 39(5):375-81.
SG Office Action in Singaporean Appln. No. 11202205560S, mailed on Jun. 5, 2025, 12 pages.

\* cited by examiner

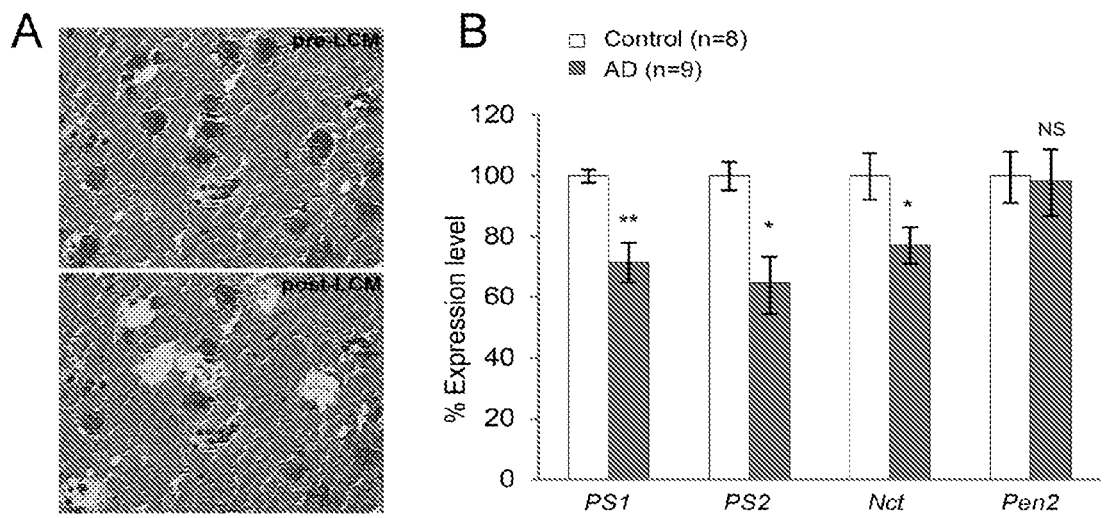
FIGs. 1A-B
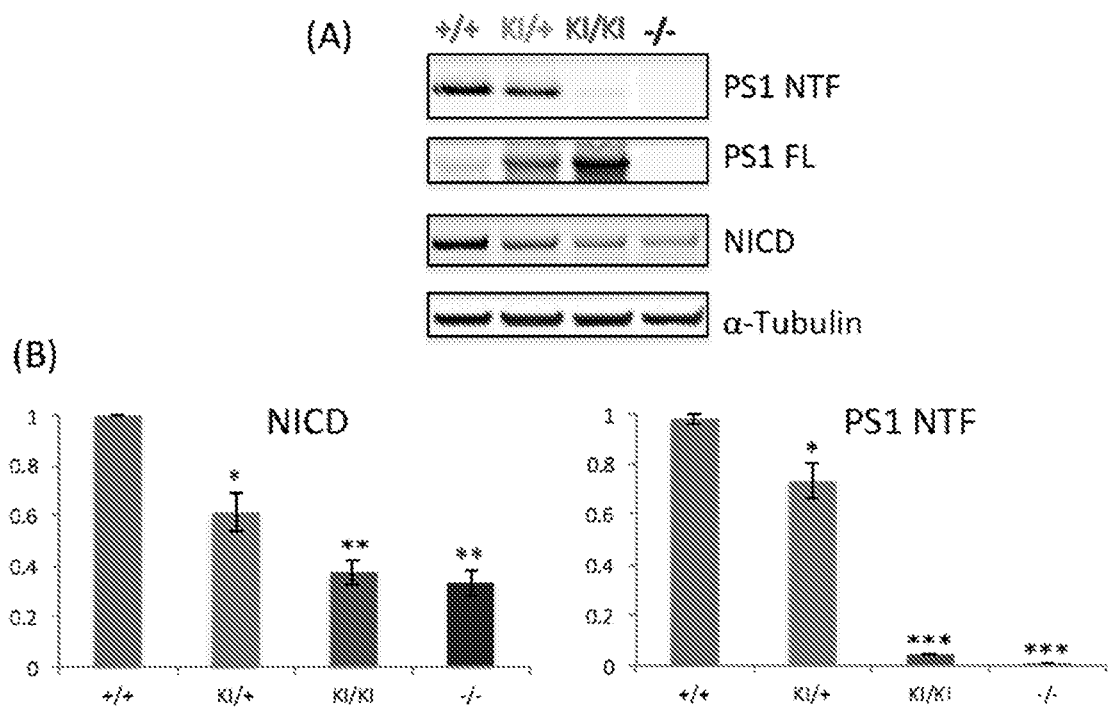
FIGs. 2A-B

SEQUENCE LISTING

<160> NUMBER OF SEQ ID NOS: 17

<210> SEQ ID NO 1
<211> LENGTH: 6107
<212> TYPE: DNA
<213> ORGANISM: Homo sapiens

<400> SEQUENCE: 1

| | | | | | | |
|---|---|---|---|---|---|---|
| aaatgacgac | aacggtgagg | gttctcgggc | ggggcctggg | acaggcagct | ccggggtccg | 60 |
| cggtttcaca | tcggaaacaa | aacagcggct | ggtctggaag | gaacctgagc | tacgagccgc | 120 |
| ggcggcagcg | gggcggcggg | gaagcgtata | cctaatctgg | gagcctgcaa | gtgacaacag | 180 |
| cctttgcggt | ccttagacag | cttggcctgg | aggagaacac | atgaaagaaa | gaacctcaag | 240 |
| aggctttgtt | ttctgtgaaa | cagtatttct | atacagttgc | tccaatgaca | gagttacctg | 300 |
| caccgttgtc | ctacttccag | aatgcacaga | tgtctgagga | caaccacctg | agcaatactg | 360 |
| tacgtagcca | gaatgacaat | agagaacggc | aggagcacaa | cgacagacgg | agccttggcc | 420 |
| accctgagcc | attatctaat | ggacgacccc | agggtaactc | ccggcaggtg | gtggagcaag | 480 |
| atgaggaaga | agatgaggag | ctgacattga | aatatgcgcg | caagcatgtg | atcatgctct | 540 |
| ttgtccctgt | gactctctgc | atggtggtgg | tcgtggctac | cattaagtca | gtcagctttt | 600 |
| atacccggaa | ggatgggcag | ctaatctata | ccccattcac | agaagatacc | gagactgtgg | 660 |
| gccagagagc | cctgcactca | attctgaatg | ctgccatcat | gatcagtgtc | attgttgtca | 720 |
| tgactatcct | cctggtggtt | ctgtataaat | acaggtgcta | taaggtcatc | catgcctggc | 780 |
| ttattatatc | atctctattg | ttgctgttct | ttttttcatt | catttacttg | ggggaagtgt | 840 |
| ttaaaaccta | taacgttgct | gtggactaca | ttactgttgc | actcctgatc | tggaattttg | 900 |
| gtgtggtggg | aatgatttcc | attcactgga | aggtccact | tcgactccag | caggcatatc | 960 |
| tcattatgat | tagtgccctc | atggccctgg | tgtttatcaa | gtacctccct | gaatggactg | 1020 |
| cgtggctcat | cttggctgtg | atttcagtat | atgatttagt | ggctgttttg | tgtccgaaag | 1080 |
| gtccacttcg | tatgctggtt | gaaacagctc | aggagagaaa | tgaaacgctt | tttccagctc | 1140 |
| tcatttactc | ctcaacaatg | gtgtggttgg | tgaatatggc | agaaggagac | ccggaagctc | 1200 |
| aaaggagagt | atccaaaaat | tccaagtata | atgcagaaag | cacagaaagg | gagtcacaag | 1260 |
| acactgttgc | agagaatgat | gatggcgggt | tcagtgagga | atgggaagcc | cagagggaca | 1320 |
| gtcatctagg | gcctcatcgc | tctacacctg | agtcacgagc | tgctgtccag | gaactttcca | 1380 |
| gcagtatcct | cgctggtgaa | gacccagagg | aaagggagt | aaaacttgga | ttgggagatt | 1440 |
| tcatttctcta | cagtgttctg | gttggtaaag | cctcagcaac | agccagtgga | gactggaaca | 1500 |
| caaccatagc | ctgtttcgta | gccatattaa | ttggtttgtg | ccttacatta | ttactccttg | 1560 |
| ccattttcaa | gaaagcattg | ccagctcttc | caatctccat | caccctttggg | cttgttttct | 1620 |
| actttgccac | agattatctt | gtacagcctt | ttatggacca | attagcattc | catcaatttt | 1680 |
| atatctagca | tatttgcggt | tagaatccca | tggatgtttc | ttctttgact | ataacaaaat | 1740 |
| ctggggagga | caaaggtgat | tttcctgtgt | ccacatctaa | caaagtcaag | attcccggct | 1800 |
| ggacttttgc | agcttccttc | caagtcttcc | tgaccacctt | gcactattgg | actttggaag | 1860 |
| gaggtgccta | tagaaaacga | ttttgaacat | acttcatcgc | agtggactgt | gtccctcggt | 1920 |
| gcagaaacta | ccagatttga | gggacgaggt | caaggagata | tgataggccc | ggaagttgct | 1980 |
| gtgccccatc | agcagcttga | cgcgtggtca | caggacgatt | tcactgacac | tgcgaactct | 2040 |
| caggactacc | gttaccaaga | ggttaggtga | agtggtttaa | accaaacgga | actcttcatc | 2100 |

```
ttaaactaca cgttgaaaat caacccaata attctgtatt aactgaattc tgaactttc    2160
aggaggtact gtgaggaaga gcaggcacca gcagcagaat ggggaatgga gaggtgggca    2220
ggggttccag cttccctttg attttttgct gcagactcat cctttttaaa tgagacttgt    2280
tttccctct ctttgagtca agtcaaatat gtagattgcc tttggcaatt cttcttctca     2340
agcactgaca ctcattaccg tctgtgattg ccatttcttc ccaaggccag tctgaacctg    2400
aggttgcttt atcctaaaag ttttaacctc aggttccaaa ttcagtaaat tttgaaaaca    2460
gtacagctat ttctcatcaa ttctctatca tgttgaagtc aaatttggat tttccaccaa    2520
attctgaatt tgtagacata cttgtacgct cacttgcccc agatgcctcc tctgtcctca    2580
ttcttctctc ccacacaagc agtcttttc tacagccagt aaggcagctc tgtcgtggta     2640
gcagatggtc ccattattct agggtcttac tctttgtatg atgaaaagaa tgtgttatga    2700
atcggtgctg tcagccctgc tgtcagacct tcttccacag caaatgagat gtatgcccaa    2760
agacggtaga attaaagaag agtaaaatgg ctgttgaagc actttctgtc ctggtatttt    2820
gttttttgctt ttgccacaca gtagctcaga atttgaacaa atagccaaaa gctggtggtt   2880
gatgaattat gaactagttg tatcaacaca aagcaagagt tggggaaagc catatttaac    2940
ttggtgagct gtgggagaac ctggtggcag aaggagaacc aactgccaag ggaaagaga    3000
aggggcctcc agcagcgaag gggatacagt gagctaatga tgtcaaggag gagtttcagg    3060
ttattctcgt cagctccaca aatgggtgct ttgtggtctc tgcccgcgtt accttcctc     3120
tcaatgtacc tttgtgtgaa ctgggcagtg gaggtgcctg ctgcagttac catggagttc    3180
aggctctggg cagctcagtc aggcaaaaca cacaaacagc catcagcctg tgtgggctca    3240
gggcacctct ggacaaaggc ttgtggggca taaccttctt taccacagag agcccttagc    3300
tatgctgatc agaccgtaag cgtttatgag aaacttagtt tcctcctgtg gctgaggagg    3360
ggccagcttt ttcttctttt gcctgctgtt ttctctccca atctatgata tgatatgacc    3420
tggtttgggg ctgtctttgg tgtttagaat atttgttttc tgtcccagga tatttcttat    3480
aagaacctaa cttcaagagt agtgtgcgag tactgatctg aatttaaatt aaaattggct    3540
tatattaggc agtcacagac aggaaaaata agagctatgc aaagaaaggg ggatttaaag    3600
tagtaggttc tatcatctca attcattttt ttccatgaaa tcccttcttc caagattcat    3660
tccctctctc agacatgtgc tagcatgggt attatcattg agaaagcaca gctacagcaa    3720
agccacctga atagcaattt gtgattggaa gcattcttga gggatcccta atctagagta    3780
atttatttgt gtaaggatcc caaatgtgtt gcacctttca tgatacattt cttctctgaa    3840
gagggtacgt ggggtgtgtg tatttaaatc catcctatgt attactgatt gtcctgtgta    3900
gaaagatggc aattattctg tctctttctc caagtttgag ccacatctca gccacattgt    3960
tagacagtgt acagagaacc tatctttcct ttttttttt taaaggaca ggattttgct     4020
gtgttgccca ggctagactt gaactcctgg gctcaagtaa tccacctcag cctgagtagc    4080
tgagactaca gcccatctta tttctttaaa tcattcatct caggcagaga acttttccct    4140
caaacattct ttttgaaatt agttcagtca ttcctaaaac atccaaatgc tagtcttcca    4200
ccatgaaaaa tagattgtca ctggaaagaa cagtagcaat ttccataagg atgtgccttc    4260
actcacacgg gacaggcggt ggttatagag tcgggcaaaa ccagcagtag agtatgacca    4320
gccaagccaa tctgcttaat aaaaagatgg aagacagtaa ggaaggaaag tagccactaa    4380
gagtctgagt ctgactgggc tacagaataa agggtattta tggacagaat gtcattacat    4440
```

-continued

```
gcctatggga ataccaatca tatttggaag atttgcagat ttttttttcag agaggaaaga     4500 ctcaccttcc tgttttttggt tctcagtagg ttcgtgtgtg ttcctagaat cacagctctg     4560
actccaaatg actcaatttc tcaattagaa aaagtagaag ctttctaagc aacttggaag     4620
aaaacagtca taagtaagca atttgttgat tttactacag aagcaacaac tgaagaggca     4680 gtgttttttac tttcagactc cgggattccc attctgtagt ctctctgctt ttaaaaaccc     4740 tcctttttgca atagatgccc aaacagatga tgtttattac tgttattta cgtggcctca     4800 gacagtgtat gtattctcga tataacttgt agagtgtgaa atataagttt aactaccaaa     4860
taaggtctcc cagggttaga tgactgcggg aagcctttga tcccaacccc caaggctttg     4920
tatatttgat catttgtgat ctaaccctgg aagaaaaaga gctcagaaac cactatgaaa     4980
aaatttgttc agtgttttct gtgttcccgt aggttctgga gtctgaggat gcaaagatga     5040
ataagataaa ttctcagaat gtagttataa tctcttgttt tctggtatat gccatctttc     5100
tttaacttct ctaaaatatt gggtatttgt caaataacca cttttaacag ttaccattac     5160
tgagggctta tacattggtg ttataaaagt gacttgattc agaaatcaat ccattcagta     5220
aagtactcct tctctaaatt tgctgttatg tctataagga acagtttgac ctgcccttct     5280
cctcacctcc tcacctgcct tccaacattg aatttggaag gagacgtgaa aattggacat     5340
ttggttttgc ccttgggctg gaaactatca tataatcata agtttgagcc tagaagtgat     5400
ccttgtgatc ttctcacctc tttaaattcc cacaacacaa gagattaaaa acagaggttt     5460
cagctcttca tagtgcgttg tgaaatggct ggccagagtg taccaacaaa gctgtcatcg     5520
ggctcacagc tcagagacat ctgcatgtga tcatctgcat agtcctctcc tctaacggga     5580
aacacctcag atttgcatat aaaaaagcac cctggtgctg aaatgaaccc ctttcttgaa     5640
catcaaagct gtctcccaca gccttgggca gcagggtgcc tcttagtgga tgtgctgggt     5700
ccaccctgag ccctgacatg tggtggcagc attgccagtt ggtctgtgtg tctgtgtagc     5760
agggacgatt tcccagaaag caattttcct tttgaaatac gtaattgttg agactaggca     5820
gtttcaaagt cagctgcata tagtagcaag tacaggactg tcttgttttt ggtgtccttg     5880
gaggtgctgg ggtgagggtt tcagtgggat catttactct cacatgttgt ctgccttctg     5940
cttctgtgga cactgctttg tacttaattc agacagactg tgaatacacc ttttttataa     6000 ataccttttca aattcttggt aagatataat tttgatagct gattgcagat tttctgtatt     6060
tgtcagatta ataaagactg catgaatcca aaaaaaaaaa aaaaaaa                   6107
```

<210> SEQ ID NO 2
<211> LENGTH: 6095
<212> TYPE: DNA
<213> ORGANISM: Homo sapiens

<400> SEQUENCE: 2

```
aaatgacgac aacggtgagg gttctcgggc ggggcctggg acaggcagct ccggggtccg       60
cggtttcaca tcggaaacaa aacagcggct ggtctggaag gaacctgagc tacgagccgc      120
ggcggcagcg gggcggcggg gaagcgtata cctaatctgg gagcctgcaa gtgacaacag      180
cctttgcggt ccttagacag cttggcctgg aggagaacac atgaaagaaa gaacctcaag      240
aggctttgtt ttctgtgaaa cagtatttct atacagttgc tccaatgaca gagttacctg      300
caccgttgtc ctacttccag aatgcacaga tgtctgagga caaccacctg agcaatacta      360 atgacaaatag agaacggcag gagcacaacg acagacggaa ccttggccac cctgagccat      420
tatctaatgg acgaccccag ggtaactccc ggcaggtggt ggagcaagat gaggaagaag      480
```

```
atgaggagct gacattgaaa tatggcgcca agcatgtgat catgctcttt gtccctgtga      540
ctctctgcat ggtggtggtc gtggctacca ttaagtcagt cagcttttat acccggaagg      600
atgggcagct aatctatacc ccattcacag aagataccga gactgtgggc cagagagccc      660
tgcactcaat tctgaatgct gccatcatga tcagtgtcat tgttgtcatg actatcctcc      720
tggtggttct gtataaatac aggtgctata aggtcatcca tgcctggctt attatatcat      780
ctctattgtt gctgttcttt ttttcattca tttacttggg ggaagtgttt aaaacctata      840
acgttgctgt ggactacatt actgttgcac tcctgatctg aattttggt gtggtgggaa       900 tgatttccat tcactggaaa ggtccacttc gactccagca ggcatatctc attatgatta      960
gtgccctcat ggccctggtg tttatcaagt acctccctga atggactgcg tggctcatct     1020
tggctgtgat tcagtatat gatttagtgg ctgttttgtg tccgaaaggt ccacttcgta      1080
tgctggttga acagctcag gagagaaatg aaacgctttt tccagctctc atttactcct      1140
caacaatggt gtggttggtg aatatggcag aaggagaccc ggaagctcaa aggagagtat     1200
ccaaaaattc caagtataat gcagaaagca cagaaaggga gtcacaagac actgttgcag     1260
agaatgatga tggcgggttc agtgaggaat gggaagccca gggacagt catctagggc       1320 ctcatcgctc tacacctgag tcacgagctg ctgtccagga actttccagc agtatcctcg     1380
ctggtgaaga cccagaggaa aggggagtaa aacttggatt gggagatttc attttctaca     1440
gtgttctggt tggtaaagcc tcagcaacag ccagtggaga ctggaacaca accatagcct     1500
gtttcgtagc catattaatt ggtttgtgcc ttacattatt actccttgcc attttcaaga     1560
aagcattgcc agctcttcca atctccatca cctttgggct tgttttctac tttgccacag     1620
attatcttgt acagcctttt atggaccaat tagcattcca tcaattttat atctagcata     1680
tttgcggtta gaatcccatg gatgtttctt ctttgactat aacaaaatct ggggaggaca     1740
aaggtgattt tcctgtgtcc acatctaaca aagtcaagat tcccggctgg acttttgcag     1800
cttccttcca agtcttcctg accaccttgc actattggac tttggaagga ggtgcctata     1860
gaaaacgatt tgaacatac ttcatcgcag tggactgtgt ccctcggtgc agaaactacc      1920
agatttgagg gacgaggtca aggagatatg ataggcccgg aagttgctgt gccccatcag     1980
cagcttgacg cgtggtcaca ggacgatttc actgacactg cgaactctca ggactaccgt     2040
taccaagagg ttaggtgaag tggtttaaac caaacgaaac tcttcatctt aaactacacg     2100
ttgaaaatca acccaataat tctgtattaa ctgaattctg aactttttcag gaggtactgt     2160 gaggaagagc aggcaccagc agcagaatgg ggaatggaga ggtgggcagg ggttccagct     2220
tccctttgat ttttgctgc agactcatcc ttttaaatg agacttgttt tcccctctct       2280
ttgagtcaag tcaaatatgt agattgcctt tggcaattct tcttctcaag cactgacact     2340
cattaccgtc tgtgattgcc atttcttccc aaggccagtc tgaacctgag gttgctttat     2400
cctaaaagtt ttaacctcag gttccaaatt cagtaaattt tggaaacagt acagctattt     2460
ctcatcaatt ctctatcatg ttgaagtcaa atttggattt tccaccaaat tctgaatttg     2520
tagacatact tgtacgctca cttgccccag atgcctcctc tgtcctcatt cttctctccc     2580
acacaagcag tcttttcta cagccagtaa ggcagctctg tcgtggtagc agatggtccc      2640
attattctag ggtcttactc tttgtatgat gaaaagaatg tgttatgaat cggtgctgtc     2700
agccctgctg tcagaccttc ttccacagca aatgagatgt atgcccaaag acggtagaat     2760
taaagaagag taaaatggct gttgaagcac tttctgtcct ggtattttgt ttttgctttt     2820
```

```
gccacacagt agctcagaat ttgaacaaat agccaaaagc tggtggttga tgaattatga    2880
actagttgta tcaacacaaa gcaagagttg gggaaagcca tatttaactt ggtgagctgt    2940
gggagaacct ggtggcagaa ggagaaccaa ctgccaaggg gaaagagaag gggcctccag    3000
cagcgaaggg gatacagtga gctaatgatg tcaaggagga gtttcaggtt attctcgtca    3060
gctccacaaa tgggtgcttt gtggtctctg cccgcgttac ctttcctctc aatgtacctt    3120
tgtgtgaact gggcagtgga ggtgcctgct gcagttacca tggagttcag gctctgggca    3180
gctcagtcag gcaaaacaca caaacagcca tcagcctgtg tgggctcagg gcacctctgg    3240
acaaaggctt gtggggcata accttcttta ccacagagag cccttagcta tgctgatcag    3300
accgtaagcg tttatgagaa acttagtttc ctcctgtggc tgaggagggg ccagcttttt    3360
cttcttttgc ctgctgtttt ctctcccaat ctatgatatg atatgacctg gtttggggct    3420
gtctttggtg tttagaatat ttgttttctg tcccaggata tttcttataa gaacctaact    3480
tcaagagtag tgtgcgagta ctgatctgaa tttaaattaa aattggctta tattaggcag    3540
tcacagacag gaaaaataag agctatgcaa agaaaggggg atttaaagta gtaggttcta    3600
tcatctcaat tcattttttt ccatgaaatc ccttcttcca agattcattc cctctctcag    3660
acatgtgcta gcatgggtat tatcattgag aaagcacagc tacagcaaag ccacctgaat    3720
agcaatttgt gattggaagc attcttgagg gatccctaat ctagagtaat ttatttgtgt    3780
aaggatccca aatgtgttgc accttcatg atacatttct tctctgaaga gggtacgtgg    3840
ggtgtgtgta tttaaatcca tcctatgtat tactgattgt cctgtgtaga aagatggcaa    3900
ttattctgtc tctttctcca agtttgagcc acatctcagc cacattgtta gacagtgtac    3960
agagaaccta tctttccttt tttttttttt aaaggacagg attttgctgt gttgcccagg    4020
ctagacttga actcctgggc tcaagtaatc cacctcagcc tgagtagctg agactacagc    4080
ccatcttatt tcttttaaatc attcatctca ggcagagaac ttttccctca acattctttt    4140
ttagaattag ttcagtcatt cctaaaacat ccaaatgcta gtcttccacc atgaaaaata    4200
gattgtcact ggaaagaaca gtagcaattt ccataaggat gtgccttcac tcacacggga    4260
caggcggtgg ttatagagtc gggcaaaacc agcagtagag tatgaccagc caagccaatc    4320
tgcttaataa aaagatggaa gacagtaagg aaggaaagta gccactaaga gtctgagtct    4380
gactgggcta cagaataaag ggtatttatg gacagaatgt cattacatgc ctatgggaat    4440
accaatcata tttggaagat ttgcagattt tttttcagag aggaaagact caccttcctg    4500
tttttggttc tcagtaggtt cgtgtgtgtt cctagaatca cagctctgac tccaaatgac    4560
tcaatttctc aattagaaaa agtagaagct ttctaagcaa cttggaagaa aacagtcata    4620
agtaagcaat ttgttgattt tactacagaa gcaacaactg aagaggcagt gttttttactt    4680 tcagactccg ggattcccat tctgtagtct ctctgctttt aaaaaccctc cttttgcaat    4740
agatgcccaa acagatgatg tttattactt gttatttacg tggcctcaga cagtgtatgt    4800
attctcgata taacttgtag agtgtgaaat ataagtttaa ctaccaaata aggtctccca    4860
gggttagatg actgcgggaa gcctttgatc ccaacccca aggctttgta tatttgatca    4920
tttgtgatct aaccctggaa gaaaagagc tcagaaacca ctatgaaaaa atttgttcag    4980
tgttttctgt gttcccgtag gttctggagt ctgaggatgc aaagatgaat aagataaatt    5040
ctcagaatgt agttataatc tcttgttttc tggtatatgc catctttctt taacttctct    5100
aaaatattgg gtatttgtca aataaccact tttaacagtt accattactg agggcttata    5160
cattggtgtt ataaaagtga cttgattcag aaatcaatcc attcagtaaa gtactccttc    5220
```

```
tctaaatttg ctgttatgtc tataaggaac agtttgacct gcccttctcc tcacctcctc    5280
acctgccttc aacattgaa tttggaagga dacgtgaaaa ttggacattt ggttttgccc    5340
ttgggctgga aactatcata taatcataag tttgagccta aagtgatcc ttgtgatctt    5400 ctcacctctt taaattccca caacacaaga gattaaaaac agaggtttca gctcttcata    5460
gtgcgttgtg aaatggctgg ccagagtgta ccaacaaagc tgtcatcggg ctcacagctc    5520
agagacatct gcatgtgatc atctgcatag tcctctcctc taacgggaaa cacctcagat    5580
ttgcatataa aaaagcaccc tggtgctgaa atgaaccct ttcttgaaca tcaaagctgt    5640
ctcccacagc cttgggcagc agggtgcctc ttagtgatg tgctgggtcc accctgagcc    5700
ctgacatgtg gtggcagcat tgccagttgg tctgtgtgtc tgtgtagcag ggacgatttc    5760
ccagaaagca attttccttt tgaaatacgt aattgttgag actaggcagt ttcaaagtca    5820
gctgcatata gtagcaagta caggactgtc ttgttttttgg tgtccttgga ggtgctgggg    5880
tgagggtttc agtgggatca tttactctca catgttgtct gccttctgct tctgtggaca    5940
ctgctttgta cttaattcag acagactgtg aatacacctt ttttataaat accttttcaaa    6000 ttcttggtaa gatataattt tgatagctga ttgcagattt tctgtatttg tcagattaat    6060
aaagactgca tgaatccaaa aaaaaaaaaa aaaaa                               6095
```

<210> SEQ ID NO 3
<211> LENGTH: 2302
<212> TYPE: DNA
<213> ORGANISM: Homo sapiens

<400> SEQUENCE: 3

```
ggggcctggg ccggcgccgg gtccggccgg gcgctcagcc agctgcgtaa actccgctgg      60
agcgcggcgg cagagcaggc atttccagca gtgaggagac agccagaagc aagcttttgg     120
agctgaagga acctgagaca gaagctagtc cccctctga atttactga tgaagaaact      180 gaggccacag agctaaagtg acttttccca aggtcgccca gcgaggacgt gggacttctc     240
agacgtcagg agagtgatgt gagggagctg tgtgaccata gaaagtgacg tgttaaaaac     300
cagcgctgcc ctcttgaaa gccagggagc atcattcatt tagcctgctg agaagaagaa     360
accaagtgtc cgggattcag acctctctgc ggccccaagt gttcgtggtg cttccagagg     420
cagggctatg ctcacattca tggcctctga cagcgaggaa gaagtgtgtg atgagcggac     480
gtccctaatg tcggctgaga gccccacgcc gcgctcctgc caggagggca ggcagggccc     540
agaggatgga gagaacactg cccagtggag aagccaggag aacgaggagg acggtgagga     600
ggaccctgac cgctatgtct gtagtggggt tcccgggcgg ccgccaggcc tggaggaaga     660
gctgaccctc aaatacggag cgaagcacgt gatcatgctg tttgtgcctg tcactctgtg     720
catgatcgtg gtggtagcca ccatcaagtc tgtgcgcttc tacacagaga gaatggacac     780
gctcatctac acgccattca ctgaggacac ccctcggtg ggccagcgcc tcctcaactc     840
cgtgctgaac accctcatca tgatcagcgt catcgtggtt atgaccatct tcttggtggt     900
gctctacaag taccgctgct acaagttcat ccatggctgg ttgatcatgt cttcactgat    960
gctgctgttc ctcttcacct atatctacct tggggaagtg ctcaagacct acaatgtggc    1020
catggactac cccaccctct tgctgactgt ctggaacttc ggggcagtgg gcatggtgtg    1080
catccactgg aagggccctc tggtgctgca gcaggcctac ctcatcatga tcagtgcgct    1140
catggcccta gtgttcatca agtacctccc agagtggtcc gcgtgggtca tcctgggcgc    1200
```

-continued

| | |
|---|---|
| catctctgtg tatgatctcg tggctgtgct gtgtcccaaa gggcctctga gaatgctggt | 1260 |
| agaaactgcc caggagagaa atgagcccat attccctgcc ctgatatact catctgccat | 1320 |
| ggtgtggacg gttggcatgg cgaagctgga cccctcctct cagggtgccc tccagctccc | 1380 |
| ctacgacccg gagatggaag aagactccta tgacagtttt ggggagcctt cataccccga | 1440 |
| agtctttgag cctcccttga ctggctaccc aggggaggag ctggaggaag aggaggaaag | 1500 |
| gggcgtgaag cttggcctcg gggacttcat cttctacagt gtgctggtgg gcaaggcggc | 1560 |
| tgccacgggc agcggggact ggaataccac gctggcctgc ttcgtggcca tcctcattgg | 1620 |
| cttgtgtctg accctcctgc tgcttgctgt gttcaagaag gcgctgcccg ccctccccat | 1680 |
| ctccatcacg ttcgggctca tcttttactt ctccacggac aacctggtgc ggccgttcat | 1740 |
| ggacaccctg gcctcccatc agctctacat ctgagggaca tggtgtgcca caggctgcaa | 1800 |
| gctgcaggga attttcattg gatgcagttg tatagtttta cactctagtg ccatatattt | 1860 |
| ttaagacttt tctttcctta aaaaataaag tacgtgttta cttggtgagg aggaggcaga | 1920 |
| accagctctt tggtgccagc tgtttcatca ccagactttg gctcccgctt tggggagcgc | 1980 |
| ctcgcttcac ggacaggaag cacagcaggt ttatccagat gaactgagaa ggtcagatta | 2040 |
| gggcggggag aagagcatcc ggcatgaggg ctgagatgcg caaagagtgt gctcgggagt | 2100 |
| ggcccctggc acctgggtgc tctggctgga gaggaaaagc cagttcccta cgaggagtgt | 2160 |
| tcccaatgct ttgtccatga tgtccttgtt attttattgc ctttagaaac tgagtcctgt | 2220 |
| tcttgttacg gcagtcacac tgctgggaag tggcttaata gtaatatcaa taaatagatg | 2280 |
| agtcctgtta gaatcttgaa aa | 2302 |

<210> SEQ ID NO 4
<211> LENGTH: 2299
<212> TYPE: DNA
<213> ORGANISM: Homo sapiens

<400> SEQUENCE: 4

| | |
|---|---|
| ggggcctggg ccggcgccgg gtccggccgg gcgctcagcc agctgcgtaa actccgctgg | 60 |
| agcgcggcgg cagagcaggc atttccagca gtgaggagac agccagaagc aagcttttgg | 120 |
| agctgaagga acctgagaca gaagctagtc cccctctga attttactga tgaagaaact | 180 |
| gaggccacag agctaaagtg acttttccca aggtcgccca gcgaggacgt gggacttctc | 240 |
| agacgtcagg agagtgatgt gagggagctg tgtgaccata gaaagtgacg tgttaaaaac | 300 |
| cagcgctgcc ctctttgaaa gccagggagc atcattcatt tagcctgctg agaagaagaa | 360 |
| accaagtgtc cgggattcag acctctctgc ggccccaagt gttcgtggtg cttccagagg | 420 |
| cagggctatg ctcacattca tggcctctga cagcgaggaa gaagtgtgtg atgagcggac | 480 |
| gtccctaatg tcggctgaga gccccacgcc gcgctcctgc caggagggca ggcagggccc | 540 |
| agaggatgga gagaacactg cccagtggag aagccaggag aacgaggagg acggtgagga | 600 |
| ggaccctgac cgctatgtct gtagtggggt tcccgggcgg ccgccaggcc tggaggaaga | 660 |
| gctgaccctc aaatacggag cgaagcacgt gatcatgctg tttgtgcctg tcactctgtg | 720 |
| catgatcgtg gtggtagcca ccatcaagtc tgtgcgcttc tacacagaga agaatggaca | 780 |
| gctcatctac acgccattca ctgaggacac accctcggtg ggccagcgcc tcctcaactc | 840 |
| cgtgctgaac accctcatca tgatcagcgt catcgtggtt atgaccatct tcttggtggt | 900 |
| gctctacaag taccgctgct acaagttcat ccatggctgg ttgatcatgt cttcactgat | 960 |
| gctgctgttc ctcttcacct atatctacct tggggaagtg ctcaagacct acaatgtggc | 1020 |

-continued

```
catggactac cccaccctct tgctgactgt ctggaacttc ggggcagtgg gcatggtgtg      1080
catccactgg aagggccctc tggtgctgca gcaggcctac ctcatcatga tcagtgcgct      1140
catggcccta gtgttcatca agtacctccc agagtggtcc gcgtgggtca tcctgggcgc      1200
catctctgtg tatgatctcg tggctgtgct gtgtcccaaa gggcctctga aatgctggt       1260 agaaactgcc caggagagaa atgagcccat attccctgcc ctgatatact catctgccat      1320
ggtgtggacg gttggcatgg cgaagctgga cccctcctct cagggtgccc tccagctccc      1380
ctacgacccg gagatggaag actcctatga cagttttggg gagccttcat accccgaagt      1440
ctttgagcct cccttgactg gctacccagg ggaggagctg gaggaagagg aggaaagggg      1500
cgtgaagctt ggcctcgggg acttcatctt ctacagtgtg ctggtgggca aggcggctgc      1560
cacgggcagc ggggactgga ataccacgct ggcctgcttc gtggccatcc tcattggctt      1620
gtgtctgacc ctcctgctgc ttgctgtgtt caagaaggcg ctgcccgccc tccccatctc      1680
catcacgttc gggctcatct tttacttctc cacggacaac ctggtgcggc cgttcatgga      1740
caccctggcc tcccatcagc tctacatctg agggacatgg tgtgccacag gctgcaagct      1800
gcagggaatt tcattggat gcagttgtat agttttacac tctagtgcca tatattttta      1860
agacttttct ttccttaaaa aataaagtac gtgtttactt ggtgaggagg aggcagaacc      1920
agctctttgg tgccagctgt ttcatcacca gactttggct cccgctttgg ggagcgcctc      1980
gcttcacgga caggaagcac agcaggttta tccagatgaa ctgagaaggt cagattaggg      2040
cggggagaag agcatccggc atgagggctg agatgcgcaa agagtgtgct cgggagtggc      2100
ccctggcacc tgggtgctct ggctggagag gaaaagccag ttccctacga ggagtgttcc      2160
caatgctttg tccatgatgt ccttgttatt ttattgcctt tagaaactga gtcctgttct      2220
tgttacggca gtcacactgc tgggaagtgg cttaatagta atatcaataa atagatgagt      2280
cctgttagaa tcttgaaaa                                                   2299
```

<210> SEQ ID NO 5
<211> LENGTH: 467
<212> TYPE: PRT
<213> ORGANISM: Homo sapines

<400> SEQUENCE: 5

```
Met Thr Glu Leu Pro Ala Pro Leu Ser Tyr Phe Gln Asn Ala Gln Met
1               5                   10                  15

Ser Glu Asp Asn His Leu Ser Asn Thr Val Arg Ser Gln Asn Asp Asn
            20                  25                  30

Arg Glu Arg Gln Glu His Asn Asp Arg Arg Ser Leu Gly His Pro Glu
        35                  40                  45

Pro Leu Ser Asn Gly Arg Pro Gln Gly Asn Ser Arg Gln Val Val Glu
    50                  55                  60

Gln Asp Glu Glu Glu Asp Glu Glu Leu Thr Leu Lys Tyr Gly Ala Lys
65                  70                  75                  80

His Val Ile Met Leu Phe Val Pro Val Thr Leu Cys Met Val Val Val
                85                  90                  95

Val Ala Thr Ile Lys Ser Val Ser Phe Tyr Thr Arg Lys Asp Gly Gln
            100                 105                 110

Leu Ile Tyr Thr Pro Phe Thr Glu Asp Thr Glu Thr Val Gly Gln Arg
        115                 120                 125

Ala Leu His Ser Ile Leu Asn Ala Ala Ile Met Ile Ser Val Ile Val
    130                 135                 140
```

Val Met Thr Ile Leu Leu Val Leu Tyr Lys Tyr Arg Cys Tyr Lys
145                 150                 155                 160

Val Ile His Ala Trp Leu Ile Ile Ser Ser Leu Leu Leu Phe
                    165                 170                 175

Phe Ser Phe Ile Tyr Leu Gly Glu Val Phe Lys Thr Tyr Asn Val Ala
                180                 185                 190

Val Asp Tyr Ile Thr Val Ala Leu Leu Ile Trp Asn Phe Gly Val Val
                195                 200                 205

Gly Met Ile Ser Ile His Trp Lys Gly Pro Leu Arg Leu Gln Gln Ala
        210                 215                 220

Tyr Leu Ile Met Ile Ser Ala Leu Met Ala Leu Val Phe Ile Lys Tyr
225                 230                 235                 240

Leu Pro Glu Trp Thr Ala Trp Leu Ile Leu Ala Val Ile Ser Val Tyr
                    245                 250                 255

Asp Leu Val Ala Val Leu Cys Pro Lys Gly Pro Leu Arg Met Leu Val
                260                 265                 270

Glu Thr Ala Gln Glu Arg Asn Glu Thr Leu Phe Pro Ala Leu Ile Tyr
                275                 280                 285

Ser Ser Thr Met Val Trp Leu Val Asn Met Ala Glu Gly Asp Pro Glu
290                 295                 300

Ala Gln Arg Arg Val Ser Lys Asn Ser Lys Tyr Asn Ala Glu Ser Thr
305                 310                 315                 320

Glu Arg Glu Ser Gln Asp Thr Val Ala Glu Asn Asp Asp Gly Gly Phe
                325                 330                 335

Ser Glu Glu Trp Glu Ala Gln Arg Asp Ser His Leu Gly Pro His Arg
                340                 345                 350

Ser Thr Pro Glu Ser Arg Ala Ala Val Gln Glu Leu Ser Ser Ser Ile
            355                 360                 365

Leu Ala Gly Glu Asp Pro Glu Glu Arg Gly Val Lys Leu Gly Leu Gly
            370                 375                 380

Asp Phe Ile Phe Tyr Ser Val Leu Val Gly Lys Ala Ser Ala Thr Ala
385                 390                 395                 400

Ser Gly Asp Trp Asn Thr Thr Ile Ala Cys Phe Val Ala Ile Leu Ile
                405                 410                 415

Gly Leu Cys Leu Thr Leu Leu Leu Ala Ile Phe Lys Lys Ala Leu
                420                 425                 430

Pro Ala Leu Pro Ile Ser Ile Thr Phe Gly Leu Val Phe Tyr Phe Ala
            435                 440                 445

Thr Asp Tyr Leu Val Gln Pro Phe Met Asp Gln Leu Ala Phe His Gln
450                 455                 460

Phe Tyr Ile
465

<210> SEQ ID NO 6
<211> LENGTH: 463
<212> TYPE: PRT
<213> ORGANISM: Homo sapiens

<400> SEQUENCE: 6

Met Thr Glu Leu Pro Ala Pro Leu Ser Tyr Phe Gln Asn Ala Gln Met
1               5                   10                  15

Ser Glu Asp Asn His Leu Ser Asn Thr Asn Asp Asn Arg Glu Arg Gln
                20                  25                  30

Glu His Asn Asp Arg Arg Ser Leu Gly His Pro Glu Pro Leu Ser Asn

```
                35                  40                  45
Gly Arg Pro Gln Gly Asn Ser Arg Gln Val Val Glu Gln Asp Glu Glu
 50                  55                  60
Glu Asp Glu Glu Leu Thr Leu Lys Tyr Gly Ala Lys His Val Ile Met
 65                  70                  75                  80
Leu Phe Val Pro Val Thr Leu Cys Met Val Val Val Ala Thr Ile
                 85                  90                  95
Lys Ser Val Ser Phe Tyr Thr Arg Lys Asp Gly Gln Leu Ile Tyr Thr
                100                 105                 110
Pro Phe Thr Glu Asp Thr Glu Thr Val Gly Gln Arg Ala Leu His Ser
                115                 120                 125
Ile Leu Asn Ala Ala Ile Met Ile Ser Val Ile Val Met Thr Ile
    130                 135                 140
Leu Leu Val Val Leu Tyr Lys Tyr Arg Cys Tyr Lys Val Ile His Ala
145                 150                 155                 160
Trp Leu Ile Ile Ser Ser Leu Leu Leu Phe Phe Ser Phe Ile
                165                 170                 175
Tyr Leu Gly Glu Val Phe Lys Thr Tyr Asn Val Ala Val Asp Tyr Ile
                180                 185                 190
Thr Val Ala Leu Leu Ile Trp Asn Phe Gly Val Val Gly Met Ile Ser
                195                 200                 205
Ile His Trp Lys Gly Pro Leu Arg Leu Gln Gln Ala Tyr Leu Ile Met
    210                 215                 220
Ile Ser Ala Leu Met Ala Leu Val Phe Ile Lys Tyr Leu Pro Glu Trp
225                 230                 235                 240
Thr Ala Trp Leu Ile Leu Ala Val Ile Ser Val Tyr Asp Leu Val Ala
                245                 250                 255
Val Leu Cys Pro Lys Gly Pro Leu Arg Met Leu Val Glu Thr Ala Gln
                260                 265                 270
Glu Arg Asn Glu Thr Leu Phe Pro Ala Leu Ile Tyr Ser Ser Thr Met
                275                 280                 285
Val Trp Leu Val Asn Met Ala Glu Gly Asp Pro Glu Ala Gln Arg Arg
    290                 295                 300
Val Ser Lys Asn Ser Lys Tyr Asn Ala Glu Ser Thr Glu Arg Glu Ser
305                 310                 315                 320
Gln Asp Thr Val Ala Glu Asn Asp Gly Gly Phe Ser Glu Glu Trp
                325                 330                 335
Glu Ala Gln Arg Asp Ser His Leu Gly Pro His Arg Ser Thr Pro Glu
                340                 345                 350
Ser Arg Ala Ala Val Gln Glu Leu Ser Ser Ile Leu Ala Gly Glu
                355                 360                 365
Asp Pro Glu Glu Arg Gly Val Lys Leu Gly Leu Gly Asp Phe Ile Phe
    370                 375                 380
Tyr Ser Val Leu Val Gly Lys Ala Ser Ala Thr Ala Ser Gly Asp Trp
385                 390                 395                 400
Asn Thr Thr Ile Ala Cys Phe Val Ala Ile Leu Ile Gly Leu Cys Leu
                405                 410                 415
Thr Leu Leu Leu Leu Ala Ile Phe Lys Lys Ala Leu Pro Ala Leu Pro
                420                 425                 430
Ile Ser Ile Thr Phe Gly Leu Val Phe Tyr Phe Ala Thr Asp Tyr Leu
    435                 440                 445
Val Gln Pro Phe Met Asp Gln Leu Ala Phe His Gln Phe Tyr Ile
                450                 455                 460
```

```
<210> SEQ ID NO 7
<211> LENGTH: 448
<212> TYPE: PRT
<213> ORGANISM: Homo sapiens

<400> SEQUENCE: 7

Met Leu Thr Phe Met Ala Ser Asp Ser Glu Glu Val Cys Asp Glu
1               5                   10                  15

Arg Thr Ser Leu Met Ser Ala Glu Ser Pro Thr Pro Arg Ser Cys Gln
                20                  25                  30

Glu Gly Arg Gln Gly Pro Glu Asp Gly Glu Asn Thr Ala Gln Trp Arg
            35                  40                  45

Ser Gln Glu Asn Glu Glu Asp Gly Glu Asp Pro Asp Arg Tyr Val
    50                  55                  60

Cys Ser Gly Val Pro Gly Arg Pro Pro Gly Leu Glu Glu Glu Leu Thr
65                  70                  75                  80

Leu Lys Tyr Gly Ala Lys His Val Ile Met Leu Phe Val Pro Val Thr
                85                  90                  95

Leu Cys Met Ile Val Val Val Ala Thr Ile Lys Ser Val Arg Phe Tyr
                100                 105                 110

Thr Glu Lys Asn Gly Gln Leu Ile Tyr Thr Pro Phe Thr Glu Asp Thr
            115                 120                 125

Pro Ser Val Gly Gln Arg Leu Leu Asn Ser Val Leu Asn Thr Leu Ile
    130                 135                 140

Met Ile Ser Val Ile Val Val Met Thr Ile Phe Leu Val Val Leu Tyr
145                 150                 155                 160

Lys Tyr Arg Cys Tyr Lys Phe Ile His Gly Trp Leu Ile Met Ser Ser
                165                 170                 175

Leu Met Leu Leu Phe Leu Phe Thr Tyr Ile Tyr Leu Gly Glu Val Leu
                180                 185                 190

Lys Thr Tyr Asn Val Ala Met Asp Tyr Pro Thr Leu Leu Leu Thr Val
            195                 200                 205

Trp Asn Phe Gly Ala Val Gly Met Val Cys Ile His Trp Lys Gly Pro
    210                 215                 220

Leu Val Leu Gln Gln Ala Tyr Leu Ile Met Ile Ser Ala Leu Met Ala
225                 230                 235                 240

Leu Val Phe Ile Lys Tyr Leu Pro Glu Trp Ser Ala Trp Val Ile Leu
                245                 250                 255

Gly Ala Ile Ser Val Tyr Asp Leu Val Ala Val Leu Cys Pro Lys Gly
                260                 265                 270

Pro Leu Arg Met Leu Val Glu Thr Ala Gln Glu Arg Asn Glu Pro Ile
            275                 280                 285

Phe Pro Ala Leu Ile Tyr Ser Ser Ala Met Val Trp Thr Val Gly Met
    290                 295                 300

Ala Lys Leu Asp Pro Ser Ser Gln Gly Ala Leu Gln Leu Pro Tyr Asp
305                 310                 315                 320

Pro Glu Met Glu Glu Asp Ser Tyr Asp Ser Phe Gly Glu Pro Ser Tyr
                325                 330                 335

Pro Glu Val Phe Glu Pro Pro Leu Thr Gly Tyr Pro Gly Glu Glu Leu
            340                 345                 350

Glu Glu Glu Glu Glu Arg Gly Val Lys Leu Gly Leu Gly Asp Phe Ile
        355                 360                 365

Phe Tyr Ser Val Leu Val Gly Lys Ala Ala Ala Thr Gly Ser Gly Asp
```

```
                    370                 375                 380
Trp Asn Thr Thr Leu Ala Cys Phe Val Ala Ile Leu Ile Gly Leu Cys
385                 390                 395                 400

Leu Thr Leu Leu Leu Leu Ala Val Phe Lys Lys Ala Leu Pro Ala Leu
                405                 410                 415

Pro Ile Ser Ile Thr Phe Gly Leu Ile Phe Tyr Phe Ser Thr Asp Asn
                420                 425                 430

Leu Val Arg Pro Phe Met Asp Thr Leu Ala Ser His Gln Leu Tyr Ile
                435                 440                 445

<210> SEQ ID NO 8
<211> LENGTH: 420
<212> TYPE: PRT
<213> ORGANISM: Homo sapiens

<400> SEQUENCE: 8

Met Leu Thr Phe Met Ala Ser Asp Ser Glu Glu Val Cys Asp Glu
1               5                   10                  15

Arg Thr Ser Leu Met Ser Ala Glu Ser Pro Thr Pro Arg Ser Cys Gln
                20                  25                  30

Glu Gly Arg Gln Gly Pro Glu Asp Gly Glu Asn Thr Ala Gln Trp Arg
            35                  40                  45

Ser Gln Glu Asn Glu Glu Asp Gly Glu Asp Pro Asp Arg Tyr Val
50                  55                  60

Cys Ser Gly Val Pro Gly Arg Pro Pro Gly Leu Glu Glu Leu Thr
65              70                  75                  80

Leu Lys Tyr Gly Ala Lys His Val Ile Met Leu Phe Val Pro Val Thr
                85                  90                  95

Leu Cys Met Ile Val Val Val Ala Thr Ile Lys Ser Val Arg Phe Tyr
                100                 105                 110

Thr Glu Lys Asn Gly Gln Leu Ile Tyr Thr Pro Phe Thr Glu Asp Thr
                115                 120                 125

Pro Ser Val Gly Gln Arg Leu Leu Asn Ser Val Leu Asn Thr Leu Ile
                130                 135                 140

Met Ile Ser Val Ile Val Val Met Thr Ile Phe Leu Val Val Leu Tyr
145                 150                 155                 160

Lys Tyr Arg Cys Tyr Lys Phe Ile His Gly Trp Leu Ile Met Ser Ser
                165                 170                 175

Leu Met Leu Leu Phe Leu Phe Thr Tyr Ile Tyr Leu Gly Glu Val Leu
                180                 185                 190

Lys Thr Tyr Asn Val Ala Met Asp Tyr Pro Thr Leu Leu Leu Thr Val
                195                 200                 205

Trp Asn Phe Gly Ala Val Gly Met Val Cys Ile His Trp Lys Gly Pro
                210                 215                 220

Leu Val Leu Gln Gln Ala Tyr Leu Ile Met Ile Ser Ala Leu Met Ala
225                 230                 235                 240

Leu Val Phe Ile Lys Tyr Leu Pro Glu Trp Ser Ala Trp Val Ile Leu
                245                 250                 255

Gly Ala Ile Ser Val Tyr Asp Leu Val Ala Val Leu Cys Pro Lys Gly
                260                 265                 270

Pro Leu Arg Met Leu Val Glu Thr Ala Gln Glu Arg Asn Glu Pro Ile
                275                 280                 285

Phe Pro Ala Leu Ile Tyr Ser Ser Ala Met Val Trp Thr Val Gly Met
                290                 295                 300
```

```
Ala Lys Leu Asp Pro Ser Ser Gln Gly Ala Leu Gln Leu Pro Tyr Asp
305                 310                 315                 320

Pro Glu Met Glu Asp Ser Tyr Asp Ser Phe Gly Glu Pro Ser Tyr Pro
            325                 330                 335

Glu Val Phe Glu Pro Pro Leu Thr Gly Tyr Pro Gly Glu Glu Leu Glu
            340                 345                 350

Glu Glu Glu Glu Arg Gly Val Lys Leu Gly Leu Gly Asp Phe Ile Phe
            355                 360                 365

Tyr Ser Val Leu Val Gly Lys Ala Ala Ala Thr Gly Ser Gly Asp Trp
370                 375                 380

Asn Thr Thr Leu Ala Cys Phe Val Ala Ile Leu Ile Gly Leu Cys Leu
385                 390                 395                 400

Thr Leu Leu Leu Leu Ala Val Phe Lys Lys Ala Leu Pro Ala Leu Pro
                405                 410                 415

Ile Ser Ile Thr
            420

<210> SEQ ID NO 9
<211> LENGTH: 20
<212> TYPE: DNA
<213> ORGANISM: Artificial
<220> FEATURE:
<223> OTHER INFORMATION: primer hPS1-F5

<400> SEQUENCE: 9
agacccggaa gctcaaagga                                              20

<210> SEQ ID NO 10
<211> LENGTH: 20
<212> TYPE: DNA
<213> ORGANISM: Artificial
<220> FEATURE:
<223> OTHER INFORMATION: primer hPS1-R5

<400> SEQUENCE: 10
ttcctcactg aacccgccat                                              20

<210> SEQ ID NO 11
<211> LENGTH: 22
<212> TYPE: DNA
<213> ORGANISM: Artificial
<220> FEATURE:
<223> OTHER INFORMATION: Primer hPS2-F5

<400> SEQUENCE: 11
aagtgtccgg gattcagacc tc                                           22

<210> SEQ ID NO 12
<211> LENGTH: 20
<212> TYPE: DNA
<213> ORGANISM: Artificial
<220> FEATURE:
<223> OTHER INFORMATION: primer hPS2-R5

<400> SEQUENCE: 12
tcgctgtcag aggccatgaa                                              20

<210> SEQ ID NO 13
<211> LENGTH: 23
<212> TYPE: DNA
<213> ORGANISM: Artificial
<220> FEATURE:
<223> OTHER INFORMATION: primer NCT-104
```

<400> SEQUENCE: 13
acaggtggcc ttaagaactt cat                                                23

<210> SEQ ID NO 14
<211> LENGTH: 20
<212> TYPE: DNA
<213> ORGANISM: Artificial
<220> FEATURE:
<223> OTHER INFORMATION: primer NCT-204

<400> SEQUENCE: 14
ccacctggtt ccgtacagac                                                    20

<210> SEQ ID NO 15
<211> LENGTH: 20
<212> TYPE: DNA
<213> ORGANISM: Artificial
<220> FEATURE:
<223> OTHER INFORMATION: primer hPen2-F1

<400> SEQUENCE: 15
tccttgtccc agcctacaca                                                    20

<210> SEQ ID NO 16
<211> LENGTH: 22
<212> TYPE: DNA
<213> ORGANISM: Artificial
<220> FEATURE:
<223> OTHER INFORMATION: primer hPen2-R1

<400> SEQUENCE: 16
agcactatca cccagaagag ga                                                 22

<210> SEQ ID NO 17
<211> LENGTH: 467
<212> TYPE: PRT
<213> ORGANISM: Homo sapiens
<220> FEATURE:
<221> NAME/KEY: MISC_FEATURE
<222> LOCATION: (1)..(467)
<223> OTHER INFORMATION: Uniprot P49768.1

<400> SEQUENCE: 17

Met Thr Glu Leu Pro Ala Pro Leu Ser Tyr Phe Gln Asn Ala Gln Met
1               5                   10                  15

Ser Glu Asp Asn His Leu Ser Asn Thr Val Arg Ser Gln Asn Asp Asn
            20                  25                  30

Arg Glu Arg Gln Glu His Asn Asp Arg Arg Ser Leu Gly His Pro Glu
        35                  40                  45

Pro Leu Ser Asn Gly Arg Pro Gln Gly Asn Ser Arg Gln Val Val Glu
    50                  55                  60

Gln Asp Glu Glu Glu Asp Glu Glu Leu Thr Leu Lys Tyr Gly Ala Lys
65                  70                  75                  80

His Val Ile Met Leu Phe Val Pro Val Thr Leu Cys Met Val Val Val
                85                  90                  95

Val Ala Thr Ile Lys Ser Val Ser Phe Tyr Thr Arg Lys Asp Gly Gln
            100                 105                 110

Leu Ile Tyr Thr Pro Phe Thr Glu Asp Thr Glu Thr Val Gly Gln Arg
        115                 120                 125

Ala Leu His Ser Ile Leu Asn Ala Ala Ile Met Ile Ser Val Ile Val
    130                 135                 140

```
Val Met Thr Ile Leu Leu Val Leu Tyr Lys Tyr Arg Cys Tyr Lys
145                 150                 155                 160

Val Ile His Ala Trp Leu Ile Ile Ser Ser Leu Leu Leu Phe Phe
                165                 170                 175

Phe Ser Phe Ile Tyr Leu Gly Glu Val Phe Lys Thr Tyr Asn Val Ala
            180                 185                 190

Val Asp Tyr Ile Thr Val Ala Leu Leu Ile Trp Asn Phe Gly Val Val
        195                 200                 205

Gly Met Ile Ser Ile His Trp Lys Gly Pro Leu Arg Leu Gln Gln Ala
    210                 215                 220

Tyr Leu Ile Met Ile Ser Ala Leu Met Ala Leu Val Phe Ile Lys Tyr
225                 230                 235                 240

Leu Pro Glu Trp Thr Ala Trp Leu Ile Leu Ala Val Ile Ser Val Tyr
                245                 250                 255

Asp Leu Val Ala Val Leu Cys Pro Lys Gly Pro Leu Arg Met Leu Val
            260                 265                 270

Glu Thr Ala Gln Glu Arg Asn Glu Thr Leu Phe Pro Ala Leu Ile Tyr
        275                 280                 285

Ser Ser Thr Met Val Trp Leu Val Asn Met Ala Glu Gly Asp Pro Glu
    290                 295                 300

Ala Gln Arg Arg Val Ser Lys Asn Ser Lys Tyr Asn Ala Glu Ser Thr
305                 310                 315                 320

Glu Arg Glu Ser Gln Asp Thr Val Ala Glu Asn Asp Asp Gly Gly Phe
                325                 330                 335

Ser Glu Glu Trp Glu Ala Gln Arg Asp Ser His Leu Gly Pro His Arg
            340                 345                 350

Ser Thr Pro Glu Ser Arg Ala Ala Val Gln Glu Leu Ser Ser Ser Ile
        355                 360                 365

Leu Ala Gly Glu Asp Pro Glu Glu Arg Gly Val Lys Leu Gly Leu Gly
    370                 375                 380

Asp Phe Ile Phe Tyr Ser Val Leu Val Gly Lys Ala Ser Ala Thr Ala
385                 390                 395                 400

Ser Gly Asp Trp Asn Thr Thr Ile Ala Cys Phe Val Ala Ile Leu Ile
                405                 410                 415

Gly Leu Cys Leu Thr Leu Leu Leu Ala Ile Phe Lys Lys Ala Leu
            420                 425                 430

Pro Ala Leu Pro Ile Ser Ile Thr Phe Gly Leu Val Phe Tyr Phe Ala
        435                 440                 445

Thr Asp Tyr Leu Val Gln Pro Phe Met Asp Gln Leu Ala Phe His Gln
450                 455                 460

Phe Tyr Ile
465
```

GENE THERAPY FOR ALZHEIMER'S DISEASE

CLAIM OF PRIORITY

This application is a national stage application under 35 USC § 371 of International Application No. PCT/US2019/033616, filed on May 22, 2019, which claims the benefit of U.S. Provisional Patent Application Ser. No. 62/675,003, filed on May 22, 2018. The entire contents of the foregoing are hereby incorporated by reference.

FEDERALLY SPONSORED RESEARCH OR DEVELOPMENT

This invention was made with Government support under Grant Nos. NS041783 and NS075346 awarded by the National Institutes of Health. The Government has certain rights in the invention.

SEQUENCE LISTING

This application contains a Sequence Listing that has been submitted electronically as an ASCII text file named "29618-0229 UPDATEDSL ST25.txt." The ASCII text file, created on Mar. 13, 2024, is 43,780 bytes in size. The material in the ASCII text file is hereby incorporated by reference in its entirety.

TECHNICAL FIELD

Described herein are, inter alia, compositions and methods for using presenilin genetic therapy constructs to treat Alzheimer's disease (AD) and other neurodegenerative diseases.

BACKGROUND

Alzheimer's disease, also known as Alzheimer disease, accounts for majority of neurodegenerative dementia and is the fourth leading cause of death in the United States after heart disease, cancer and stroke. It is characterized by a progressive loss of cognitive function, neurodegeneration, neurofibrillary tangles and amyloid plaques in the brains of patients. Although the progression speed varies in different patients, the average life expectancy following diagnosis is three to nine years. Currently, there is no treatment for Alzheimer's disease.

SUMMARY

Described herein is a novel approach that can be used to treat subjects with Alzheimer's disease (AD) and other neurodegenerative diseases, disorders or conditions. Mutations in the Presenilin genes—PSEN1 and PSEN2—are highly penetrant and account for ~90% of all mutations identified in familial AD (FAD), highlighting their importance in the pathogenesis of AD. More than 260 distinct mutations in PSEN1 have been reported, and they are dominantly inherited and mostly missense mutations. Pathogenic PSEN1 mutations act in cis to impair mutant PS1 function and act in trans to inhibit wild-type Presenilin-1 (PS1) function (Heilig et al. J Neurosci 33:11606-717 (2013); Zhou et al. Proc Natl Acad Sci USA 114:12731-12736 (2017). Typically, by their very nature, dominant negative mutations cannot be rescued by expression of wild type protein (Herskowitz, I. Nature, 329:219-222 (1987)).

The present disclosure is based, at least in part, on the unexpected discovery that providing a wild-type PSEN1 cDNA into immortalized MEFs carrying heterozygous or homozygous dominant negative Psen1 mutations, a well-established familial Alzheimer's disease model, rescued the impaired γ-secretase activity in these cells. It is known that dominant negative mutations in the PSEN1 and PSEN2 genes are associated with early onset familial Alzheimer's disease. It was generally believed that the PS1 and presenilin-2 (PS2) proteins are part of γ-secretase complex, and that mutations in the PSEN1 and PSEN2 genes contribute to the accumulation of Amyloid beta (Aβ) protein in Alzheimer's disease patients. Thus, the present disclosure provides methods for effective gene therapy based on PSEN1 (to express PS1) and/or PSEN2 (to express PS2) for Alzheimer's disease and other neurodegenerative dementia, representing a significant breakthrough in this disease area.

In a first aspect, provided herein are methods for treating a neurodegenerative disease, disorder or condition comprising administering to a subject in need of treatment a polynucleotide comprising a PSEN1 and/or PSEN2 gene or mRNA, e.g., encoding a PS1 or PS2 protein as described herein. In some embodiments, the neurodegenerative disease, disorder or condition is Alzheimer's disease, e.g., familial Alzheimer's disease, e.g., characterized with one or more mutations in the PSEN1 and/or PSEN2 gene. In some embodiments, the Alzheimer's disease is sporadic Alzheimer's disease. In some embodiments, the Alzheimer's disease is late-onset or early-onset Alzheimer's disease. In some embodiments, the neurodegenerative disease, disorder or condition is frontotemporal dementia, frontotemporal lobar degeneration, Pick's disease, or Lewy body dementia. In some embodiments, the neurodegenerative disease, disorder or condition is memory loss. In some embodiments, the neurodegenerative disease, disorder or condition is cognitive decline or impairment. In some embodiments, the cognitive impairment is mild cognitive impairment (MCI). In some embodiments, the polynucleotide is a vector, e.g., a viral vector.

Also provided herein are polynucleotide sequence encoding a PS1 and/or PS2 protein or therapeutically active fragment thereof, optionally wherein the polynucleotides sequences are in vectors wherein the PS1 and/or PS2 encoding sequence is operably linked to a promotor that drives expression of the PS1 and/or PS2 in the brain. Also provided herein is the use of the polynucleotide sequences and vectors for use in treating a neurodegenerative disease, disorder or condition as described herein.

In some embodiments, the viral vector is an adeno-associated virus (AAV) vector. In some embodiments, the AAV vector is selected from AAV1, AAV2, AAV3, AAV4, AAV5, AAV6, AAV7, AAV8, AAV9, AAVrh10, AAV11, AAV12, AAV2/1, AAV2/2, AAV2/5, AAV2/6, AAV2/7, AAV2/8, AAV2/9, AAV2/rh10, AAV2/AAV11, or AAV2/AAV12.

In some embodiments, the viral vector is a lentiviral vector or a retroviral vector.

In some embodiments, the polynucleotide encodes a presenilin 1 (PSEN1) gene or mRNA. In some embodiments, the polynucleotide encodes a presenilin 2 (PSEN2) gene or mRNA. In some embodiments, the polynucleotide encodes a presenilin 1 (PSEN1) and a presenilin 2 (PSEN2) gene or mRNA.

In some embodiments, the polynucleotide sequence encoding PS1 protein, e.g., PSEN1 mRNA, comprises a nucleotide sequence at least 60%, 65%, 70%, 75%, 80%, 85%, 90%, 95%, 96%, 97%, 98%, or 99% identical to the sequence of wild-type human presenilin-1 transcript variant 1 mRNA (SEQ ID NO:1) or of wild-type human presenilin-1 transcript variant 2 mRNA (SEQ ID NO:2).

In some embodiments, the polynucleotide sequence encoding PS2 protein, e.g., PSEN2 mRNA, comprises a nucleotide sequence at least 60%, 65%, 70%, 75%, 80%, 85%, 90%, 95%, 96%, 97%, 98%, or 99% identical to the sequence of wild-type human presenilin-2 transcript variant 1 mRNA (SEQ ID NO:1) or of wild-type human presenilin-2 transcript variant 2 mRNA (SEQ ID NO:2).

In some embodiments, the polynucleotide sequence encoding a PS1 and/or PS2 protein, e.g., presenilin 1 (PSEN1) and/or presenilin 2 (PSEN2) gene or mRNA, are operably linked to a promoter.

In some embodiments, the promoter is a pan neuronal promoter. In some embodiments, the pan neuronal promoter is a synapsin I promoter. In some embodiments, the pan neuronal promoter is a 1.6-kb hybrid promoter composed of the CMV immediate-early enhancer, and CBA intron 1/exon 1 (commonly called the "CAGGS promoter").

In some embodiments, the promoter is a neuron subtype-specific promoter, e.g., an alpha-calcium/calmodulin kinase 2A promoter.

In some embodiments, the promoter is a cytomegalovirus (CMV) early enhancer/promoter, a hybrid CMV enhance/chicken β-actin (CBA) promoter, or a promoter comprising a CMV early enhancer element, the first exon and first intron of the chicken β-actin gene, and the splice acceptor of the rabbit β-globin gene (commonly call the "CAG promoter").

In some embodiments, the polynucleotide sequence encoding a PS1 and/or PS2 protein, e.g., PSEN1 and/or PSEN2 gene or mRNA, is administered to the CNS of the subject in need of treatment.

In some embodiments, the polynucleotide encoding a PS1 and/or PS2 protein, e.g., PSEN1 and/or PSEN2 gene or mRNA, is administered to the CNS via intravenous delivery, intrathecal delivery, intracerebroventricular administration, stereotactic intraparenchymal administration, intracisternal administration, intracerebroventricular delivery, or stereotactic injection(s) into certain areas of brain, e.g., into the cisterna magna, cerebral ventricles, lumbar intrathecal space, direct injection into the hippocampus and/or the neocortex.

In some embodiments, the polynucleotide is associated with (e.g., formulated for delivery using) an exosome or lipid-based nanoparticle (LNP).

Also provided herein is the use of a vector as described herein for treating a neurodegenerative disease, disorder or condition as described herein. In some embodiments, the neurodegenerative disease, disorder or condition is Alzheimer's disease. In some embodiments, the Alzheimer's disease is familial Alzheimer's disease. In some embodiments, the Alzheimer's disease is sporadic Alzheimer's disease. In some embodiments, the Alzheimer's disease is late-onset Alzheimer's disease. In some embodiments, the neurodegenerative disease, disorder or condition is frontotemporal dementia, frontotemporal lobar degeneration, Pick's disease, or Lewy body dementia. In some embodiments, the neurodegenerative disease, disorder or condition is memory loss. In some embodiments, the neurodegenerative disease, disorder or condition is cognitive decline or impairment. In some embodiments, the cognitive impairment is mild cognitive impairment (MCI).

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Other features and advantages of the invention will be apparent from the following detailed description and figures, and from the claims.

DESCRIPTION OF DRAWINGS

FIGS. 1A-B. Decreased levels of PS1- and PSEN2-encoding mRNAs in hippocampal pyramidal neurons of sporadic AD brains. A, Representative pictures of human hippocampal CA1 pyramidal neurons before (top) and after (bottom) laser capture microdissection (LCM). B, Quantitative RT-PCR analysis shows a ~30% reduction in PS1, PSEN2, Nicastrin (Nct) mRNAs in CA1 pyramidal neurons of sporadic AD brains (n=9, Braak stage III/IV), compared to control brains (n=8) with normal cognitive ability. Levels of PS1, PSEN2, Nicastrin (Nct) and Pen-2 mRNA are normalized to the RPLP0 mRNA, a ubiquitously expressed ribosomal mRNA, and the values of mRNAs from control brains were set as 100%. All data are expressed as mean±SEM. Statistical analysis was performed using two-tailed unpaired student's t-test. *$p<0.05$; **$p<0.01$; NS, Not significant.

FIGS. 2A-B. Decreased γ-secretase activity in Psen1 KI/+, KI/KI and Psen1−/− cells. A, Western blotting using cell lysates from immortalized MEFs derived from embryos carrying various Psen1 genotypes shows reduced γ-secretase activity in PS1 L435F KI/+, KI/KI and PS1$^{-/-}$ cells, as indicated by decreased NICD production. MEFs were transfected with 1.25 μg Hes1-Luc and 5 ng Notch-4E. Antibodies specific for the N-terminus of PS1, NICD, and α-tubulin were used. B, Quantification of NICD (left graph) and PS1-NTF (right graph) levels is shown. Protein levels are normalized to α-tubulin, and the protein levels in +/+ cells are expressed as 100%. All data are expressed as mean±SEM. Statistical analysis was performed using one-way ANOVA with Tukey's post-test. *$p<0.05$; $p<0.01$, *$p<0.001$ compared to +/+ cells.

DEFINITIONS

Figure 3A:
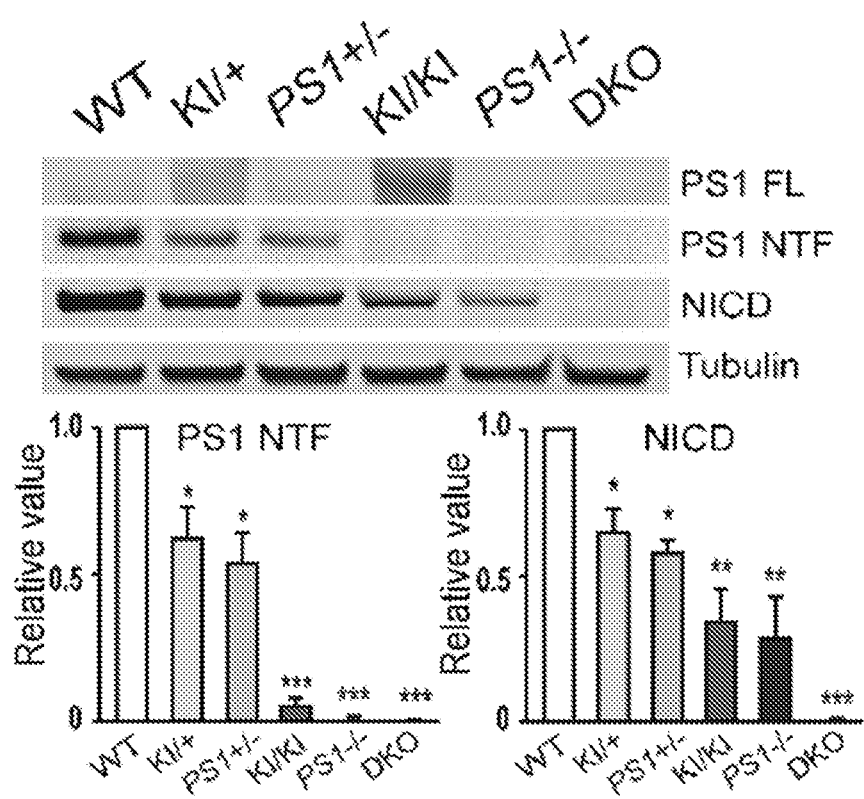
FIGS. 3A-3B. Introduction of WT hPS1 rescues impaired γ-secretase activity in mutant MEFs. A, γ-Secretase activity measured by NICD production is reduced in mutant MEF cells in a PS dosage dependent manner (WT>PS1 heterozygous KI or KO>homozygous PS1 KI or KO>DKO). B, Restoring impaired γ-secretase activity by WT hPS1. Increasing amounts of pCI-hPS1 plasmid DNA, as indicated, are transfected into MEFs of varying genotypes. Western analysis showed that both PS1 NTF and NICD are restored in various PS mutant MEFs. Heterozygous L435F KI cells are labeled as KI/+ or PS1L435F/+. N=3 independent experiments. Data represent mean±SEM. *$p<0.05$; $p<0.01$; *$p<0.001$ (one-way ANOVA with Tukey's post-hoc analysis).

In order for the present disclosure to be more readily understood, certain terms are first defined below. Additional definitions for the following terms and other terms are set forth throughout the specification.

Administration:

As used herein, the term "administration" refers to the delivery or application of a composition to a subject or system. Administration to an animal subject (e.g., to a human) may be by any appropriate route. For example, in some embodiments, administration may be bronchial (including by bronchial instillation), buccal, enteral, interdermal, intra-arterial, intradermal, intragastric, intramedullary, intramuscular, intranasal, intraperitoneal, intrathecal, intravenous, intraventricular, mucosal, nasal, oral, rectal, subcutaneous, sublingual, topical, tracheal (including by intratracheal instillation), transdermal, vaginal and vitreal.

Biologically Active:

As used herein, the phrase "biologically active" refers to a characteristic of any substance that has activity in a biological system (e.g., cell culture, organism, etc.). For instance, a substance that, when administered to an organism, has a biological effect on that organism, is considered to be biologically active. Biological activity can also be determined by in vitro assays (for example, in vitro enzymatic assays). In particular embodiments, where a protein or polypeptide is biologically active, a portion of that protein or polypeptide that shares at least one biological activity of the protein or polypeptide is typically referred to as a "biologically active" portion. In some embodiments, a protein is produced and/or purified from a cell culture system, which displays biologically activity when administered to a subject.

Control:

As used herein, the term "control" has its art-understood meaning of being a standard against which results are compared. Typically, controls are used to augment integrity in experiments by isolating variables in order to make a conclusion about such variables. In some embodiments, a control is a reaction or assay that is performed simultaneously with a test reaction or assay to provide a comparator. In one experiment, the "test" (i.e., the variable being tested) is applied. In the second experiment, the "control," the variable being tested is not applied. In some embodiments, a control is a historical control (i.e., of a test or assay performed previously, or an amount or result that is previously known). In some embodiments, a control is or comprises a printed or otherwise saved record. A control may be a positive control or a negative control. In some embodiments, the control may be a "reference control", which is a sample used for comparison with a test sample, to look for differences or for the purposes of characterization.

Gene Therapy:

As used herein, the term "gene therapy" refers to any treatment including the direct or indirect administration of a nucleic acid to a subject. In particular instances, a protein of therapeutic value is expressed from an administered nucleic acid.

Identity:

As used herein, the term "identity" refers to the overall relatedness between polymeric molecules, e.g., between nucleic acid molecules (e.g., DNA molecules and/or RNA molecules) and/or between polypeptide molecules. Calculation of the percent identity of two nucleic acid sequences, for example, can be performed by aligning the two sequences for optimal comparison purposes (e.g., gaps can be introduced in one or both of a first and a second nucleic acid sequences for optimal alignment and non-identical sequences can be disregarded for comparison purposes). In certain embodiments, the length of a sequence aligned for comparison purposes is at least 30%, at least 40%, at least 50%, at least 60%, at least 70%, at least 80%, at least 90%, at least 95%, or substantially 100% of the length of the reference sequence. The nucleotides at corresponding nucleotide positions are then compared. When a position in the first sequence is occupied by the same nucleotide as the corresponding position in the second sequence, then the molecules are identical at that position. The percent identity between the two sequences is a function of the number of identical positions shared by the sequences, taking into account the number of gaps, and the length of each gap, which needs to be introduced for optimal alignment of the two sequences. The comparison of sequences and determination of percent identity between two sequences can be accomplished using a mathematical algorithm. For example, the percent identity between two nucleotide sequences can be determined using the algorithm of Meyers and Miller (CABIOS, 1989, 4: 11-17), which has been incorporated into the ALIGN program (version 2.0) using a PAM120 weight residue table, a gap length penalty of 12 and a gap penalty of 4. The percent identity between two nucleotide sequences can, alternatively, be determined using the GAP program in the GCG software package using an NWSgapdna.CMP matrix. Various other sequence alignment programs are available and can be used to determine sequence identity such as, for example, Clustal.

Improve, Increase, or Reduce:

As used herein, the terms "improve," "increase" or "reduce," or grammatical equivalents, indicate values that are relative to a baseline measurement, such as a measurement in the same individual prior to initiation of the treatment described herein, or a measurement in a control individual (or multiple control individuals) in the absence of the treatment described herein. A "control individual" is an individual afflicted with the same type and approximately the same severity of, e.g., Alzheimer's disease, as the individual being treated, who is about the same age as the individual being treated (to ensure that the stages of the disease in the treated individual and the control individual(s) are comparable).

Neurodegeneration:

As used herein, the term "neurodegeneration" means a process in which one or more neurons are damaged, decrease in function, become dysfunctional, and/or are lost by death. Neurodegeneration encompasses both rapid, gradual, and intermediate forms. Accordingly, a neurodegenerative disease, condition, or symptom is one characterized in that the disease is typically associated with neuronal damage, and/or death.

Subject:

As used herein, the term "subject" refers to a human or any non-human animal (e.g., mouse, rat, rabbit, dog, cat, cattle, swine, sheep, horse or primate). A human includes pre- and post-natal forms. In many embodiments, a subject is a human being. A subject can be a patient, which refers to a human presenting to a medical provider for diagnosis or treatment of a disease. The term "subject" is used herein interchangeably with "individual" or "patient." A subject can be afflicted with or is susceptible to a disease or disorder but may or may not display symptoms of the disease or disorder.

Suffering From:

An individual who is "suffering from" a disease, disorder, and/or condition (e.g., Alzheimer's disease) has been diagnosed with or displays one or more symptoms of the disease, disorder, and/or condition.

Susceptible To:

An individual who is "susceptible to" a disease, disorder, and/or condition has not been diagnosed with and/or may not exhibit symptoms of the disease, disorder, and/or condition. In some embodiments, an individual who is susceptible to a disease, disorder, and/or condition (for example, Alzheimer's disease) may be characterized by one or more of the following: (1) a genetic mutation associated with development of the disease, disorder, and/or condition; (2) a genetic polymorphism associated with development of the disease, disorder, and/or condition; (3) increased and/or decreased expression and/or activity of a protein associated with the disease, disorder, and/or condition; (4) habits and/or lifestyles associated with development of the disease, disorder, and/or condition; (5) a family history of the disease, disorder, and/or condition; (6) reaction to certain bacteria or viruses; (7) exposure to certain chemicals. In some embodiments, an individual who is susceptible to a disease, disorder, and/or condition will develop the disease, disorder, and/or condition. In some embodiments, an individual who is susceptible to a disease, disorder, and/or condition will not develop the disease, disorder, and/or condition.

Therapeutically Effective Amount:

As used herein, the term "therapeutically effective amount" refers to an amount of a therapeutic protein which confers a therapeutic effect on the treated subject, at a reasonable benefit/risk ratio applicable to any medical treatment. The therapeutic effect may be objective (i.e., measurable by some test or marker) or subjective (i.e., subject gives an indication of or feels an effect). In particular, the "therapeutically effective amount" refers to an amount of a therapeutic protein or composition effective to treat, ameliorate, or prevent a desired disease or condition, or to exhibit a detectable therapeutic or preventative effect, such as by ameliorating symptoms associated with the disease, preventing or delaying the onset of the disease, and/or also lessening the severity or frequency of symptoms of the disease. A therapeutically effective amount is commonly administered in a dosing regimen that may comprise multiple unit doses. For any particular therapeutic protein, a therapeutically effective amount (and/or an appropriate unit dose within an effective dosing regimen) may vary, for example, depending on route of administration, on combination with other pharmaceutical agents. Also, the specific therapeutically effective amount (and/or unit dose) for any particular patient may depend upon a variety of factors including the disorder being treated and the severity of the disorder; the activity of the specific pharmaceutical agent employed; the specific composition employed; the age, body weight, general health, sex and diet of the patient; the time of administration, route of administration, and/or rate of excretion or metabolism of the specific fusion protein employed; the duration of the treatment; and like factors as is well known in the medical arts.

Treatment:

As used herein, the term "treatment" (also "treat" or "treating"), in its broadest sense, refers to any administration of a substance (e.g., provided compositions) that partially or completely alleviates, ameliorates, relives, inhibits, delays onset of, reduces severity of, and/or reduces incidence of one or more symptoms, features, and/or causes of a particular disease, disorder, and/or condition. In some embodiments, such treatment may be administered to a subject who does not exhibit signs of the relevant disease, disorder and/or condition and/or of a subject who exhibits only early signs of the disease, disorder, and/or condition. Alternatively or additionally, in some embodiments, treatment may be administered to a subject who exhibits one or more established signs of the relevant disease, disorder and/or condition. In some embodiments, treatment may be of a subject who has been diagnosed as suffering from the relevant disease, disorder, and/or condition. In some embodiments, treatment may be of a subject known to have one or more susceptibility factors that are statistically correlated with increased risk of development of the relevant disease, disorder, and/or condition.

Although generally speaking "PS1" refers to the presenilin-1 protein, and "PS2" refers to the presenilin-2 protein, in some cases PS1 or PS2 is used to refer to mRNA or gene.

DETAILED DESCRIPTION

The present disclosure provides, among other things, compositions and methods for treating subjects with Alzheimer's disease and other neurodegenerative diseases, disorders and conditions based on delivering functional presenilin-1 (PS1) and/or presenilin-2 (PS2). In particular, the present disclosure contemplates gene therapy by providing a polynucleotide encoding a presenilin-1 (PSEN1) and/or presenilin-2 (PSEN2) gene to a subject in need of treatment. In some embodiments, however, a presenilin-1 (PS1) and/or presenilin-2 (PS2) protein may also be used.

Various aspects of the invention are described in detail in the following sections. The use of sections is not meant to limit the invention. Each section can apply to any aspect of the invention. In this application, the use of "or" means "and/or" unless stated otherwise.

Methods of Treatment

As non-limiting examples, the present methods include gene therapy to express wild-type human Presenilin-1 or Presenilin-2 in a subject suffering from or susceptible to a neurodegenerative disease, e.g., associated with a mutation (e.g., a dominant negative mutation) in PSEN1 or PSEN2, e.g., Alzheimer's disease (e.g., familial AD patients carrying PSEN1 or PSEN2 mutations or sporadic AD patients). The objective of such a gene therapy is, among other things, to enhance expression of PS1 or PS2 in the brains of familial or sporadic AD patients in order to correct or overcome a deficit in PS1 or PS2 expression and/or activity. In FAD patients, it is expected that a gene therapy method described herein result in increased expression of wild-type PS1 or PS2 in the brain, rescuing the impairment of γ-secretase activity associated with PS1 or PS2 mutations.

Mutations in the Presenilin genes—PSEN1 and PSEN2—are highly penetrant and account for ~90% of all mutations identified in familial AD (FAD), highlighting their importance in the pathogenesis of AD. More than 260 distinct mutations in PSEN1 have been reported, and they are dominantly inherited and mostly missense mutations. Pathogenic PSEN1 mutations act in cis to impair mutant PS1 function and act in trans to inhibit wild-type PS1 function (Heilig et al. J Neurosci 33:11606-717 (2013); Zhou et al. Proc Natl Acad Sci USA 114:12731-12736 (2017). Typically, by their very nature dominant negative mutations cannot be rescued by expression of wild type protein (Herskowitz, I. Nature, 329:219-222 (1987)). However, surprisingly, as shown herein, transfection of hPSEN1 cDNA into immortalized MEFs carrying heterozygous and homozygous PSEN1 mutations rescued the impaired γ-secretase activity in these cells (see Examples, below), indicating that, surprisingly, overexpression of wild-type PS1 protein can overcome the dominant negative effects of the mutant Presenilin protein. Presenilin is the catalytic subunit of the γ-secretase complex, which also includes Nicastrin, APH-1 (anterior pharynx-defective 1) and PEN-2 (presenilin enhancer 2), all of which are required for the assembly, stability and activity of the γ-secretase complex. Surprisingly, and without wishing to be bound by theory, it is believed based on the present data that the wild-type Presenilin protein may be able to replace the mutant Presenilin protein in the γ-secretase complex. Thus, expression of wild type PS1 or PS2 proteins can be used to rescue the impairment of γ-secretase expression and/or activity in AD patients.

The methods and compositions described herein can equally be used to treat other neurodegenerative diseases, disorders or conditions.

Alzheimer's Disease

The methods described herein may be used to treat or reduce the risk of developing subjects with all types of Alzheimer's disease including, but not limited to, familial and sporadic Alzheimer's disease, early onset or late onset Alzheimer's disease. In some embodiments, the present methods may be used to treat or reduce the risk of development of early onset familial form of Alzheimer's disease (AD) that is associated with mutations in presenilin-1 (PS1) and/or presenilin-2 (PS2) (Sherrington, et al., Nature 375: 754-760 (1995); Rogaev, et al., Nature 376:775-778 (1995); Levy-Lahad, et al., Science 269:970-973 (1995); Hiltunen, et al., Eur. J. Hum. Genet. 8:259-266 (2000); Jonghe, et al., Hum. Mol. Genet. 8:1529-1540 (1999); Tysoe, et al., Am. J. Hum. Genet. 62:70-76 (1998); Crook, et al., Nat. Med. 4:452-455 (1998), all of which are incorporated by reference herein).

In some embodiments, the present methods may be used to treat a subject that has a mutation in the PSEN1 or PSEN2 allele, e.g., a mutation that has a dominant negative effect on wild-type PS1/PS2 proteins. Exemplary mutations include C410Y, Aex9, G548, D257A, L166P, R278I, L435F, G384A, Y115H, and L392V, as well as N141I, G206A, H163R, A79V, 5290C, A260P, A426P, A431E, R269H, L271V, C1410Y, E280G, P264L, E185D, L235V, and M146V mutations (see, e.g., Heilig et al., J. Neurosci., 33(28):11606-11617 (2013); Watanabe et al., J. Neurosci. 32(15):5085-5096 (2012); Brouwers et al., 2008 Ann Med 40 (8): 562-83); Watanabe and Shen, PNAS Nov. 28, 2017 114 (48) 12635-12637; Zhou et al., PNAS Nov. 28, 2017 114 (48) 12731-12736; Hsu et al., Alzheimers Res Ther. 2018 Jul. 18; 10(1):67). Additional exemplary mutations that may have a dominant negative effect on wild-type PS proteins can include, but are not limited to, in PSEN-1: N32N; R35Q; D40del (delGAC); D40del (delACG); E69D; A79V; V82L; 183_M84del (DelIM, ΔI83/M84, ΔI83/ΔM84); I83T; M84V; L85P; P88L; V89L (G>T); V89L (G>C); C92S; V94M; V96F; V97L; T99A; F105C; F105I; F105L; F105V; R108Q; L113_I114insT (Intron4, InsTAC, p. 113+1delG, splice5); L113P; L113Q; Y115C; Y115D; Y115H; T116I; T116N; T116R; P117A; P117L; P117R; P117S; E120D (A>C); E120D (A>T); E120G; E120K; E123K; Q127_R128del(CAGA); InsG(G) (c.379_382del XXXX-insG); H131R; 5132A; L134R; N135D; N135S; N135Y; A136G; M139I (G>C); M139I (G>A); M139K; M139L; M139T; M139V; V142F; I143F; I143M; I143N; I143T; I143V; M146I (G>C); M146I (G>T); M146I (G>A); M146L (A>C); M146L (A>T); M146V; T147I; T147P; L150P; L153V; Y154C; Y154N; Y156F; Y156_R157insIY; R157S; H163P; H163R; H163Y; A164V; W165C (G>C); W165C (G>T); W165G; L166H; L166P; L166R; L166V; L166del; 1167del (TTAdel); 1167del (TATdel); I168T; 5169del (ΔS169, Ser169del, ΔS170); S169L; S169P; S170F; S170P; L171P; L173F (G>C); L173F (G>T); L173W; L174del; L174M; L174R; F175S; F176L; F177L; F177S; S178P; G183V; E184D; E184G; V191A; I202F; G206A; G206D; G206S; G206V; G209A; G209E; G209R; G209V; 5212Y; I213F; I213L; I213T; H214D; H214N; H214Y; G217D; G217R; L219F; L219P; L219R; R220P; Q222H; Q222P; Q222R; Q223R; L226F; L226R; I229F; S230I; S230N; S230R; A231P; A231T; A231V; L232P; M233I (G>A); M233I (G>C); M233L (A>T); M233L (A>C); M233T; M233V; L235P; L235R; L235V; F237I; F237L; I238M; K239N; T245P; A246E; A246P; L248P; L248R; L250F; L250S; L250V; Y256S; A260V; V261F; V261L; L262F; L262V; C263F; C263R; P264L; G266S; P267A; P267L; P267S; R269G; R269H; L271V; V272A; E273A; E273G; T274R; A275V; R278I; R278K; R278S; R278T; E280A; (Paisa); E280G; E280K; L282F; L282R; L282V; F283L; P284L; P284S; A285V; L286P; L286V; T291A; T291P; K311R; E318G; D333G; R352C; R352_S353insR; T354I; R358Q; S365A; S365Y; R377M; R377W; G378E; G378V; G378fs; L381F; L381V; G384A; F386I; F386S; F388L; S390I; S390N; V391F; V391G; L392P; L392V; G394V; A396T; N405S; I408T; A409T; C410Y; V412I; I416T; G417S; L418F; L420R; L424F; L424H; L424R; L424V; A426P; A431E; (Jalisco); A431V; A434C; A434T; L435F; P436Q; P436S; I437V; I439S; I439V; T440del; 869-2A>G; 869-22 869-23ins18 (4E9, 49, deltaE9); 1238_K239insI; S290C; T291_S319del (ΔE9Finn, Δ9Finn, Δ9); S290C; T291_S319del (ΔE9, Δ9); S290C; T291_S319delA>G (ΔE9, Δ9); S290C; T291_S319delG>A (ΔE9, Δ9); S290C; T291_S319del G>T (ΔE9, Δ9); or S290W;S291_R377del (Δ9-10, Delta9-10, p.Ser290_Arg377delinsTrp, g. 73671948_73682054del) (mutations are named relative to Uniprot P49768.1 SEQ ID NO: 17/GenBank Ref. No. NM 000021.4), and in PSEN-2; T18M; R29H; G34S; R62C; R62H; P69A; R71W; K82R; A85V; V101M; K115Efs*; T122P; T122R; P123L; E126fs; E126K; S130L; V139M; N141I (Volga German); N141Y; L143H; V148I; K161R; R163H; H169N; M174V; S175C; G212V; V214L; Q228L; Y231C; I235F; A237V; L238F; L238P; M239I; M239V; A252T; A258T; T301M; K306fs; P334A; P334R; P348L; A377V; V393M; T430M; or D439A mutations are named relative to Uniprot P49810.1/GenBank Ref. No. NP 000438.2). See, e.g., Sun et al., Proc Natl Acad Sci USA. 2017; 114:E476-E485; Heilig et al., J Neurosci. 2013 Jul. 10; 33(28):11606-17; Zhou et al., PNAS Nov. 28, 2017 114 (48) 12731-12736. In some embodiments, the methods can include determining that a subject has such a mutation, e.g., using methods known in the art.

Typically, increasing forgetfulness or mild confusion are early symptoms of Alzheimer's disease. Gradually, cognitive impairment associated with Alzheimer's disease leads to memory loss, especially recent memories, disorientation and misinterpreting spatial relationships, difficulty in speaking, writing, thinking, reasoning, changes in personality and behavior resulting in depression, anxiety, social withdrawal, mood swings, distrust in others, irritability and aggressiveness, changes in sleeping habits, wandering, loss of inhibitions, delusions, and eventually death.

Other Neurodegenerative Diseases, Disorders or Conditions

In addition to Alzheimer's disease, the present methods may be used to treat other neurodegenerative diseases, disorders or conditions, including frontotemporal dementia, various types of memory loss, cognitive impairment including but not limited to mild cognitive impairment (MCI), or other conditions associated with loss of PS1, e.g., due to a mutation that creates a dominant negative isoform.

Presenilin-1 (PSEN1) and/or Presenilin-2 (PSEN2)

A presenilin-1 (PS1) or presenilin-2 (PS2)-encoding polynucleotide suitable for use in the compositions and methods described herein can include a full length gene or a portion or fragment thereof that encodes a protein retaining substantial gamma secretase activity of the wild-type protein, e.g., at least 50% of the gamma secretase activity, or at least 60, 70, 80, 90, or 95% of the activity of the wild-type protein determined by (e.g., in in vitro γ-secretase assays including those described in the Examples section, see also Watanabe et al., J. Neurosci. 32(15):5085-5096 (2012)). In some embodiments, a suitable PS1- or PS2-enocoding polynucleotide has a sequence that is at least 60%, 65%, 70%, 75%, 80%, 85%, 90%, 95%, 96%, 97%, 98%, 99% identical to the full length wild type genomic or cDNA PSEN1 or PSEN2 sequence, respectively. In some embodiments, a suitable PSEN1 or PSEN2 gene encodes a protein sequence that is at least 60%, 65%, 70%, 75%, 80%, 85%, 90%, 95%, 96%, 97%, 98%, 99% identical to the full-length wild type PS1 or PS2 protein sequence, respectively. Exemplary wild type genomic, cDNA, and protein sequences of human PSEN1/PS1 or PSEN2/PS2 are shown in Table 1 and below. Sequences for use in other species are known in the art. PS1 and PS2 are normally cleaved into N- and C-terminal fragments that are the active form. PS-1 is processed to give two fragments: an N-terminal 28 kDa fragment, and a C-terminal 18 kDa fragment; the principal endoproteolytic cleavage occurs at and near Met298 in the proximal portion of the large hydrophilic loop (Podlisny et al., Neurobiol Dis. 1997; 3(4):325-37; Marambaud et al., EMBO J. 2002 Apr. 15; 21(8):1948-56). Sequences comprising or encoding these cleaved forms can also be used in the methods and compositions described herein, e.g., encoding amino acids 1-291, 1-292, 1-293, 1-294, 1-295, 1-296, 1-297, 1-298, or 1-299 of SEQ ID NO:5 or a corresponding fragment of SEQ ID NO:6-8.

TABLE 1

GenBank Accession Nos.

| Isoform | mRNA | Protein | RefSeqGene |
|---|---|---|---|
| presenilin-1 isoform I-467 | NM_000021.3 (SEQ ID NO: 1) | NP_000012.1 (SEQ ID NO: 5) | NG_007386.2 Range 4965 to 92221 |
| presenilin-1 isoform I-463 | NM_007318.2 (SEQ ID NO: 2) | NP_015557.2 (SEQ ID NO: 6) | |
| presenilin-2 isoform 1 | NM_000447.2 (SEQ ID NO: 3) | NP_000438.2 (SEQ ID NO: 7) | NG_007381.1 Range 5001 to 30532 |
| presenilin-2 isoform 2 | NM_012486.2 (SEQ ID NO: 4) | NP_036618.2 (SEQ ID NO: 8) | |

>NM_000021.3 Homo sapiens presenilin 1 (PSEN1), transcript variant 1, mRNA (SEQ ID NO: 1)

AAATGACGACAACGGTGAGGGTTCTCGGGCGGGGCCTGGGACAGGCAGCTCCGGGGTCCGCGGTTTCACA

TCGGAAACAAAACAGCGGCTGGTCTGGAAGGAACCTGAGCTACGAGCCGCGGCGGCAGCGGGGCGGCGGG

GAAGCGTATACCTAATCTGGGAGCCTGCAAGTGACAACAGCCTTTGCGGTCCTTAGACAGCTTGGCCTGG

AGGAGAACACATGAAAGAAAGAACCTCAAGAGGCTTTGTTTTCTGTGAAACAGTATTTCTATACAGTTGC

TCCAATGACAGAGTTACCTGCACCGTTGTCCTACTTCCAGAATGCACAGATGTCTGAGGACAACCACCTG

AGCAATACTGTACGTAGCCAGAATGACAATAGAGAACGGCAGGAGCACAACGACAGACGGAGCCTTGGCC

ACCCTGAGCCATTATCTAATGGACGACCCCAGGGTAACTCCCGGCAGGTGGTGGAGCAAGATGAGGAAGA

AGATGAGGAGCTGACATTGAAATATGGCGCCAAGCATGTGATCATGCTCTTTGTCCCTGTGACTCTCTGC

ATGGTGGTGGTCGTGGCTACCATTAAGTCAGTCAGCTTTTATACCCGGAAGGATGGGCAGCTAATCTATA

CCCCATTCACAGAAGATACCGAGACTGTGGGCCAGAGAGCCCTGCACTCAATTCTGAATGCTGCCATCAT

GATCAGTGTCATTGTTGTCATGACTATCCTCCTGGTGGTTCTGTATAAATACAGGTGCTATAAGGTCATC

CATGCCTGGCTTATTATATCATCTCTATTGTTGCTGTTCTTTTTTTCATTCATTTACTTGGGGGAAGTGT

TTAAAACCTATAACGTTGCTGTGGACTACATTACTGTTGCACTCCTGATCTGGAATTTTGGTGTGGTGGG

AATGATTTCCATTCACTGGAAAGGTCCACTTCGACTCCAGCAGGCATATCTCATTATGATTAGTGCCCTC

ATGGCCCTGGTGTTTATCAAGTACCTCCCTGAATGGACTGCGTGGCTCATCTTGGCTGTGATTTCAGTAT

ATGATTTAGTGGCTGTTTTGTGTCCGAAAGGTCCACTTCGTATGCTGGTTGAAACAGCTCAGGAGAGAAA

TGAAACGCTTTTTCCAGCTCTCATTTACTCCTCAACAATGGTGTGGTTGGTGAATATGGCAGAAGGAGAC

CCGGAAGCTCAAAGGAGAGTATCCAAAAATTCCAAGTATAATGCAGAAAGCACAGAAAGGGAGTCACAAG

ACACTGTTGCAGAGAATGATGATGGCGGGTTCAGTGAGGAATGGGAAGCCCAGAGGGACAGTCATCTAGG

GCCTCATCGCTCTACACCTGAGTCACGAGCTGCTGTCCAGGAACTTTCCAGCAGTATCCTCGCTGGTGAA

GACCCAGAGGAAAGGGGAGTAAAACTTGGATTGGGAGATTTCATTTTCTACAGTGTTCTGGTTGGTAAAG

CCTCAGCAACAGCCAGTGGAGACTGGAACACAACCATAGCCTGTTTCGTAGCCATATTAATTGGTTTGTG

CCTTACATTATTACTCCTTGCCATTTTCAAGAAAGCATTGCCAGCTCTTCCAATCTCCATCACCTTTGGG

CTTGTTTTCTACTTTGCCACAGATTATCTTGTACAGCCTTTTATGGACCAATTAGCATTCCATCAATTTT

ATATCTAGCATATTTGCGGTTAGAATCCCATGGATGTTTCTTCTTTGACTATAACAAAATCTGGGGAGGA

CAAAGGTGATTTTCCTGTGTCCACATCTAACAAAGTCAAGATTCCCGGCTGGACTTTTGCAGCTTCCTTC

-continued

```
CAAGTCTTCCTGACCACCTTGCACTATTGGACTTTGGAAGGAGGTGCCTATAGAAAACGATTTTGAACAT

ACTTCATCGCAGTGGACTGTGTCCCTCGGTGCAGAAACTACCAGATTTGAGGGACGAGGTCAAGGAGATA

TGATAGGCCCGGAAGTTGCTGTGCCCCATCAGCAGCTTGACGCGTGGTCACAGGACGATTTCACTGACAC

TGCGAACTCTCAGGACTACCGTTACCAAGAGGTTAGGTGAAGTGGTTTAAACCAAACGGAACTCTTCATC

TTAAACTACACGTTGAAAATCAACCCAATAATTCTGTATTAACTGAATTCTGAACTTTTCAGGAGGTACT

GTGAGGAAGAGCAGGCACCAGCAGCAGAATGGGGAATGGAGAGGTGGGCAGGGGTTCCAGCTTCCCTTTG

ATTTTTTGCTGCAGACTCATCCTTTTTAAATGAGACTTGTTTTCCCCTCTCTTTGAGTCAAGTCAAATAT

GTAGATTGCCTTTGGCAATTCTTCTTCTCAAGCACTGACACTCATTACCGTCTGTGATTGCCATTTCTTC

CCAAGGCCAGTCTGAACCTGAGGTTGCTTTATCCTAAAAGTTTTAACCTCAGGTTCCAAATTCAGTAAAT

TTTGGAAACAGTACAGCTATTTCTCATCAATTCTCTATCATGTTGAAGTCAAATTTGGATTTTCCACCAA

ATTCTGAATTTGTAGACATACTTGTACGCTCACTTGCCCCAGATGCCTCCTCTGTCCTCATTCTTCTCTC

CCACACAAGCAGTCTTTTTCTACAGCCAGTAAGGCAGCTCTGTCGTGGTAGCAGATGGTCCCATTATTCT

AGGGTCTTACTCTTTGTATGATGAAAAGAATGTGTTATGAATCGGTGCTGTCAGCCCTGCTGTCAGACCT

TCTTCCACAGCAAATGAGATGTATGCCCAAAGACGGTAGAATTAAAGAAGAGTAAAATGGCTGTTGAAGC

ACTTTCTGTCCTGGTATTTTGTTTTTGCTTTTGCCACACAGTAGCTCAGAATTTGAACAAATAGCCAAAA

GCTGGTGGTTGATGAATTATGAACTAGTTGTATCAACACAAAGCAAGAGTTGGGGAAAGCCATATTTAAC

TTGGTGAGCTGTGGGAGAACCTGGTGGCAGAAGGAGAACCAACTGCCAAGGGGAAAGAGAAGGGGCCTCC

AGCAGCGAAGGGGATACAGTGAGCTAATGATGTCAAGGAGGAGTTTCAGGTTATTCTCGTCAGCTCCACA

AATGGGTGCTTTGTGGTCTCTGCCCGCGTTACCTTTCCTCTCAATGTACCTTTGTGTGAACTGGGCAGTG

GAGGTGCCTGCTGCAGTTACCATGGAGTTCAGGCTCTGGGCAGCTCAGTCAGGCAAAACACACAAACAGC

CATCAGCCTGTGTGGGCTCAGGGCACCTCTGGACAAAGGCTTGTGGGGCATAACCTTCTTTACCACAGAG

AGCCCTTAGCTATGCTGATCAGACCGTAAGCGTTTATGAGAAACTTAGTTTCCTCCTGTGGCTGAGGAGG

GGCCAGCTTTTTCTTCTTTTGCCTGCTGTTTTCTCTCCCAATCTATGATATGATATGACCTGGTTTGGGG

CTGTCTTTGGTGTTTAGAATATTTGTTTTCTGTCCCAGGATATTTCTTATAAGAACCTAACTTCAAGAGT

AGTGTGCGAGTACTGATCTGAATTTAAATTAAAATTGGCTTATATTAGGCAGTCACAGACAGGAAAAATA

AGAGCTATGCAAAGAAAGGGGGATTTAAAGTAGTAGGTTCTATCATCTCAATTCATTTTTTTCCATGAAA

TCCCTTCTTCCAAGATTCATTCCCTCTCTCAGACATGTGCTAGCATGGGTATTATCATTGAGAAAGCACA

GCTACAGCAAAGCCACCTGAATAGCAATTTGTGATTGGAAGCATTCTTGAGGGATCCCTAATCTAGAGTA

ATTTATTTGTGTAAGGATCCCAAATGTGTTGCACCTTTCATGATACATTTCTTCTCTGAAGAGGGTACGT

GGGGTGTGTGTATTTAAATCCATCCTATGTATTACTGATTGTCCTGTGTAGAAAGATGGCAATTATTCTG

TCTCTTTCTCCAAGTTTGAGCCACATCTCAGCCACATTGTTAGACAGTGTACAGAGAACCTATCTTTCCT

TTTTTTTTTTTAAAGGACAGGATTTTGCTGTGTTGCCCAGGCTAGACTTGAACTCCTGGGCTCAAGTAA

TCCACCTCAGCCTGAGTAGCTGAGACTACAGCCCATCTTATTTCTTTAAATCATTCATCTCAGGCAGAGA

ACTTTTCCCTCAAACATTCTTTTTAGAATTAGTTCAGTCATTCCTAAAACATCCAAATGCTAGTCTTCCA

CCATGAAAAATAGATTGTCACTGGAAAGAACAGTAGCAATTTCCATAAGGATGTGCCTTCACTCACACGG

GACAGGCGGTGGTTATAGAGTCGGGCAAAACCAGCAGTAGAGTATGACCAGCCAAGCCAATCTGCTTAAT

AAAAAGATGGAAGACAGTAAGGAAGGAAAGTAGCCACTAAGAGTCTGAGTCTGACTGGGCTACAGAATAA

AGGGTATTTATGGACAGAATGTCATTACATGCCTATGGGAATACCAATCATATTTGGAAGATTTGCAGAT

TTTTTTTCAGAGAGGAAAGACTCACCTTCCTGTTTTTGGTTCTCAGTAGGTTCGTGTGTGTTCCTAGAAT

CACAGCTCTGACTCCAAATGACTCAATTTCTCAATTAGAAAAAGTAGAAGCTTTCTAAGCAACTTGGAAG
```

-continued

```
AAAACAGTCATAAGTAAGCAATTTGTTGATTTTACTACAGAAGCAACAACTGAAGAGGCAGTGTTTTTAC

TTTCAGACTCCGGGATTCCCATTCTGTAGTCTCTCTGCTTTTAAAAACCCTCCTTTTGCAATAGATGCCC

AAACAGATGATGTTTATTACTTGTTATTTACGTGGCCTCAGACAGTGTATGTATTCTCGATATAACTTGT

AGAGTGTGAAATATAAGTTTAACTACCAAATAAGGTCTCCCAGGGTTAGATGACTGCGGGAAGCCTTTGA

TCCCAACCCCCAAGGCTTTGTATATTTGATCATTTGTGATCTAACCCTGGAAGAAAAAGAGCTCAGAAAC

CACTATGAAAAAATTTGTTCAGTGTTTTCTGTGTTCCCGTAGGTTCTGGAGTCTGAGGATGCAAAGATGA

ATAAGATAAATTCTCAGAATGTAGTTATAATCTCTTGTTTTCTGGTATATGCCATCTTTCTTTAACTTCT

CTAAAATATTGGGTATTTGTCAAATAACCACTTTTAACAGTTACCATTACTGAGGGCTTATACATTGGTG

TTATAAAAGTGACTTGATTCAGAAATCAATCCATTCAGTAAAGTACTCCTTCTCTAAATTTGCTGTTATG

TCTATAAGGAACAGTTTGACCTGCCCTTCTCCTCACCTCCTCACCTGCCTTCCAACATTGAATTTGGAAG

GAGACGTGAAAATTGGACATTTGGTTTTGCCCTTGGGCTGGAAACTATCATATAATCATAAGTTTGAGCC

TAGAAGTGATCCTTGTGATCTTCTCACCTCTTTAAATTCCCACAACACAAGAGATTAAAAACAGAGGTTT

CAGCTCTTCATAGTGCGTTGTGAAATGGCTGGCCAGAGTGTACCAACAAAGCTGTCATCGGGCTCACAGC

TCAGAGACATCTGCATGTGATCATCTGCATAGTCCTCTCCTCTAACGGGAAACACCTCAGATTTGCATAT

AAAAAAGCACCCTGGTGCTGAAATGAACCCCTTTCTTGAACATCAAAGCTGTCTCCCACAGCCTTGGGCA

GCAGGGTGCCTCTTAGTGGATGTGCTGGGTCCACCCTGAGCCCTGACATGTGGTGGCAGCATTGCCAGTT

GGTCTGTGTGTCTGTGTAGCAGGGACGATTTCCCAGAAAGCAATTTTCCTTTTGAAATACGTAATTGTTG

AGACTAGGCAGTTTCAAAGTCAGCTGCATATAGTAGCAAGTACAGGACTGTCTTGTTTTTGGTGTCCTTG

GAGGTGCTGGGGTGAGGGTTTCAGTGGGATCATTTACTCTCACATGTTGTCTGCCTTCTGCTTCTGTGGA

CACTGCTTTGTACTTAATTCAGACAGACTGTGAATACACCTTTTTTATAAATACCTTTCAAATTCTTGGT

AAGATATAATTTTGATAGCTGATTGCAGATTTTCTGTATTTGTCAGATTAATAAAGACTGCATGAATCCA

AAAAAAAAAAAAAAAA
```

>NM_007318.2 Homo sapiens presenilin 1 (PSEN1), transcript variant 2, mRNA (SEQ ID NO: 2)

```
AAATGACGACAACGGTGAGGGTTCTCGGGCGGGGCCTGGGACAGGCAGCTCCGGGGTCCGCGGTTTCACA

TCGGAAACAAAACAGCGGCTGGTCTGGAAGGAACCTGAGCTACGAGCCGCGGCGGCAGCGGGGCGGCGGG

GAAGCGTATACCTAATCTGGGAGCCTGCAAGTGACAACAGCCTTTGCGGTCCTTAGACAGCTTGGCCTGG

AGGAGAACACATGAAAGAAAGAACCTCAAGAGGCTTTGTTTTCTGTGAAACAGTATTTCTATACAGTTGC

TCCAATGACAGAGTTACCTGCACCGTTGTCCTACTTCCAGAATGCACAGATGTCTGAGGACAACCACCTG

AGCAATACTAATGACAATAGAGAACGGCAGGAGCACAACGACAGACGGAGCCTTGGCCACCCTGAGCCAT

TATCTAATGGACGACCCCAGGGTAACTCCCGGCAGGTGGTGGAGCAAGATGAGGAAGAAGATGAGGAGCT

GACATTGAAATATGGCGCCAAGCATGTGATCATGCTCTTTGTCCCTGTGACTCTCTGCATGGTGGTGGTC

GTGGCTACCATTAAGTCAGTCAGCTTTTATACCCGGAAGGATGGGCAGCTAATCTATACCCCATTCACAG

AAGATACCGAGACTGTGGGCCAGAGAGCCCTGCACTCAATTCTGAATGCTGCCATCATGATCAGTGTCAT

TGTTGTCATGACTATCCTCCTGGTGGTTCTGTATAAATACAGGTGCTATAAGGTCATCCATGCCTGGCTT

ATTATATCATCTCTATTGTTGCTGTTCTTTTTTTCATTCATTTACTTGGGGGAAGTGTTTAAAACCTATA

ACGTTGCTGTGGACTACATTACTGTTGCACTCCTGATCTGGAATTTTGGTGTGGTGGGAATGATTTCCAT

TCACTGGAAAGGTCCACTTCGACTCCAGCAGGCATATCTCATTATGATTAGTGCCCTCATGGCCCTGGTG

TTTATCAAGTACCTCCCTGAATGGACTGCGTGGCTCATCTTGGCTGTGATTTCAGTATATGATTTAGTGG

CTGTTTTGTGTCCGAAAGGTCCACTTCGTATGCTGGTTGAAACAGCTCAGGAGAGAAATGAAACGCTTTT

TCCAGCTCTCATTTACTCCTCAACAATGGTGTGGTTGGTGAATATGGCAGAAGGAGACCCGGAAGCTCAA
```

-continued

```
AGGAGAGTATCCAAAAATTCCAAGTATAATGCAGAAAGCACAGAAAGGGAGTCACAAGACACTGTTGCAG

AGAATGATGATGGCGGGTTCAGTGAGGAATGGGAAGCCCAGAGGGACAGTCATCTAGGGCCTCATCGCTC

TACACCTGAGTCACGAGCTGCTGTCCAGGAACTTTCCAGCAGTATCCTCGCTGGTGAAGACCCAGAGGAA

AGGGGAGTAAAACTTGGATTGGGAGATTTCATTTTCTACAGTGTTCTGGTTGGTAAAGCCTCAGCAACAG

CCAGTGGAGACTGGAACACAACCATAGCCTGTTTCGTAGCCATATTAATTGGTTTGTGCCTTACATTATT

ACTCCTTGCCATTTTCAAGAAAGCATTGCCAGCTCTTCCAATCTCCATCACCTTTGGGCTTGTTTTCTAC

TTTGCCACAGATTATCTTGTACAGCCTTTTATGGACCAATTAGCATTCCATCAATTTTATATCTAGCATA

TTTGCGGTTAGAATCCCATGGATGTTTCTTCTTTGACTATAACAAAATCTGGGGAGGACAAAGGTGATTT

TCCTGTGTCCACATCTAACAAAGTCAAGATTCCCGGCTGGACTTTTGCAGCTTCCTTCCAAGTCTTCCTG

ACCACCTTGCACTATTGGACTTTGGAAGGAGGTGCCTATAGAAAACGATTTTGAACATACTTCATCGCAG

TGGACTGTGTCCCTCGGTGCAGAAACTACCAGATTTGAGGGACGAGGTCAAGGAGATATGATAGGCCCGG

AAGTTGCTGTGCCCCATCAGCAGCTTGACGCGTGGTCACAGGACGATTTCACTGACACTGCGAACTCTCA

GGACTACCGTTACCAAGAGGTTAGGTGAAGTGGTTTAAACCAAACGGAACTCTTCATCTTAAACTACACG

TTGAAAATCAACCCAATAATTCTGTATTAACTGAATTCTGAACTTTTCAGGAGGTACTGTGAGGAAGAGC

AGGCACCAGCAGCAGAATGGGAATGGAGAGGTGGGCAGGGGTTCCAGCTTCCCTTTGATTTTTTGCTGC

AGACTCATCCTTTTTAAATGAGACTTGTTTTCCCCTCTCTTTGAGTCAAGTCAAATATGTAGATTGCCTT

TGGCAATTCTTCTTCTCAAGCACTGACACTCATTACCGTCTGTGATTGCCATTTCTTCCCAAGGCCAGTC

TGAACCTGAGGTTGCTTTATCCTAAAAGTTTTAACCTCAGGTTCCAAATTCAGTAAATTTTGGAAACAGT

ACAGCTATTTCTCATCAATTCTCTATCATGTTGAAGTCAAATTTGGATTTTCCACCCAAATTCTGAATTTG

TAGACATACTTGTACGCTCACTTGCCCCAGATGCCTCCTCTGTCCTCATTCTTCTCTCCCACACAAGCAG

TCTTTTTCTACAGCCAGTAAGGCAGCTCTGTCGTGGTAGCAGATGGTCCCATTATTCTAGGGTCTTACTC

TTTGTATGATGAAAAGAATGTGTTATGAATCGGTGCTGTCAGCCCTGCTGTCAGACCTTCTTCCACAGCA

AATGAGATGTATGCCCAAAGACGGTAGAATTAAAGAAGAGTAAAATGGCTGTTGAAGCACTTTCTGTCCT

GGTATTTTGTTTTTGCTTTTGCCACACAGTAGCTCAGAATTTGAACAAATAGCCAAAAGCTGGTGGTTGA

TGAATTATGAACTAGTTGTATCAACACAAAGCAAGAGTTGGGGAAAGCCATATTTAACTTGGTGAGCTGT

GGGAGAACCTGGTGGCAGAAGGAGAACCAACTGCCAAGGGGAAAGAGAAGGGGCCTCCAGCAGCGAAGGG

GATACAGTGAGCTAATGATGTCAAGGAGGAGTTTCAGGTTATTCTCGTCAGCTCCACAAATGGGTGCTTT

GTGGTCTCTGCCCGCGTTACCTTTCCTCTCAATGTACCTTTGTGTGAACTGGGCAGTGGAGGTGCCTGCT

GCAGTTACCATGGAGTTCAGGCTCTGGGCAGCTCAGTCAGGCAAAACACACAAACAGCCATCAGCCTGTG

TGGGCTCAGGGCACCTCTGGACAAAGGCTTGTGGGCATAACCTTCTTTACCACAGAGAGCCCTTAGCTA

TGCTGATCAGACCGTAAGCGTTTATGAGAAACTTAGTTTCCTCCTGTGGCTGAGGAGGGGCCAGCTTTTT

CTTCTTTTGCCTGCTGTTTTCTCTCCCAATCTATGATATGATATGACCTGGTTTGGGGCTGTCTTTGGTG

TTTAGAATATTTGTTTTCTGTCCCAGGATATTTCTTATAAGAACCTAACTTCAAGAGTAGTGTGCGAGTA

CTGATCTGAATTTAAATTAAAATTGGCTTATATTAGGCAGTCACAGACAGGAAAAATAAGAGCTATGCAA

AGAAAGGGGGATTTAAAGTAGTAGGTTCTATCATCTCAATTCATTTTTTTCCATGAAATCCCTTCTTCCA

AGATTCATTCCCTCTCTCAGACATGTGCTAGCATGGGTATTATCATTGAGAAAGCACAGCTACAGCAAAG

CCACCTGAATAGCAATTTGTGATTGGAAGCATTCTTGAGGGATCCCTAATCTAGAGTAATTTATTTGTGT

AAGGATCCCAAATGTGTTGCACCTTTCATGATACATTTCTTCTCTGAAGAGGGTACGTGGGGTGTGTA

TTTAAATCCATCCTATGTATTACTGATTGTCCTGTGTAGAAAGATGGCAATTATTCTGTCTCTTTCTCCA

AGTTTGAGCCACATCTCAGCCACATTGTTAGACAGTGTACAGAGAACCTATCTTTCCTTTTTTTTTTTTT

AAAGGACAGGATTTTGCTGTGTTGCCCAGGCTAGACTTGAACTCCTGGGCTCAAGTAATCCACCTCAGCC
```

-continued

```
TGAGTAGCTGAGACTACAGCCCATCTTATTTCTTTAAATCATTCATCTCAGGCAGAGAACTTTTCCCTCA
AACATTCTTTTTAGAATTAGTTCAGTCATTCCTAAAACATCCAAATGCTAGTCTTCCACCATGAAAAATA
GATTGTCACTGGAAAGAACAGTAGCAATTTCCATAAGGATGTGCCTTCACTCACACGGGACAGGCGGTGG
TTATAGAGTCGGGCAAAACCAGCAGTAGAGTATGACCAGCCAAGCCAATCTGCTTAATAAAAAGATGGAA
GACAGTAAGGAAGGAAAGTAGCCACTAAGAGTCTGAGTCTGACTGGGCTACAGAATAAAGGGTATTTATG
GACAGAATGTCATTACATGCCTATGGGAATACCAATCATATTTGGAAGATTTGCAGATTTTTTTCAGAG
AGGAAAGACTCACCTTCCTGTTTTTGGTTCTCAGTAGGTTCGTGTGTGTTCCTAGAATCACAGCTCTGAC
TCCAAATGACTCAATTTCTCAATTAGAAAAAGTAGAAGCTTTCTAAGCAACTTGGAAGAAAACAGTCATA
AGTAAGCAATTTGTTGATTTTACTACAGAAGCAACAACTGAAGAGGCAGTGTTTTACTTTCAGACTCCG
GGATTCCCATTCTGTAGTCTCTCTGCTTTTAAAAACCCTCCTTTTGCAATAGATGCCCAAACAGATGATG
TTTATTACTTGTTATTTACGTGGCCTCAGACAGTGTATGTATTCTCGATATAACTTGTAGAGTGTGAAAT
ATAAGTTTAACTACCAAATAAGGTCTCCCAGGGTTAGATGACTGCGGGAAGCCTTTGATCCCAACCCCCA
AGGCTTTGTATATTTGATCATTTGTGATCTAACCCTGGAAGAAAAAGAGCTCAGAAACCACTATGAAAAA
ATTTGTTCAGTGTTTTCTGTGTTCCCGTAGGTTCTGGAGTCTGAGGATGCAAAGATGAATAAGATAAATT
CTCAGAATGTAGTTATAATCTCTTGTTTTCTGGTATATGCCATCTTTCTTTAACTTCTCTAAAATATTGG
GTATTTGTCAAATAACCACTTTTAACAGTTACCATTACTGAGGGCTTATACATTGGTGTTATAAAAGTGA
CTTGATTCAGAAATCAATCCATTCAGTAAAGTACTCCTTCTCTAAATTTGCTGTTATGTCTATAAGGAAC
AGTTTGACCTGCCCTTCTCCTCACCTCCTCACCTGCCTTCCAACATTGAATTTGGAAGGAGACGTGAAAA
TTGGACATTTGGTTTTGCCCTTGGGCTGGAAACTATCATATAATCATAAGTTTGAGCCTAGAAGTGATCC
TTGTGATCTTCTCACCTCTTTAAATTCCCACAACACAAGAGATTAAAAACAGAGGTTTCAGCTCTTCATA
GTGCGTTGTGAAATGGCTGGCCAGAGTGTACCAACAAAGCTGTCATCGGGCTCACAGCTCAGAGACATCT
GCATGTGATCATCTGCATAGTCCTCTCCTCTAACGGGAAACACCTCAGATTTGCATATAAAAAAGCACCC
TGGTGCTGAAATGAACCCCTTTCTTGAACATCAAAGCTGTCTCCCACAGCCTTGGGCAGCAGGGTGCCTC
TTAGTGGATGTGCTGGGTCCACCCTGAGCCCTGACATGTGGTGGCAGCATTGCCAGTTGGTCTGTGTGTC
TGTGTAGCAGGGACGATTTCCCAGAAAGCAATTTTCCTTTTGAAATACGTAATTGTTGAGACTAGGCAGT
TTCAAAGTCAGCTGCATATAGTAGCAAGTACAGGACTGTCTTGTTTTTGGTGTCCTTGGAGGTGCTGGGG
TGAGGGTTTCAGTGGGATCATTTACTCTCACATGTTGTCTGCCTTCTGCTTCTGTGGACACTGCTTTGTA
CTTAATTCAGACAGACTGTGAATACACCTTTTTTATAAATACCTTTCAAATTCTTGGTAAGATATAATTT
TGATAGCTGATTGCAGATTTTCTGTATTTGTCAGATTAATAAGACTGCATGAATCCAAAAAAAAAAAAA
AAAAA

>NM_000447.2 Homo sapiens presenilin 2 (PSEN2), transcript variant 1,
mRNA
                                                              (SEQ ID NO: 3)
GGGGCCTGGGCCGGCGCCGGGTCCGGCCGGGCGCTCAGCCAGCTGCGTAAACTCCGCTGGAGCGCGGCGG
CAGAGCAGGCATTTCCAGCAGTGAGGAGACAGCCAGAAGCAAGCTTTTGGAGCTGAAGGAACCTGAGACA
GAAGCTAGTCCCCCCTCTGAATTTTACTGATGAAGAAACTGAGGCCACAGAGCTAAAGTGACTTTTCCCA
AGGTCGCCCAGCGAGGACGTGGGACTTCTCAGACGTCAGGAGAGTGATGTGAGGGAGCTGTGTGACCATA
GAAAGTGACGTGTTAAAAACCAGCGCTGCCCTCTTTGAAAGCCAGGGAGCATCATTCATTTAGCCTGCTG
AGAAGAAGAAACCAAGTGTCCGGGATTCAGACCTCTCTGCGGCCCCAAGTGTTCGTGGTGCTTCCAGAGG
CAGGGCTATGCTCACATTCATGGCCTCTGACAGCGAGGAAGAAGTGTGTGATGAGCGGACGTCCCTAATG
TCGGCTGAGAGCCCCACGCCGCGCTCCTGCCAGGAGGGCAGGCAGGGCCCAGAGGATGGAGAGAACACTG
CCCAGTGGAGAAGCCAGGAGAACGAGGAGGACGGTGAGGAGGACCCTGACCGCTATGTCTGTAGTGGGGT
```

-continued

```
TCCCGGGCGGCCGCCAGGCCTGGAGGAAGAGCTGACCCTCAAATACGGAGCGAAGCACGTGATCATGCTG
TTTGTGCCTGTCACTCTGTGCATGATCGTGGTGGTAGCCACCATCAAGTCTGTGCGCTTCTACACAGAGA
AGAATGGACAGCTCATCTACACGCCATTCACTGAGGACACACCCTCGGTGGGCCAGCGCCTCCTCAACTC
CGTGCTGAACACCCTCATCATGATCAGCGTCATCGTGGTTATGACCATCTTCTTGGTGGTGCTCTACAAG
TACCGCTGCTACAAGTTCATCCATGGCTGGTTGATCATGTCTTCACTGATGCTGCTGTTCCTCTTCACCT
ATATCTACCTTGGGGAAGTGCTCAAGACCTACAATGTGGCCATGGACTACCCCACCCTCTTGCTGACTGT
CTGGAACTTCGGGGCAGTGGGCATGGTGTGCATCCACTGGAAGGGCCCTCTGGTGCTGCAGCAGGCCTAC
CTCATCATGATCAGTGCGCTCATGGCCCTAGTGTTCATCAAGTACCTCCCAGAGTGGTCCGCGTGGGTCA
TCCTGGGCGCCATCTCTGTGTATGATCTCGTGGCTGTGCTGTGTCCCAAAGGGCCTCTGAGAATGCTGGT
AGAAACTGCCCAGGAGAGAAATGAGCCCATATTCCCTGCCCTGATATACTCATCTGCCATGGTGTGGACG
GTTGGCATGGCGAAGCTGGACCCCTCCTCTCAGGGTGCCCTCCAGCTCCCCTACGACCCGGAGATGGAAG
AAGACTCCTATGACAGTTTTGGGGAGCCTTCATACCCCGAAGTCTTTGAGCCTCCCTTGACTGGCTACCC
AGGGGAGGAGCTGGAGGAAGAGGAGGAAAGGGGCGTGAAGCTTGGCCTCGGGGACTTCATCTTCTACAGT
GTGCTGGTGGGCAAGGCGGCTGCCACGGGCAGCGGGGACTGGAATACCACGCTGGCCTGCTTCGTGGCCA
TCCTCATTGGCTTGTGTCTGACCCTCCTGCTGCTTGCTGTGTTCAAGAAGGCGCTGCCCGCCCTCCCCAT
CTCCATCACGTTCGGGCTCATCTTTTACTTCTCCACGGACAACCTGGTCGGCCGTTCATGGACACCCTG
GCCTCCCATCAGCTCTACATCTGAGGGACATGGTGTGCCACAGGCTGCAAGCTGCAGGGAATTTTCATTG
GATGCAGTTGTATAGTTTTACACTCTAGTGCCATATATTTTTAAGACTTTTCTTTCCTTAAAAAATAAAG
TACGTGTTTACTTGGTGAGGAGGAGGCAGAACCAGCTCTTTGGTGCCAGCTGTTTCATCACCAGACTTTG
GCTCCCGCTTTGGGGAGCGCCTCGCTTCACGGACAGGAAGCACAGCAGGTTTATCCAGATGAACTGAGAA
GGTCAGATTAGGGCGGGGAGAAGAGCATCCGGCATGAGGGCTGAGATGCGCAAAGAGTGTGCTCGGGAGT
GGCCCCTGGCACCTGGGTGCTCTGGCTGGAGAGGAAAAGCCAGTTCCCTACGAGGAGTGTTCCCAATGCT
TTGTCCATGATGTCCTTGTTATTTTATTGCCTTTAGAAACTGAGTCCTGTTCTTGTTACGGCAGTCACAC
TGCTGGGAAGTGGCTTAATAGTAATATCAATAAATAGATGAGTCCTGTTAGAATCTTGAAAA
```

>NM_012486.2 Homo sapiens presenilin 2 (PSEN2), transcript variant 2, mRNA (SEQ ID NO: 4)
```
GGGGCCTGGGCCGGCGCCGGGTCCGGCCGGGCGCTCAGCCAGCTGCGTAAACTCCGCTGGAGCGCGGCGG
CAGAGCAGGCATTTCCAGCAGTGAGGAGACAGCCAGAAGCAAGCTTTTGGAGCTGAAGGAACCTGAGACA
GAAGCTAGTCCCCCCTCTGAATTTTACTGATGAAGAAACTGAGGCCACAGAGCTAAAGTGACTTTTCCCA
AGGTCGCCCAGCGAGGACGTGGGACTTCTCAGACGTCAGGAGAGTGATGTGAGGGAGCTGTGTGACCATA
GAAAGTGACGTGTTAAAAACCAGCGCTGCCCTCTTTGAAAGCCAGGGAGCATCATTCATTTAGCCTGCTG
AGAAGAAGAAACCAAGTGTCCGGGATTCAGACCTCTCTGCGGCCCCAAGTGTTCGTGGTGCTTCCAGAGG
CAGGGCTATGCTCACATTCATGGCCTCTGACAGCGAGGAAGAAGTGTGTGATGAGCGGACGTCCCTAATG
TCGGCTGAGAGCCCCACGCCGCGCTCCTGCCAGGAGGGCAGGCAGGGCCCAGAGGATGGAGAGAACACTG
CCCAGTGGAGAAGCCAGGAGAACGAGGAGGACGGTGAGGAGGACCCTGACCGCTATGTCTGTAGTGGGGT
TCCCGGGCGGCCGCCAGGCCTGGAGGAAGAGCTGACCCTCAAATACGGAGCGAAGCACGTGATCATGCTG
TTTGTGCCTGTCACTCTGTGCATGATCGTGGTGGTAGCCACCATCAAGTCTGTGCGCTTCTACACAGAGA
AGAATGGACAGCTCATCTACACGCCATTCACTGAGGACACACCCTCGGTGGGCCAGCGCCTCCTCAACTC
CGTGCTGAACACCCTCATCATGATCAGCGTCATCGTGGTTATGACCATCTTCTTGGTGGTGCTCTACAAG
TACCGCTGCTACAAGTTCATCCATGGCTGGTTGATCATGTCTTCACTGATGCTGCTGTTCCTCTTCACCT
ATATCTACCTTGGGGAAGTGCTCAAGACCTACAATGTGGCCATGGACTACCCCACCCTCTTGCTGACTGT
```

-continued

```
CTGGAACTTCGGGGCAGTGGGCATGGTGTGCATCCACTGGAAGGGCCCTCTGGTGCTGCAGCAGGCCTAC

CTCATCATGATCAGTGCGCTCATGGCCCTAGTGTTCATCAAGTACCTCCCAGAGTGGTCCGCGTGGGTCA

TCCTGGGCGCCATCTCTGTGTATGATCTCGTGGCTGTGCTGTGTCCCAAAGGGCCTCTGAGAATGCTGGT

AGAAACTGCCCAGGAGAGAAATGAGCCCATATTCCCTGCCCTGATATACTCATCTGCCATGGTGTGGACG

GTTGGCATGGCGAAGCTGGACCCCTCCTCTCAGGGTGCCCTCCAGCTCCCCTACGACCCGGAGATGGAAG

ACTCCTATGACAGTTTTGGGGAGCCTTCATACCCCGAAGTCTTTGAGCCTCCCTTGACTGGCTACCCAGG

GGAGGAGCTGGAGGAAGAGGAGGAAAGGGGCGTGAAGCTTGGCCTCGGGGACTTCATCTTCTACAGTGTG

CTGGTGGGCAAGGCGGCTGCCACGGGCAGCGGGGACTGGAATACCACGCTGGCCTGCTTCGTGGCCATCC

TCATTGGCTTGTGTCTGACCCTCCTGCTGCTTGCTGTGTTCAAGAAGGCGCTGCCCGCCCTCCCCATCTC

CATCACGTTCGGGCTCATCTTTTACTTCTCCACGGACAACCTGGTGCGGCCGTTCATGGACACCCTGGCC

TCCCATCAGCTCTACATCTGAGGGACATGGTGTGCCACAGGCTGCAAGCTGCAGGGAATTTTCATTGGAT

GCAGTTGTATAGTTTTACACTCTAGTGCCATATATTTTTAAGACTTTTCTTTCCTTAAAAAATAAAGTAC

GTGTTTACTTGGTGAGGAGGAGGCAGAACCAGCTCTTTGGTGCCAGCTGTTTCATCACCAGACTTTGGCT

CCCGCTTTGGGGAGCGCCTCGCTTCACGGACAGGAAGCACAGCAGGTTTATCCAGATGAACTGAGAAGGT

CAGATTAGGGCGGGGAGAAGAGCATCCGGCATGAGGGCTGAGATGCGCAAAGAGTGTGCTCGGGAGTGGC

CCCTGGCACCTGGGTGCTCTGGCTGGAGAGGAAAAGCCAGTTCCCTACGAGGAGTGTTCCCAATGCTTTG

TCCATGATGTCCTTGTTATTTTATTGCCTTTAGAAACTGAGTCCTGTTCTTGTTACGGCAGTCACACTGC

TGGGAAGTGGCTTAATAGTAATATCAATAAATAGATGAGTCCTGTTAGAATCTTGAAAA
```

>NP_000012.1 presenilin-1 isoform I-467 [Homo sapiens]
(SEQ ID NO: 5)
MTELPAPLSYFQNAQMSEDNHLSNTVRSQNDNRERQEHNDRRSLGHPEPLSNGRPQGNSRQVVEQDEEED

EELTLKYGAKHVIMLFVPVTLCMVVVVATIKSVSFYTRKDGQLIYTPFTEDTETVGQRALHSILNAAIMI

SVIVVMTILLVVLYKYRCYKVIHAWLIISSLLLLFFFSFIYLGEVFKTYNVAVDYITVALLIWNFGVVGM

ISIHWKGPLRLQQAYLIMISALMALVFIKYLPEWTAWLILAVISVYDLVAVLCPKGPLRMLVETAQERNE

TLFPALIYSSTMVWLVNMAEGDPEAQRRVSKNSKYNAESTERESQDTVAENDDGGFSEEWEAQRDSHLGP

HRSTPESRAAVQELSSSILAGEDPEERGVKLGLGDFIFYSVLVGKASATASGDWNTTIACFVAILIGLCL

TLLLLAIFKKALPALPISITFGLVFYFATDYLVQPFMDQLAFHQFYI

>NP_015557.2 presenilin-1 isoform I-463 [Homo sapiens]
(SEQ ID NO: 6)
MTELPAPLSYFQNAQMSEDNHLSNTNDNRERQEHNDRRSLGHPEPLSNGRPQGNSRQVVEQDEEEDEELT

LKYGAKHVIMLFVPVTLCMVVVVATIKSVSFYTRKDGQLIYTPFTEDTETVGQRALHSILNAAIMISVIV

VMTILLVVLYKYRCYKVIHAWLIISSLLLLFFFSFIYLGEVFKTYNVAVDYITVALLIWNFGVVGMISIH

WKGPLRLQQAYLIMISALMALVFIKYLPEWTAWLILAVISVYDLVAVLCPKGPLRMLVETAQERNETLFP

ALIYSSTMVWLVNMAEGDPEAQRRVSKNSKYNAESTERESQDTVAENDDGGFSEEWEAQRDSHLGPHRST

PESRAAVQELSSSILAGEDPEERGVKLGLGDFIFYSVLVGKASATASGDWNTTIACFVAILIGLCLTLLL

LAIFKKALPALPISITFGLVFYFATDYLVQPFMDQLAFHQFYI

>NP_000438.2 presenilin-2 isoform 1 [Homo sapiens]
(SEQ ID NO: 7)
MLTFMASDSEEEVCDERTSLMSAESPTPRSCQEGRQGPEDGENTAQWRSQENEEDGEEDPDRYVCSGVPG

RPPGLEEELTLKYGAKHVIMLFVPVTLCMIVVVATIKSVRFYTEKNGQLIYTPFTEDTPSVGQRLLNSVL

NTLIMISVIVVMTIFLVVLYKYRCYKFIHGWLIMSSLMLLFLFTYIYLGEVLKTYNVAMDYPTLLLTVWN

FGAVGMVCIHWKGPLVLQQAYLIMISALMALVFIKYLPEWSAWVILGAISVYDLVAVLCPKGPLRMLVET

AQERNEPIFPALIYSSAMVWTVGMAKLDPSSQGALQLPYDPEMEEDSYDSFGEPSYPEVFEPPLTGYPGE

```
ELEEEEERGVKLGLGDFIFYSVLVGKAAATGSGDWNTTLACFVAILIGLCLTLLLLAVFKKALPALPISI

TFGLIFYFSTDNLVRPFMDTLASHQLYI

>NP_036618.2 presenilin-2 isoform 2 [Homo sapiens]
                                                        (SEQ ID NO: 8)
MLTFMASDSEEEVCDERTSLMSAESPTPRSCQEGRQGPEDGENTAQWRSQENEEDGEEDPDRYVCSGVPG

RPPGLEEELTLKYGAKHVIMLFVPVTLCMIVVVATIKSVRFYTEKNGQLIYTPFTEDTPSVGQRLLNSVL

NTLIMISVIVVMTIFLVVLYKYRCYKFIHGWLIMSSLMLLFLFTYIYLGEVLKTYNVAMDYPTLLLTVWN

FGAVGMVCIHWKGPLVLQQAYLIMISALMALVFIKYLPEWSAWVILGAISVYDLVAVLCPKGPLRMLVET

AQERNEPIFPALIYSSAMVWTVGMAKLDPSSQGALQLPYDPEMEDSYDSFGEPSYPEVFEPPLTGYPGEE

LEEEEERGVKLGLGDFIFYSVLVGKAAATGSGDWNTTLACFVAILIGLCLTLLLLAVFKKALPALPISIT

FGLIFYFSTDNLVRPFMDTLASHQLYI
```

To determine the percent identity of two amino acid sequences, or of two nucleic acid sequences, the sequences are aligned for optimal comparison purposes (e.g., gaps can be introduced in one or both of a first and a second amino acid or nucleic acid sequence for optimal alignment and non-homologous sequences can be disregarded for comparison purposes). The length of a reference sequence aligned for comparison purposes is at least 80% of the length of the reference sequence, and in some embodiments is at least 90% or 100%. The amino acid residues or nucleotides at corresponding amino acid positions or nucleotide positions are then compared. When a position in the first sequence is occupied by the same amino acid residue or nucleotide as the corresponding position in the second sequence, then the molecules are identical at that position. The percent identity between the two sequences is a function of the number of identical positions shared by the sequences, taking into account the number of gaps, and the length of each gap, which need to be introduced for optimal alignment of the two sequences. In another embodiment, the percent identity of two amino acid sequences can be assessed as a function of the conservation of amino acid residues within the same family of amino acids (e.g., positive charge, negative charge, polar and uncharged, hydrophobic) at corresponding positions in both amino acid sequences (e.g., the presence of an alanine residue in place of a valine residue at a specific position in both sequences shows a high level of conservation, but the presence of an arginine residue in place of an aspartate residue at a specific position in both sequences shows a low level of conservation).

For example, the percent identity between two amino acid sequences can be determined using the Needleman and Wunsch ((1970) J. Mol. Biol. 48:444-453) algorithm which has been incorporated into the GAP program in the GCG software package, using a Blossum scoring matrix, e.g., with default values for gap penalty, gap extend penalty of 4, and frameshift gap penalty.

Mutant Presenilin 1

In some embodiments, the PS1 protein contains a mutation. In some embodiments, the mutation is a conservative substitution. Such changes include substituting any of isoleucine (I), valine (V), and leucine (L) for any other of these hydrophobic amino acids; aspartic acid (D) for glutamic acid (E) and vice versa; glutamine (Q) for asparagine (N) and vice versa; and serine (S) for threonine (T) and vice versa. Other substitutions can also be considered conservative, depending on the environment of the particular amino acid and its role in the three-dimensional structure of the protein. For example, glycine (G) and alanine (A) can frequently be interchangeable, as can alanine (A) and valine (V). Methionine (M), which is relatively hydrophobic, can frequently be interchanged with leucine and isoleucine, and sometimes with valine. Lysine (K) and arginine (R) are frequently interchangeable in locations in which the significant feature of the amino acid residue is its charge and the differing pK's of these two amino acid residues are not significant. Still other changes can be considered "conservative" in particular environments (see, e.g. Table III of US20110201052; pages 13-15 "Biochemistry" 2nd ED. Stryer ed (Stanford University); Henikoff et al., PNAS 1992 Vol 89 10915-10919; Lei et al., J Biol Chem 1995 May 19; 270(20):11882-6).

In some embodiments, the methods include introducing one or more additional mutations into the human PS1 sequence (SEQ ID NOs:5 or 6). Thus, in some embodiments, the sequence can be at least 80%, 85%, 90%, 95%, or 99% identical to at least 60%, 70%, 80%, 90%, or 100% of an human PS1. In some embodiments, the methods include introducing one or more additional mutations into the human PS2 sequence (SEQ ID NOs:7 or 8). Thus, in some embodiments, the sequence can be at least 80%, 85%, 90%, 95%, or 99% identical to at least 60%, 70%, 80%, 90%, or 100% of an human PS2.

To determine the percent identity of two amino acid sequences, or of two nucleic acid sequences, the sequences are aligned for optimal comparison purposes (e.g., gaps can be introduced in one or both of a first and a second amino acid or nucleic acid sequence for optimal alignment and non-homologous sequences can be disregarded for comparison purposes). The length of a reference sequence aligned for comparison purposes is typically at least 80% of the length of the reference sequence, and in some embodiments is at least 90% or 100%. The amino acid residues or nucleotides at corresponding amino acid positions or nucleotide positions are then compared. When a position in the first sequence is occupied by the same amino acid residue or nucleotide as the corresponding position in the second sequence, then the molecules are identical at that position (as used herein amino acid or nucleic acid "identity" is equivalent to amino acid or nucleic acid "homology"). The percent identity between the two sequences is a function of the number of identical positions shared by the sequences, taking into account the number of gaps, and the length of each gap, which need to be introduced for optimal alignment of the two sequences. In another embodiment, the percent identity of two amino acid sequences can be assessed as a function of the conservation of amino acid residues within the same family of amino acids (e.g., positive charge, negative charge, polar and uncharged, hydrophobic) at corresponding positions in both amino acid sequences (e.g., the presence of an alanine residue in place of a valine residue at a specific position in both sequences shows a high level of conservation, but the presence of an arginine residue in place of an aspartate residue at a specific position in both sequences shows a low level of conservation).

For purposes of the present methods, the comparison of sequences and determination of percent identity between two sequences can be accomplished using a Blossum 62 scoring matrix with a gap penalty of 12, a gap extend penalty of 4, and a frameshift gap penalty of 5.

Delivery Vectors

Nucleic acids encoding a PS1 or PS2 polypeptide or therapeutically active fragment thereof can be incorporated into a gene construct to be used as a part of a gene therapy protocol. For example, described herein are targeted expression vectors for in vivo delivery and expression of a polynucleotide that encodes a PS1 or PS2 polypeptide or active fragment thereof in particular cell types, especially cerebral cortical neuronal cells. Expression constructs of such components can be administered in any effective carrier, e.g., any formulation or composition capable of effectively delivering the component gene to cells in vivo. Approaches include insertion of the gene in viral vectors, preferably adeno-associated virus. Viral vectors typically transduce cells directly.

Viral vectors capable of highly efficient transduction of CNS neurons may be employed, including any serotypes of rAAV (e.g., AAV1-AAV12) vectors, recombinant or chimeric AAV vectors, as well as lentivirus or other suitable viral vectors. In some embodiments, a polynucleotide encoding PS 1 or PS2 is operably linked to promoter suitable for expression in the CNS. For example, a neuron subtype-specific promoter, such as the alpha-calcium/calmodulin kinase 2A promoter may be used to target excitatory neurons. Alternatively, a pan neuronal promoter, such as the synapsin I promoter, may be used to drive PS 1 or PS2 expression. Other exemplary promoters include, but are not limited to, cytomegalovirus (CMV) early enhancer/promoter; a hybrid CMV enhance/chicken P-actin (CBA) promoter; a promoter comprising the CMV early enhancer element, the first exon and first intron of the chicken β-actin gene, and the splice acceptor of the rabbit β-globin gene (commonly call the "CAG promoter"); or a 1.6-kb hybrid promoter composed of a CMV immediate-early enhancer and CBA intron 1/exon 1 (commonly called the CAGGS promoter; Niwa et al. Gene, 108:193-199 (1991)). The CAGGS promoter (Niwa et al., 1991) has been shown to provide ubiquitous and long-term expression in the brain (Klein et al., Exp. Neurol. 176:66-74 (2002)). A typical approach for in vivo introduction of nucleic acid into a cell is by use of a viral vector containing nucleic acid, e.g., a cDNA encoding a PS1 or PS2. Among other things, infection of cells with a viral vector has the advantage that a large proportion of the targeted cells can receive the nucleic acid. Additionally, molecules encoded within the viral vector, e.g., by a cDNA contained in the viral vector, are expressed efficiently in cells that have taken up viral vector nucleic acid.

A viral vector system particularly useful for delivery of nucleic acids is the adeno-associated virus (AAV). Adeno-associated virus is a naturally occurring defective virus that requires another virus, such as an adenovirus or a herpes virus, as a helper virus for efficient replication and a productive life cycle. (For a review see Muzyczka et al., Curr. Topics in Micro and Immunol. 158:97-129 (1992)). AAV vectors efficiently transduce various cell types and can produce long-term expression of transgenes in vivo. Although AAV vector genomes can persist within cells as episomes, vector integration has been observed (see for example Deyle and Russell, Curr Opin Mol Ther. 2009 August; 11(4): 442-447; Asokan et al., Mol Ther. 2012 April; 20(4): 699-708; Flotte et al., Am. J. Respir. Cell. Mol. Biol. 7:349-356 (1992); Samulski et al., J. Virol. 63:3822-3828 (1989); and McLaughlin et al., J. Virol. 62:1963-1973 (1989)). AAV vectors, such as AAV2, have been extensively used for gene augmentation or replacement and have shown therapeutic efficacy in a range of animal models as well as in the clinic; see, e.g., Mingozzi and High, Nature Reviews Genetics 12, 341-355 (2011); Deyle and Russell, Curr Opin Mol Ther. 2009 August; 11(4): 442-447; Asokan et al., Mol Ther. 2012 April; 20(4): 699-708. AAV vectors containing as little as 300 base pairs of AAV can be packaged and can produce recombinant protein expression. Protocols for producing recombinant retroviruses and for infecting cells in vitro or in vivo with such viruses are known in the art, e.g., can be found in Ausubel, et al., eds., Current Protocols in Molecular Biology, Greene Publishing Associates, (1989), Sections 9.10-9.14, and other standard laboratory manuals. The use of AAV vectors to deliver constructs for expression in the brain has been described, e.g., in Iwata et al., Sci Rep. 2013; 3:1472; Hester et al., Curr Gene Ther. 2009 October; 9(5):428-33; Doll et al., Gene Therapy 1996, 3(5):437-447; and Foley et al., J Control Release. 2014 Dec. 28; 196:71-8.

Thus, in some embodiments, the PS1 or PS2 encoding nucleic acid is present in a vector for gene therapy, such as an AAV vector. In some instances, the AAV vector is selected from the group consisting of AAV1, AAV2, AAV3, AAV4, AAV5, AAV6, AAV7, AAV8, AAV9, AAVrh10, AAV11, and AAV12.

A vector as described herein can be a pseudotyped vector. Pseudotyping provides a mechanism for modulating a vector's target cell population. For instance, pseudotyped AAV vectors can be utilized in various methods described herein. Pseudotyped vectors are those that contain the genome of one vector, e.g., the genome of one AAV serotype, in the capsid of a second vector, e.g., a second AAV serotype. Methods of pseudotyping are well known in the art. For instance, a vector may be pseudotyped with envelope glycoproteins derived from Rhabdovirus vesicular stomatitis virus (VSV) serotypes (Indiana and Chandipura strains), rabies virus (e.g., various Evelyn-Rokitnicki-Abelseth ERA strains and challenge virus standard (CVS)), Lyssavirus Mokola virus, a rabies-related virus, vesicular stomatitis virus (VSV), Mokola virus (MV), lymphocytic choriomeningitis virus (LCMV), rabies virus glycoprotein (RV-G), glycoprotein B type (FuG-B), a variant of FuG-B (FuG-B2) or Moloney murine leukemia virus (MuLV). A virus may be pseudotyped for transduction of one or more neurons or groups of cells.

Without limitation, illustrative examples of pseudotyped vectors include recombinant AAV2/1, AAV2/2, AAV2/5, AAV2/6, AAV2/7, AAV2/8, AAV9, AAVrh10, AAV11, and AAV12 serotype vectors. It is known in the art that such vectors may be engineered to include a transgene encoding a human protein or other protein. In particular instances, the present disclosures can include a pseudotyped AAV9 or AAVrh10 viral vector including a nucleic acid as disclosed herein. See Viral Vectors for Gene Therapy: Methods and Protocols, ed. Machida, Humana Press, 2003.

In some instances, a particular AAV serotype vector may be selected based upon the intended use, e.g., based upon the intended route of administration.

Various methods for application of AAV vector constructs in gene therapy are known in the art, including methods of modification, purification, and preparation for administration to human subjects (see, e.g., Viral Vectors for Gene Therapy: Methods and Protocols, ed. Machida, Humana Press, 2003). In addition, AAV based gene therapy targeted to cells of the CNS has been described (see, e.g., U.S. Pat. Nos. 6,180,613 and 6,503,888). High titer AAV preparations can be produced using techniques known in the art, e.g., as described in U.S. Pat. No. 5,658,776

A vector construct refers to a polynucleotide molecule including all or a portion of a viral genome and a transgene. In some instances, gene transfer can be mediated by a DNA viral vector, such as an adenovirus (Ad) or adeno-associated virus (AAV). Other vectors useful in methods of gene therapy are known in the art. For example, a construct as disclosed herein can include an alphavirus, herpesvirus, retrovirus, lentivirus, or vaccinia virus.

Adenoviruses are a relatively well characterized group of viruses, including over 50 serotypes (see, e.g., WO 95/27071, which is herein incorporated by reference). Adenoviruses are tractable through the application of techniques of molecular biology and may not require integration into the host cell genome. Recombinant Ad-derived vectors, including vectors that reduce the potential for recombination and generation of wild-type virus, have been constructed (see, e.g., international patent publications WO 95/00655 and WO 95/11984, which are herein incorporated by reference). Wild-type AAV has high infectivity and is capable of integrating into a host genome with a high degree of specificity (see, e.g. Hermonat and Muzyczka 1984 Proc. Natl. Acad. Sci., USA 81:6466-6470 and Lebkowski et al. 1988 Mol. Cell. Biol. 8:3988-3996).

Non-native regulatory sequences, gene control sequences, promoters, non-coding sequences, introns, or coding sequences can be included in a nucleic acid as disclosed herein. The inclusion of nucleic acid tags or signaling sequences, or nucleic acids encoding protein tags or protein signaling sequences, is further contemplated herein. Typically, the coding region is operably linked with one or more regulatory nucleic acid components.

A promoter included in a nucleic acid as disclosed herein can be a tissue- or cell type-specific promoter, a promoter specific to multiple tissues or cell types, an organ-specific promoter, a promoter specific to multiple organs, a systemic or ubiquitous promoter, or a nearly systemic or ubiquitous promoter. Promoters having stochastic expression, inducible expression, conditional expression, or otherwise discontinuous, inconstant, or unpredictable expression are also included within the scope of the present disclosure. A promoter can include any of the above characteristics or other promoter characteristics known in the art.

In clinical settings, the gene delivery systems for the therapeutic gene can be introduced into a subject by any of a number of methods, each of which is familiar in the art. For instance, a pharmaceutical preparation of the gene delivery system can be introduced systemically, e.g., by intravenous injection, and specific transduction of the protein in the target cells will occur predominantly from specificity of transfection, provided by the gene delivery vehicle, cell-type or tissue-type expression due to the transcriptional regulatory sequences controlling expression of the receptor gene, or a combination thereof. In other embodiments, initial delivery of the recombinant gene is more limited, with introduction into the subject being quite localized. For example, the gene delivery vehicle can be introduced by catheter (see U.S. Pat. No. 5,328,470) or by stereotactic injection, e.g., optionally into the cisterna magna, cerebral ventricles, lumbar intrathecal space, direct injection into hippocampus (e.g., Chen et al., PNAS USA 91: 3054-3057 (1994)). In some embodiments, delivery methods of Presenilin-expressing virus include intravenous, intrathecal, intracerebroventricular, intracisternal, and stereotactic intraparenchymal administration.

The methods can be further optimized via preclinical testing to achieve the best rescue of neurodegeneration, dementia, synaptic dysfunction and molecular alteration in presenilin conditional double knockout mice and presenilin-1 knockin mice expressing FAD mutations.

The pharmaceutical preparation of the gene therapy construct can consist essentially of the gene delivery system in an acceptable diluent, or can comprise a slow release matrix in which the gene delivery vehicle is embedded. Alternatively, where the complete gene delivery system can be produced intact from recombinant cells, e.g., retroviral vectors, the pharmaceutical preparation can comprise one or more cells, which produce the gene delivery system.

Delivery Formulations and Pharmaceutical Compositions

In some embodiments, polynucleotides as disclosed herein for delivery to a target tissue in vivo are encapsulated or associated with in a nanoparticle. Methods for nanoparticle packaging are well known in the art, and are described, for example, in Bose S, et al (Role of Nucleolin in Human Parainfluenza Virus Type 3 Infection of Human Lung Epithelial Cells. J. Virol. 78:8146. 2004); Dong Y et al. Poly (d,l-lactide-co-glycolide)/montmorillonite nanoparticles for oral delivery of anticancer drugs. Biomaterials 26:6068. 2005); Lobenberg R. et al (Improved body distribution of 14C-labelled AZT bound to nanoparticles in rats determined by radioluminography. J Drug Target 5:171.1998); Sakuma S R et al (Mucoadhesion of polystyrene nanoparticles having surface hydrophilic polymeric chains in the gastrointestinal tract. Int J Pharm 177:161. 1999); Virovic L et al. Novel delivery methods for treatment of viral hepatitis: an update. Expert Opin Drug Deliv 2:707.2005); and Zimmermann E et al, Electrolyte- and pH-stabilities of aqueous solid lipid nanoparticle (SLN) dispersions in artificial gastrointestinal media. Eur J Pharm Biopharm 52:203. 2001). In some embodiments, one or more polynucleotides is delivered to a target tissue in vivo in a vesicle, e.g. a liposome (see Langer, Science 249:1527-1533 (1990); Treat et al., in Liposomes in the Therapy of Infectious Disease and Cancer, Lopez-Berestein and Fidler (eds.), Liss, New York, pp. 353-365 (1989); Lopez-Berestein, ibid., pp. 317-327; see generally ibid). In some embodiments, lipid-based nanoparticles (LNP) are used; see, e.g., Robinson et al., Mol Ther. 2018 Aug. 1; 26(8):2034-2046; U.S. Pat. No. 9,956,271B2.

The present methods and compositions can include microvesicles or a preparation thereof, that contains one or more therapeutic molecules—e.g., polynucleotides or RNA—described herein. "Microvesicles", as the term is used herein, refers to membrane-derived microvesicles, which includes a range of extracellular vesicles, including exosomes, microparticles and shed microvesicles secreted by many cell types under both normal physiological and pathological conditions. See, e.g., EP2010663B1. The methods and compositions described herein can be applied to microvesicles of all sizes; in one embodiment, 30 to 200 nm, in one embodiment, 30 to 800 nm, in one embodiment, up to 2 um. The methods and compositions described herein can also be more broadly applied to all extracellular vesicles, a term which encompasses exosomes, shed microvesicles, oncosomes, ectosomes, and retroviral-like particles. Such a microvesicle or preparation is produced by the herein described methods. As the term is used herein, a microvesicle preparation refers to a population of microvesicles obtained/prepared from the same cellular source. Such a preparation is generated, for example, in vitro, by culturing cells expressing the nucleic acid molecule of the instant invention and isolating microvesicles produced by the cells. Methods of isolating such microvesicles are known in the art (Thery et al., Isolation and characterization of exosomes from cell culture supernatants and biological fluids, in Current Protocols Cell Biology, Chapter 3, 322, (John Wiley, 2006); Palmisano et al., (Mol Cell Proteomics. 2012 August; 11(8):230-43) and Waldenstrom et al., ((2012) PLoS ONE 7(4): e34653.doi: 10.1371/journal.pone.0034653)), some examples of which are described herein. Such techniques for isolating microvesicles from cells in culture include, without limitation, sucrose gradient purification/separation and differential centrifugation, and can be adapted for use in a method or composition described herein. See, e.g., EP2010663B1.

In some embodiments, the microvesicles are isolated by gentle centrifugation (e.g., at about 300 g) of the culture medium of the donor cells for a period of time adequate to separate cells from the medium (e.g., about 15 minutes). This leaves the microvesicles in the supernatant, to thereby yield the microvesicle preparation. In one embodiment, the culture medium or the supernatant from the gentle centrifugation, is more strongly centrifuged (e.g., at about 16,000 g) for a period of time adequate to precipitate cellular debris (e.g., about 30 minutes). This leaves the microvesicles in the supernatant, to thereby yield the microvesicle preparation. In one embodiment, the culture medium, the gentle centrifuged preparation, or the strongly centrifuged preparation is subjected to filtration (e.g., through a 0.22 um filter or a 0.8 um filter, whereby the microvesicles pass through the filter. In one embodiment, the filtrate is subjected to a final ultracentrifugation (e.g. at about 110,000 g) for a period of time that will adequately precipitate the microvesicles (e.g. for about 80 minutes). The resulting pellet contains the microvesicles and can be resuspended in a volume of buffer that yields a useful concentration for further use, to thereby yield the microvesicle preparation. In one embodiment, the microvesicle preparation is produced by sucrose density gradient purification. In one embodiment, the microvesicles are further treated with DNAse (e.g., DNAse I) and/or RNAse and/or proteinase to eliminate any contaminating DNA, RNA, or protein, respectively, from the exterior. In one embodiment, the microvesicle preparation contains one or more RNAse inhibitors.

The molecules contained within the microvesicle preparation will comprise the therapeutic molecule. Typically the microvesicles in a preparation will be a heterogeneous population, and each microvesicle will contain a complement of molecule that may or may not differ from that of other microvesicles in the preparation. The content of the therapeutic molecules in a microvesicle preparation can be expressed either quantitatively or qualitatively. One such method is to express the content as the percentage of total molecules within the microvesicle preparation. By way of example, if the therapeutic molecule is an mRNA, the content can be expressed as the percentage of total RNA content, or alternatively as the percentage of total mRNA content, of the microvesicle preparation. Similarly, if the therapeutic molecule is a protein, the content can be expressed as the percentage of total protein within the microvesicles. In one embodiment, therapeutic microvesicles, or a preparation thereof, produced by the method described herein contain a detectable, statistically significantly increased amount of the therapeutic molecule as compared to microvesicles obtained from control cells (cells obtained from the same source which have not undergone scientific manipulation to increase expression of the therapeutic molecule). In one embodiment, the therapeutic molecule is present in an amount that is at least about 10%, 20%, 30% 40%, 50%, 60%, 70% 80% or 90%, more than in microvesicles obtained from control cells. Higher levels of enrichment may also be achieved. In one embodiment, the therapeutic molecule is present in the microvesicle or preparation thereof, at least 2 fold more than control cell microvesicles. Higher fold enrichment may also be obtained (e.g., 3, 4, 5, 6, 7, 8, 9 or 10 fold).

In one embodiment, a relatively high percentage of the microvesicle content is the therapeutic molecule (e.g., achieved through overexpression or specific targeting of the molecule to microvesicles). In one embodiment, the microvesicle content of the therapeutic molecule is at least about 10%, 20%, 30% 40%, 50%, 60%, 70% 80% or 90%, of the total (like) molecule content (e.g., the therapeutic molecule is an mRNA and is about 10% of the total mRNA content of the microvesicle). Higher levels of enrichment may also be achieved. In one embodiment, the therapeutic molecule is present in the microvesicle or preparation thereof, at least 2 fold more than all other such (like) molecules. Higher fold enrichment may also be obtained (e.g., 3, 4, 5, 6, 7, 8, 9 or 10 fold).

EXAMPLES

The invention is further described in the following examples, which do not limit the scope of the invention described in the claims.

Example 1: Pyramidal Neurons of Sporadic Alzheimer Disease (AD) Patients Exhibit Reduced PSEN1 and PSEN2 mRNA Levels Presenilin (PS) protein is the catalytic subunit of γ-secretase, which is required for the production of Aβ peptides. Mutations in the Presenilin-1 (PSEN1) and Presenilin-2 (PSEN2) genes are associated with 90% of cases of familial Alzheimer's disease (FAD). PSEN mutations associated with FAD and frontotemporal dementia cause loss of presenilin expression and presenilin function, leading to reduced γ-secretase activity (Xia et al., Neuron. 2015 Mar. 4; 85(5):967-81; Watanabe et al., J Neurosci. 2012 Apr. 11; 32(15):5085-96; Brouwers et al., 2008 Ann Med 40 (8): 562-83).

Individual pyramidal neurons were collected using laser capture microdissection, 300 neurons per human brain were pooled together for RNA preparation (PicoPure RNA Isolation Kit, Life Technologies KIT0204). qRT-PCR was performed using SuperScript III One-Step RT-PCR System with Platinum Taq DNA Polymerase (Life Technologies). The sequence of the primers used are listed in Table 2.

TABLE 2

List of primers.

| UID | Sequence (5'-3') | SEQ ID NO: | Gene Amplified |
|---|---|---|---|
| hPS1-F5 | AGACCCGGAAGCTCAAAGGA | 9 | human Presenilin-1 |
| hPS1-R5 | TTCCTCACTGAACCCGCCAT | 10 | human Presenilin-1 |
| hPS2-F5 | AAGTGTCCGGGATTCAGACCTC | 11 | human Presenilin-2 |
| hPS2-R5 | TCGCTGTCAGAGGCCATGAA | 12 | human Presenilin-2 |
| NCT-104 | ACAGGTGGCCTTAAGAACTTCAT | 13 | human Nicastrin |
| NCT-204 | CCACCTGGTTCCGTACAGAC | 14 | human Nicastrin |
| hPen2-F1 | TCCTTGTCCCAGCCTACACA | 15 | human PEN2 |
| hPen2-R1 | AGCACTATCACCCAGAAGAGGA | 16 | human PEN2 |

PSEN1 and PSEN2 mRNA levels were reduced in laser dissected pyramidal neurons from hippocampal CA1 pyramidal neurons of sporadic AD patients (FIGS. 1A-B).

Example 2: Dose-Dependent Reduction of γ-Secretase Activity in MEFs Carrying Heterozygous and Homozygous PSEN1 Mutations Methods
Generation of Immortalized PSEN Mutant MEFs Mouse embryonic fibroblasts (MEFs) carrying various Psen1 genotypes were maintained in media supplemented with 10% FBS and 1% penicillin and streptomycin. In 6-well plates, 300,000 MEFs were immortalized by transfection with 1 µg CMV-SV40. MEFs transfected with CMV-SV40 were compared to MEFs transfected with CMV-GFP (1 µg), which stopped dividing around passage 7.

Transfection of NdE and hPS1

To determine whether γ-secretase activity is impaired in various immortalized Psen mutant MEFs, CMV-NotchAE (5 ng) was transiently transfected into MEFs in 6-well plates using Lipofectamine LTX (ThermoFisher Scientific 15338030) per manufacturer's instructions.

Roughly 24 hours after transfection, cells were lysed in RIPA buffer: 50 mM Tris-Cl (pH 7.6), 150 mM NaCl, 1% NP40, 0.5% sodium deoxycholate, protease inhibitor cocktail (Sigma), 1 mM DTT. Proteins (40 µg) were separated in NuPAGE gels (Invitrogen) and transferred to nitrocellulose membranes. Primary antibodies were rabbit anti-cleaved Notch1 Val1744 (Cell Signaling), rabbit anti-PS1 NTF (Calbiochem), which recognizes both mouse and human PS1, mouse anti-cMyc (Sigma) or rabbit anti-tubulin (Cell Signaling). Membranes were then incubated with dye-coupled secondary antibodies (goat anti-rabbit IRdye800, goat anti-mouse IRdye800, or goat anti-rabbit IRdye680 from Licor). Signals were quantified with the Odyssey Infrared Imaging System (LI-COR Bioscience). γ-secretase activity measured by NICD production is reduced in L435F KI/+ MEFs and further reduced in KI/KI and PS1−/− MEFs (FIG. 3A).

Figure 3B:
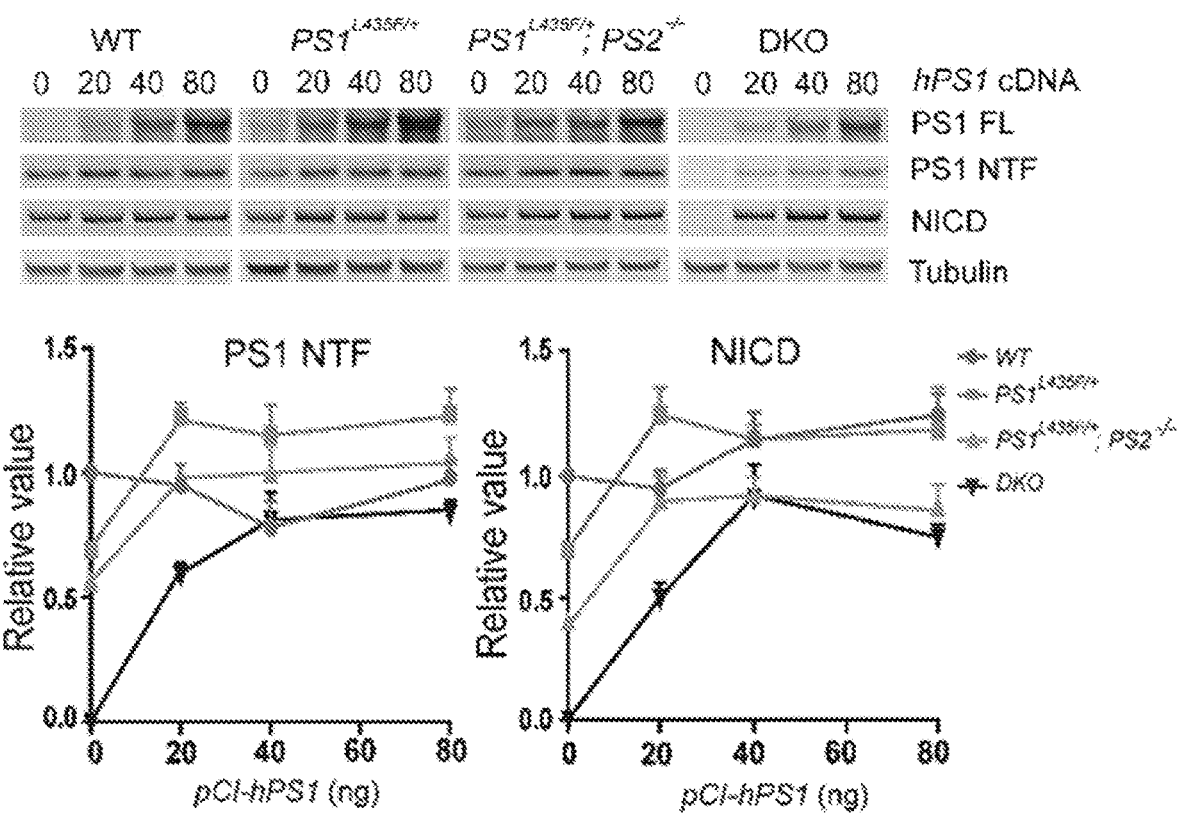

Example 3: Dose-Dependent Rescue of γ-Secretase Activity in MEFs with Varying PS Genotypes: $PS1^{+/+}$, $PS1^{L435F/+}$, $PS1^{+/-}$, $PS1^{L435F/L435F}$, $PS1^{-/-}$, $PS1^{-/-}$; $PS2^{-/-}$ To determine whether reduced γ-secretase activity associated with PSEN1 mutations can be corrected by introduction of wild-type (WT) hPS1, primary MEFs from embryos carrying varying PS genotypes, $PS1^{+/+}$, $PS1^{L435F/+}$, $PS1^{+/-}$, $PS1^{L435F/L435F}$, $PS1^{-/-}$, $PS1^{-/-}$; $PS2^{-/-}$ (DKO) were derived. The immortalized MEFs were transiently transfected with CMV-NdelE, and γ-secretase activity was evaluated by measuring the levels of NICD and PS1 NTF/CTF. The NICD levels were reduced in a PS1 dosage sensitive manner, and were undetectable in DKO cells (FIG. 3A). The NICD levels were reduced but detectable in $PS1^{L435F/L435F}$ MEFs ("L435F KI/KI" MEFs) and $PS1^{-/-}$ MEFs (FIG. 3A), whereas de novo NICD production was undetectable by in vitro γ-secretase assay using L435F KI/KI and $PS1^{-/-}$ embryonic brains (Xia et al., Neuron. 2015 Mar. 4; 85(5): 967-81). Without wishing to be bound to a particular theory, applicant submits that this may be due to lower levels of PS2 normally expressed in the embryonic brain relative to MEFs, leading to lower overall PS activity in L435F KI/KI and $PS1^{-/-}$ brains, relative to MEFs. To test this hypothesis, the γ-secretase activity was measured in $PS1^{L435F/+}$; $PS2^{-/-}$ MEFs and compared to $PS1^{L435F/+}$ MEFs. The γ-secretase activity was lower in $PS1^{L435F/+}$; $PS2^{-/-}$ MEFs compared to $PS1^{L435F/+}$ MEFs (FIG. 3B).

To determine whether the impaired γ-secretase activity in various PS mutant MEFs can be rescued by introduction of WT hPS1, varying amounts (0, 20, 40, 80 ng) of wild-type hPS1 cDNA (pCI-hPS1) were transfected into MEFs, along with CMV-NdelE. Notably, increasing amounts of PCI-hPS1 transfected into the MEFs resulted in accumulation of PS1 protein and restored levels of PS1 NTF and NICD in mutant ($PS1^{L435F/+}$, $Ps1^{L435F/+}$; $PS2^{-/-}$ and DKO) MEFs (FIG. 3B). These results indicate that exogenous WT hPS1 can rescue the impaired γ-secretase activity in in various PS mutant MEFs.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of treating one or more symptoms of familial Alzheimer's Disease in a human subject having human presenilin-1 (PSEN1) gene mutation L435F as compared to SEQ ID NO: 17, the method comprising administering by intracerebroventricular injection to the subject an AAV9 vector comprising a polynucleotide encoding the amino acid sequence of SEQ ID NO: 5 or SEQ ID NO: 6 operably linked to a synapsin I or an alpha-calcium/calmodulin kinase 2A promoter.

2. The method of claim 1, wherein the polynucleotide encoding the amino acid sequence is operably linked to a synapsin I promoter.

3. The method of claim 1, wherein the polynucleotide encoding the amino acid sequence is operably linked to alpha-calcium/calmodulin kinase 2A promoter.

* * * * *